United States Patent
Resch et al.

(10) Patent No.: US 9,658,911 B2
(45) Date of Patent: May 23, 2017

(54) SELECTING A DIRECTORY OF A DISPERSED STORAGE NETWORK

(75) Inventors: Jason K. Resch, Chicago, IL (US); Andrew Tsvetkov, Columbia, MD (US); Andrew Baptist, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 92 days.

(21) Appl. No.: 13/372,715

(22) Filed: Feb. 14, 2012

(65) Prior Publication Data

US 2012/0226714 A1 Sep. 6, 2012

Related U.S. Application Data

(60) Provisional application No. 61/448,526, filed on Mar. 2, 2011.

(51) Int. Cl.
*G06F 17/30* (2006.01)
*G06F 11/07* (2006.01)
*G06F 11/10* (2006.01)

(52) U.S. Cl.
CPC ...... *G06F 11/0757* (2013.01); *G06F 11/0727* (2013.01); *G06F 11/1076* (2013.01); *G06F 2211/1028* (2013.01)

(58) Field of Classification Search
CPC .......................... G06F 17/30; G06F 17/30067
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |

(Continued)

OTHER PUBLICATIONS

Grapa, Enrique. "Characterization of a Distributed Data Base System." University of Illinois at Urbana-Champaign, Apr. 1976. United States—Illinois: ProQuest Dissertations & Theses (PQDT). Web. Nov. 2, 2012.*

(Continued)

*Primary Examiner* — Kevin L Young
*Assistant Examiner* — Michael K Tamaru
(74) *Attorney, Agent, or Firm* — Garlick & Markison; Timothy W. Markison

(57) ABSTRACT

A method begins by a processing module receiving a dispersed storage network (DSN) access request accessing DSN memory regarding a set of encoded data slices, selecting a local DSN directory or a global DSN directory to produce a selected DSN directory, identifying an entry of the selected DSN directory regarding the set of encoded data slices to produce an identified entry, and accessing the DSN memory regarding the set of encoded data slices. The method continues with the processing module determining whether to update one or more of the local DSN directory and the global DSN directory based on the accessing the DSN memory and when the one or more of the local DSN directory and the global DSN directory is to be updated, updating the one or more of the local DSN directory and the global DSN directory in accordance with the accessing the DSN memory.

12 Claims, 30 Drawing Sheets

(56) References Cited

U.S. PATENT DOCUMENTS

| | | | |
|---|---|---|---|
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,253,240 B1* | 6/2001 | Axberg et al. | 709/223 |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,449,731 B1* | 9/2002 | Frey, Jr. | 714/6.24 |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,313,614 B2* | 12/2007 | Considine et al. | 709/223 |
| 7,590,632 B1* | 9/2009 | Caronni et al. | |
| 7,636,724 B2 | 12/2009 | de la Torre et al. | |
| 2002/0062422 A1 | 5/2002 | Butterworth et al. | |
| 2002/0065879 A1* | 5/2002 | Ambrose et al. | 709/203 |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0041097 A1* | 2/2003 | Tormasov | 709/201 |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1* | 4/2007 | Gladwin et al. | 711/154 |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0046476 A1* | 2/2008 | Anderson et al. | 707/200 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Collins-Sussman et al. "Version Control with Subversion, First Edition." Sebastopol, CA: O'Reilly Media, Inc., Jun. 22, 2004. United States—Safari Books Online. <http://svnbook.red-bean.com/en/1.0/svn-book.pdf> Nov. 16, 2012. ISBN: 0-596-00448-6.*

Plank, James S. et al.; Small Parity-Check Erasure Codes—Exploration and Observations; Jun. 2005; DSN-05: International Conference on Dependable Systems and Networks.*

Shamir; How to Share a Secret; Communication of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006: pp. 1-50.

Zeilenga; Lightweioht Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006, pp. 1-15.

Smith; Lightweight Directory Access Protocol (LDAP): String Representation of Search Filters; IETF Network Working Group, RFC 4515, Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006, pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group: RFC 4511; Jun. 2006: pp. 1-68.

Satran, et al.; Internet Small Computer System Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner computing system 10

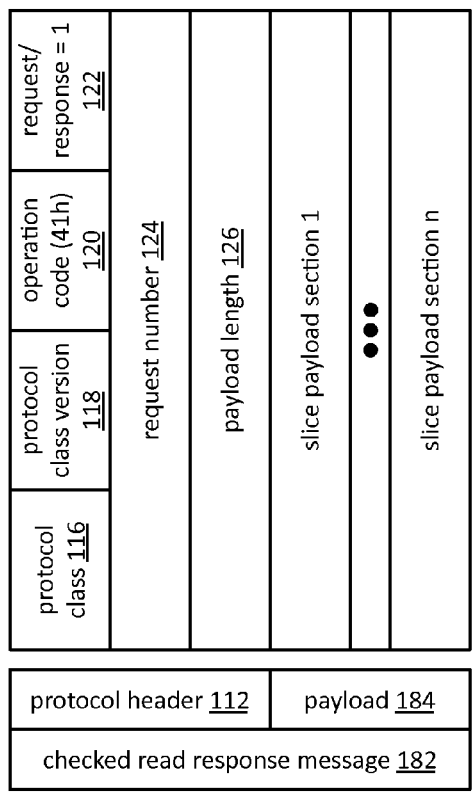
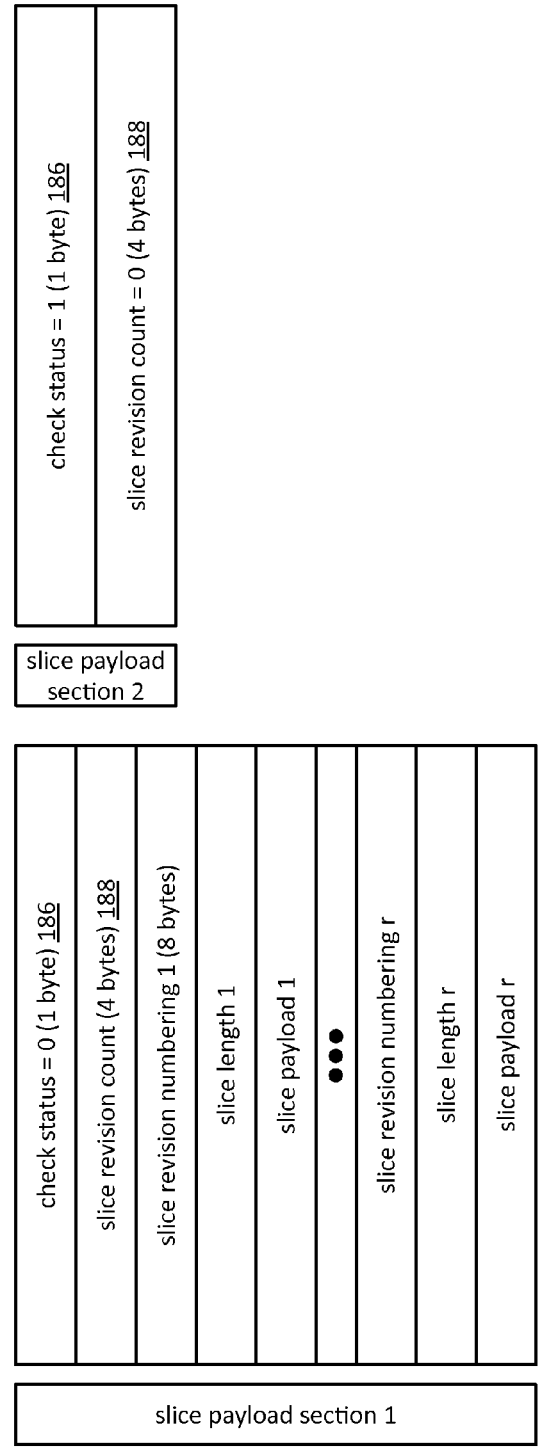
FIG. 8A

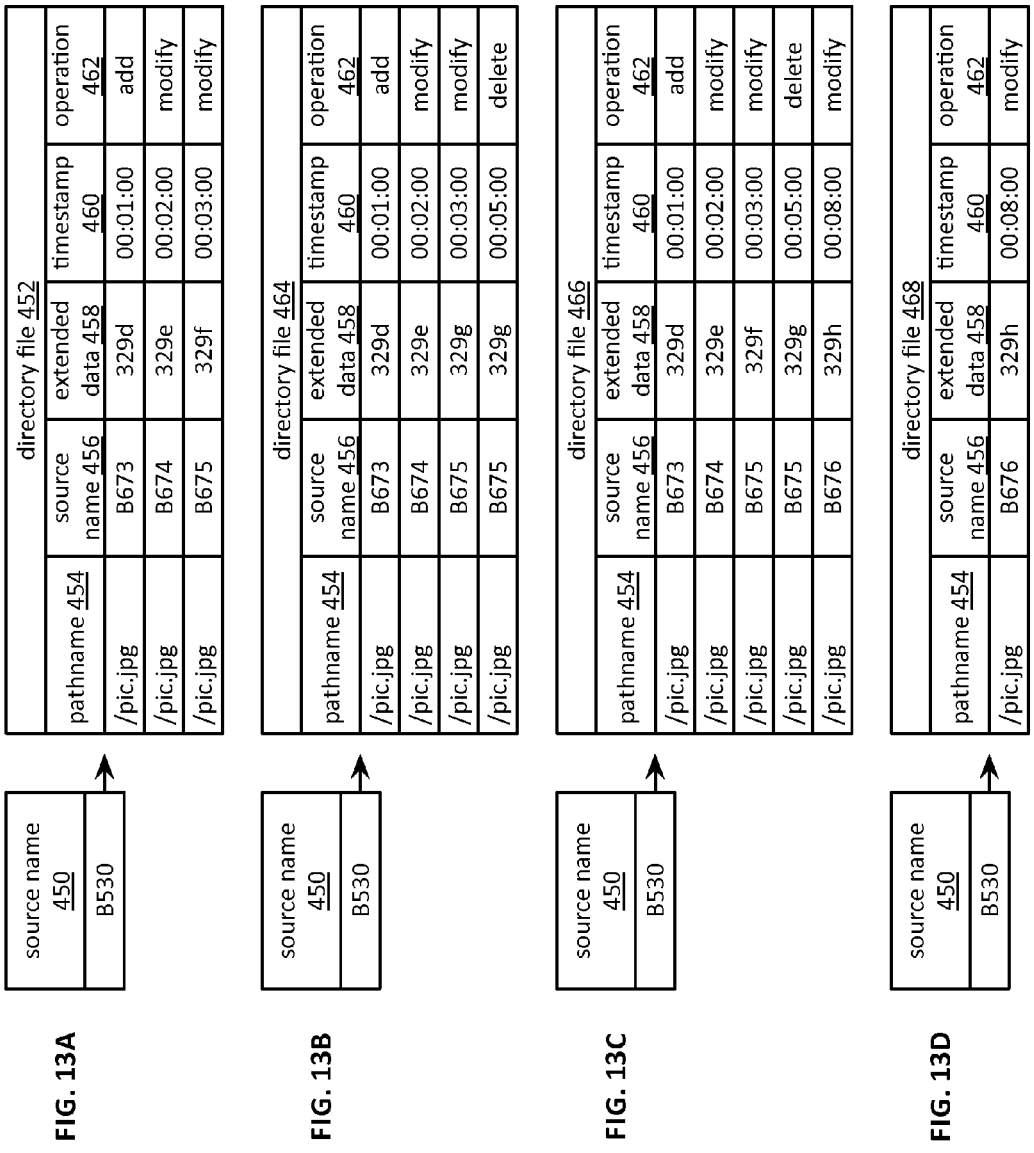

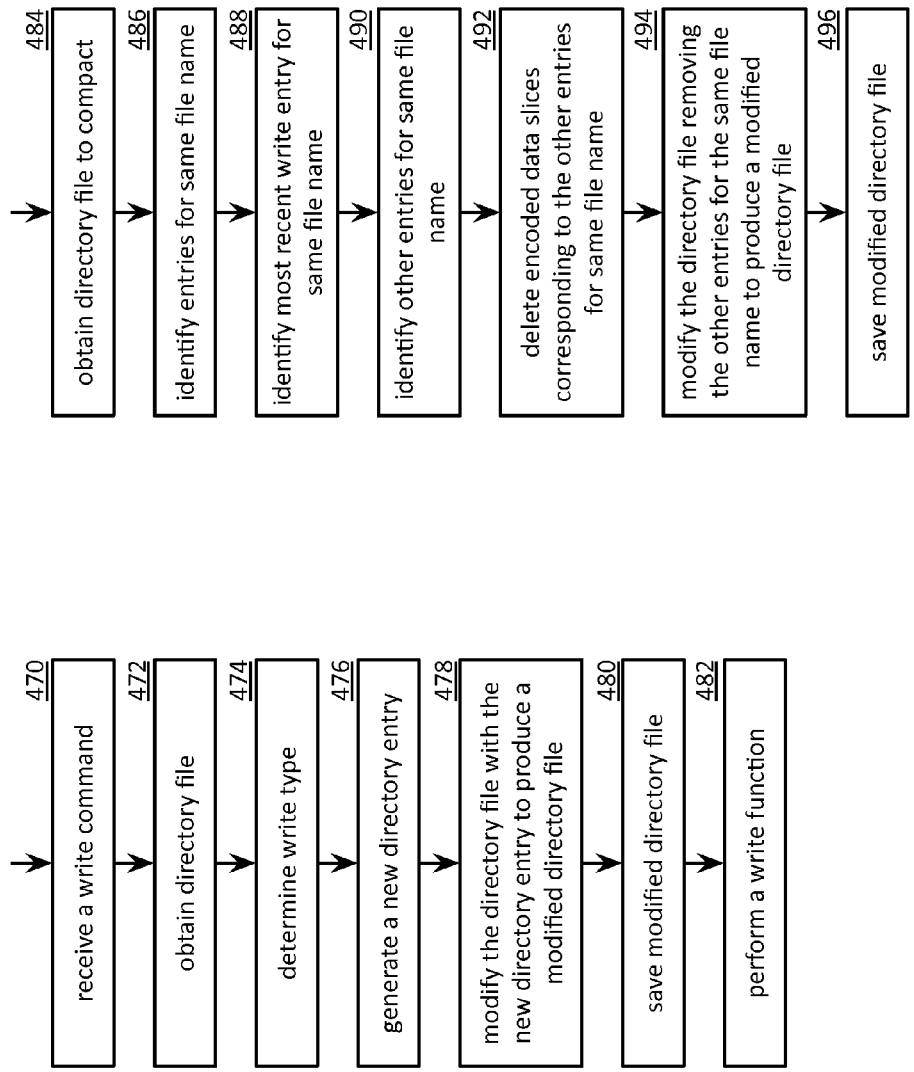

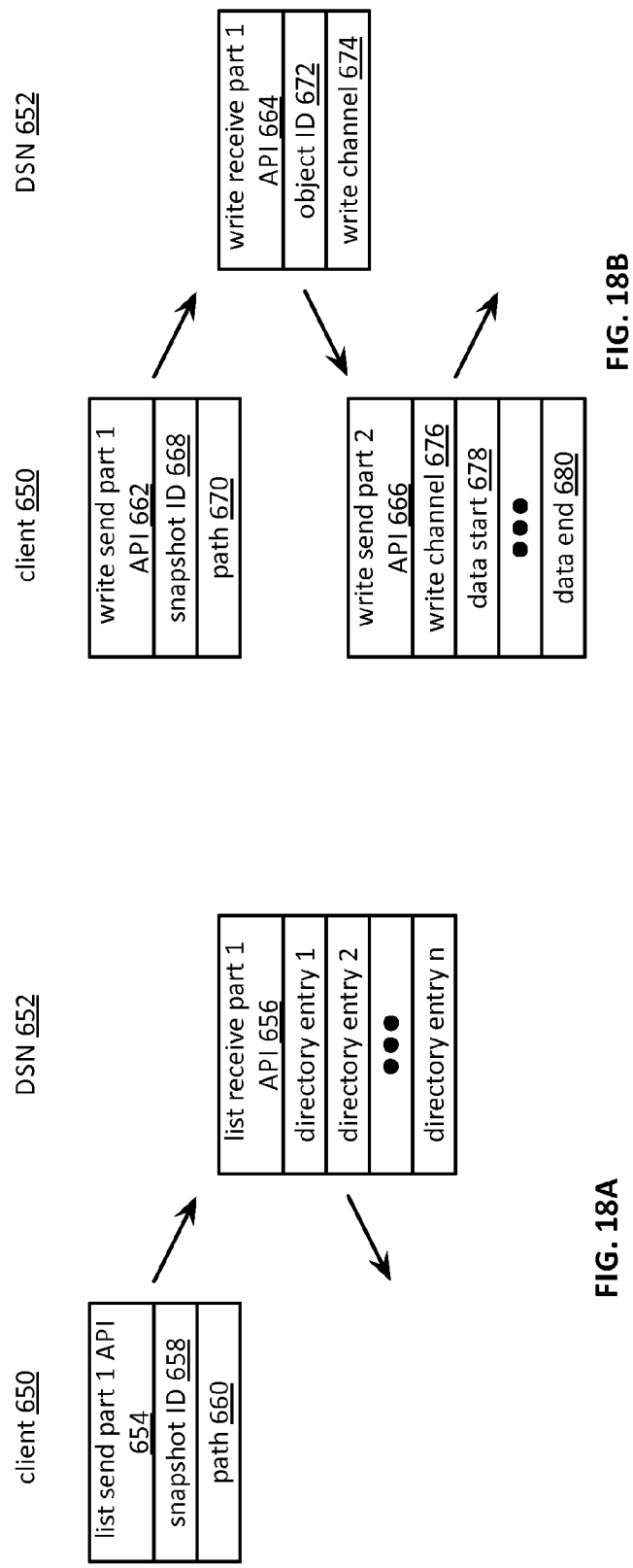

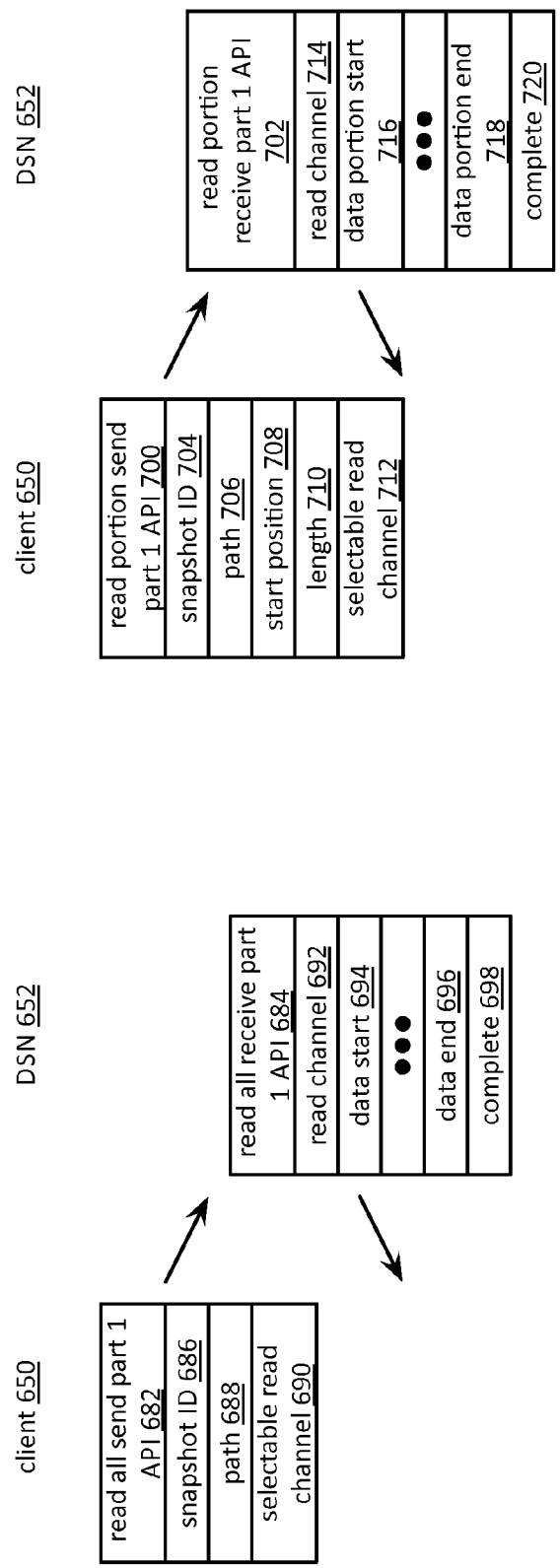

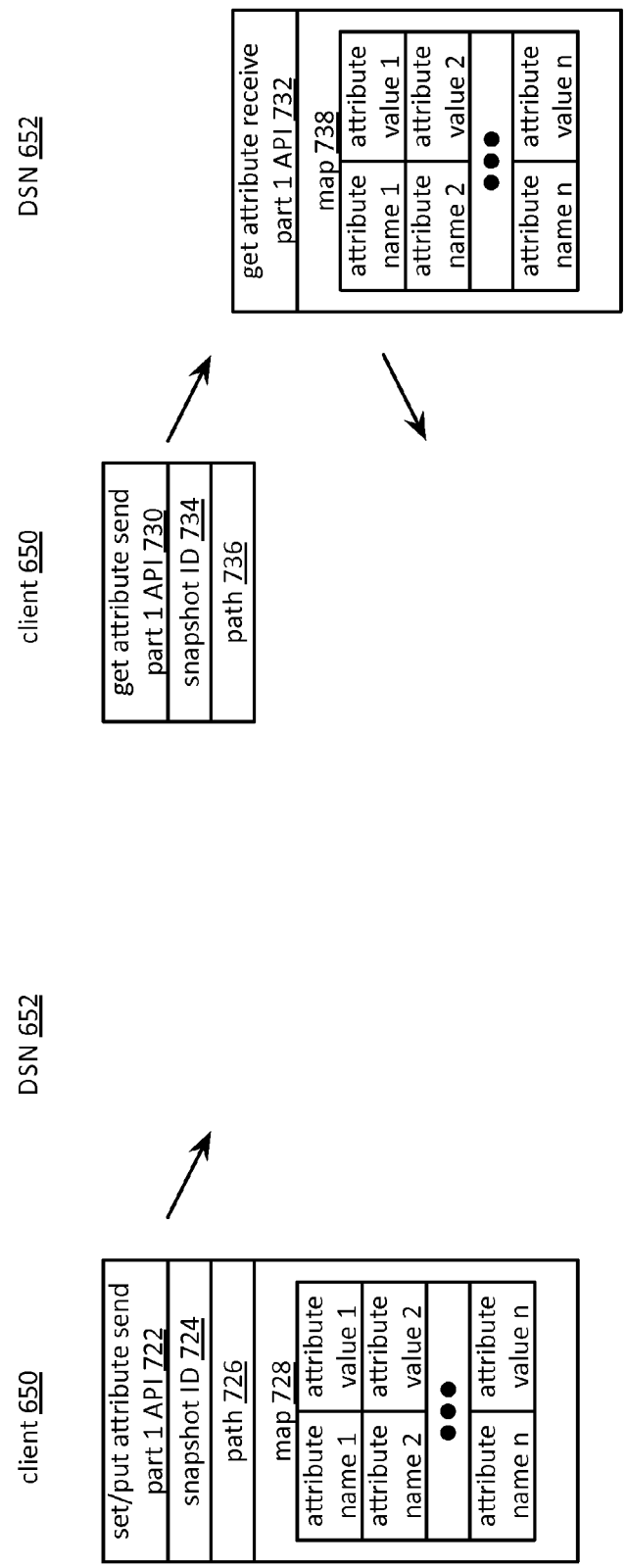

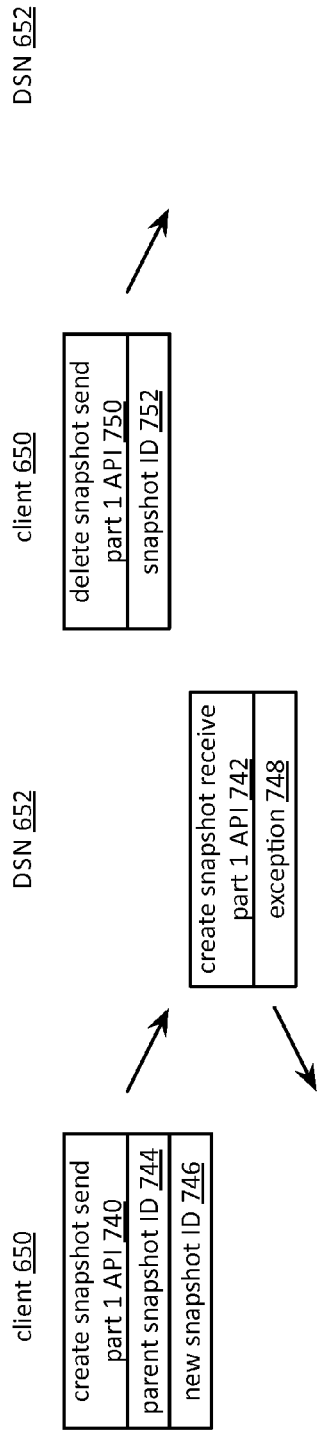
FIG. 18G
FIG. 18H
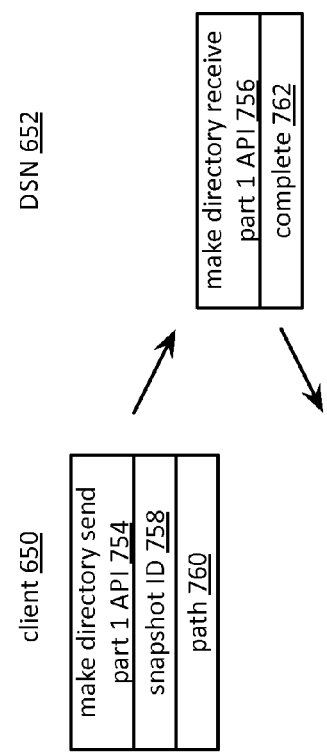
FIG. 18I

SELECTING A DIRECTORY OF A DISPERSED STORAGE NETWORK

CROSS REFERENCE TO RELATED PATENTS

The present U.S. Utility Patent Application is claiming priority pursuant to 35 U.S.C. §119(e) to U.S. Provisional Application No. 61/448,526, entitled "Dispersed Storage Network Directory System Utilization," filed Mar. 2, 2011, which is incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 8A is a diagram illustrating an example of a dispersed storage network (DSN) data concurrency response message format in accordance with the present invention;

FIG. 13A is a diagram of another directory file structure in accordance with the present invention;

FIG. 13B is a diagram of another directory file structure in accordance with the present invention;

FIG. 13C is a diagram of another directory file structure in accordance with the present invention;

FIG. 13D is a diagram of another directory file structure in accordance with the present invention;

FIG. 14A is a flowchart illustrating an example of modifying a directory file in accordance with the present invention;

FIG. 14B is a flowchart illustrating an example of compacting a directory file in accordance with the present invention;

FIG. 18A is a diagram illustrating an example of a list application programming interface (API) in accordance with the present invention;

FIG. 18B is a diagram illustrating an example of a write application programming interface (API) in accordance with the present invention;

FIG. 18C is a diagram illustrating an example of a read all application programming interface (API) in accordance with the present invention;

FIG. 18D is a diagram illustrating an example of a read portion application programming interface (API) in accordance with the present invention;

FIG. 18E is a diagram illustrating an example of a set/put attribute application programming interface (API) in accordance with the present invention;

FIG. 18F is a diagram illustrating an example of a get attribute application programming interface (API) in accordance with the present invention;

FIG. 18G is a diagram illustrating an example of a create snapshot application programming interface (API) in accordance with the present invention;

FIG. 18H is a diagram illustrating an example of a delete snapshot application programming interface (API) in accordance with the present invention; and FIG. 18I is a diagram illustrating an example of a make directory application programming interface (API) in accordance with the present invention.

DETAILED DESCRIPTION OF THE INVENTION

Figure 1:
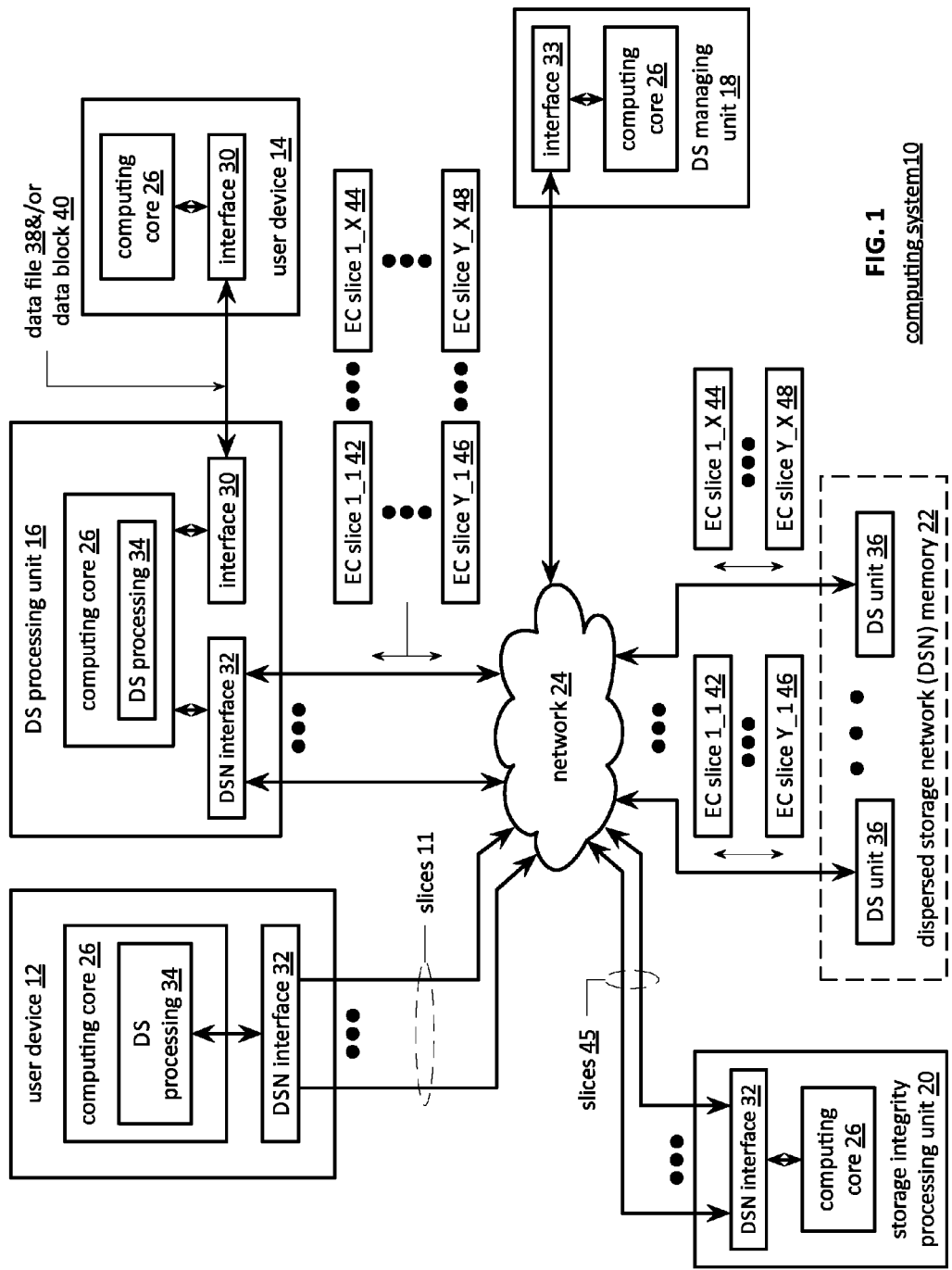
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
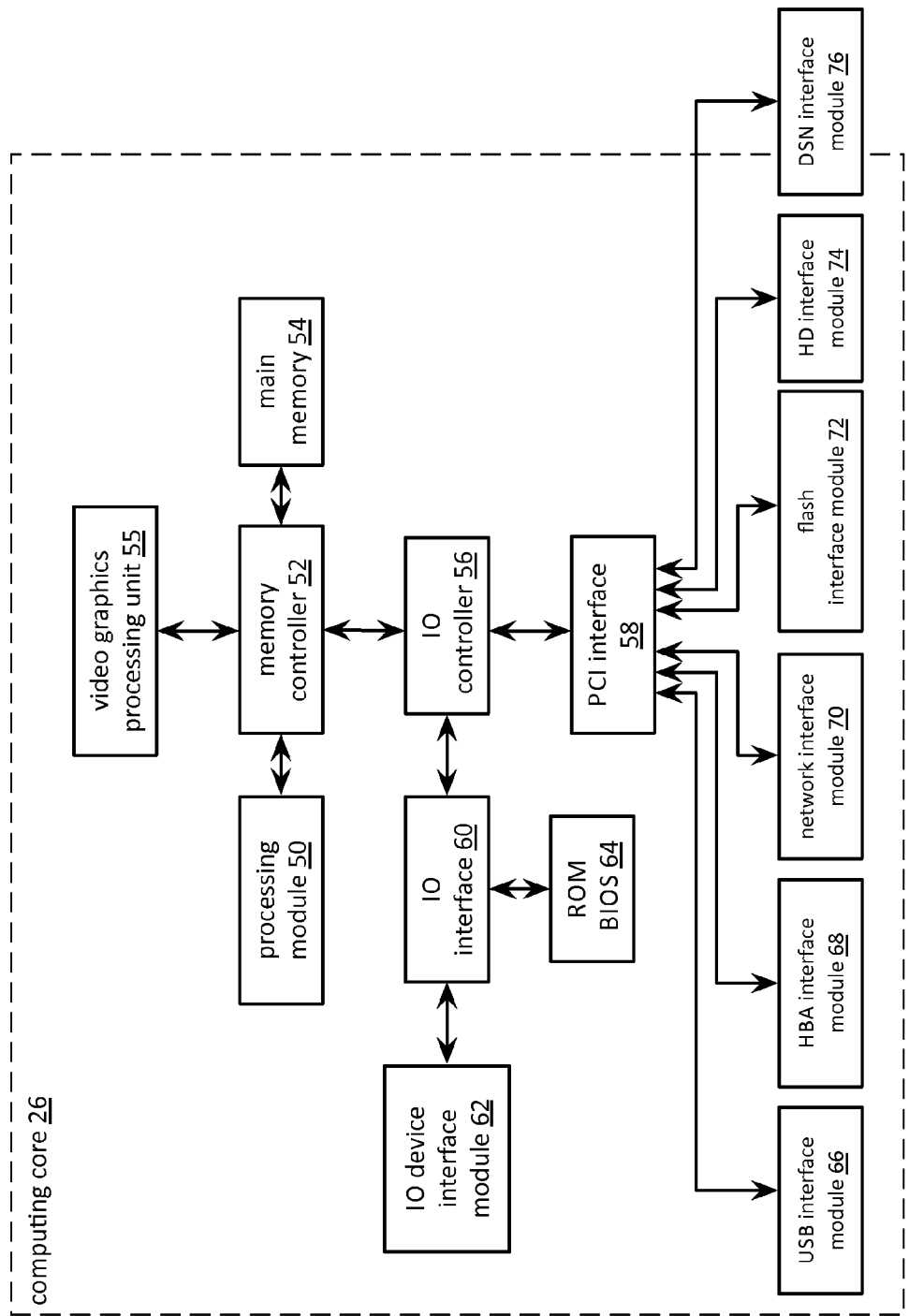
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
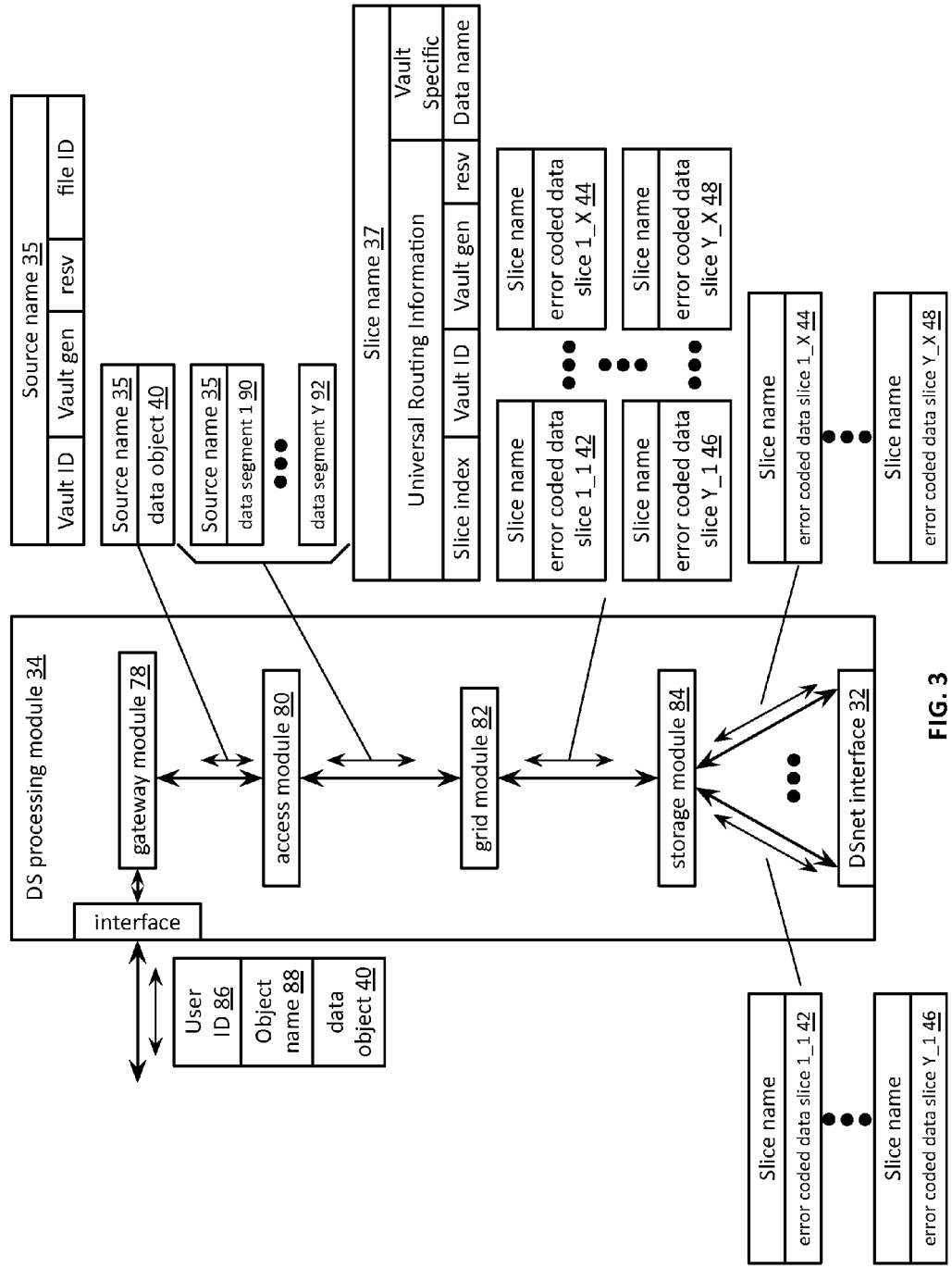
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
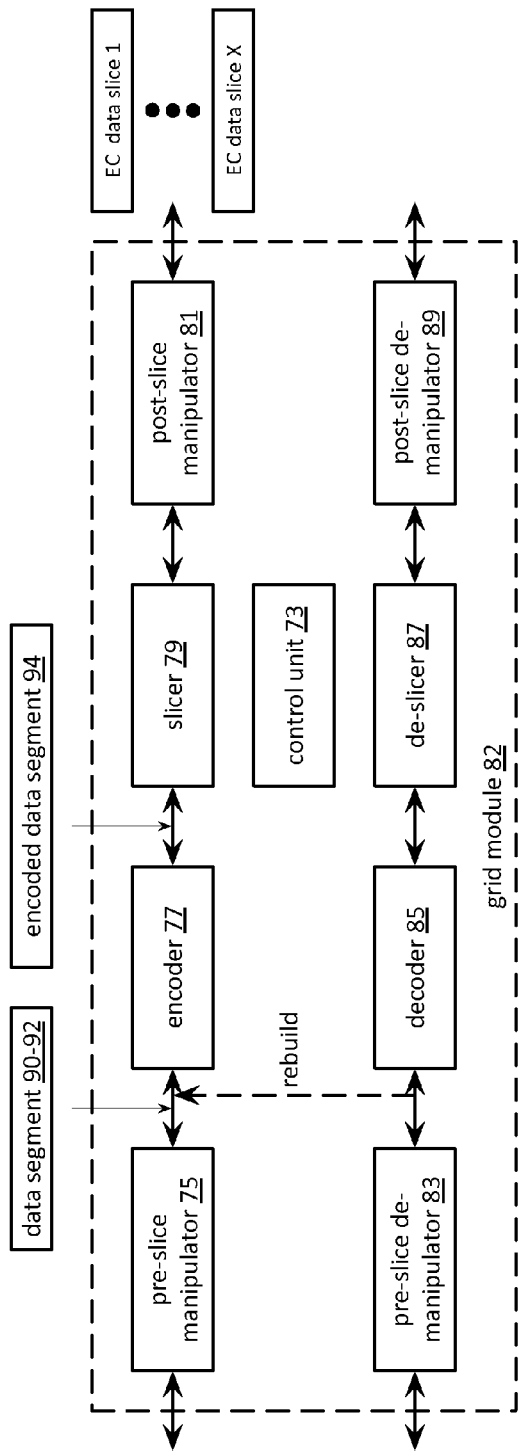
FIG. 4 is a schematic block diagram of an embodiment of a grid module in accordance with the present invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
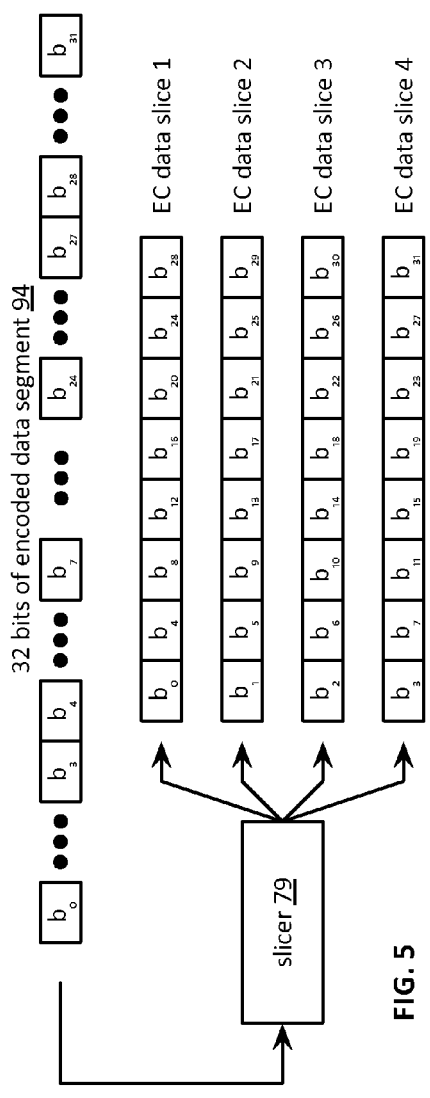
FIG. 5 is a diagram of an example embodiment of error coded data slice creation in accordance with the present invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6B:
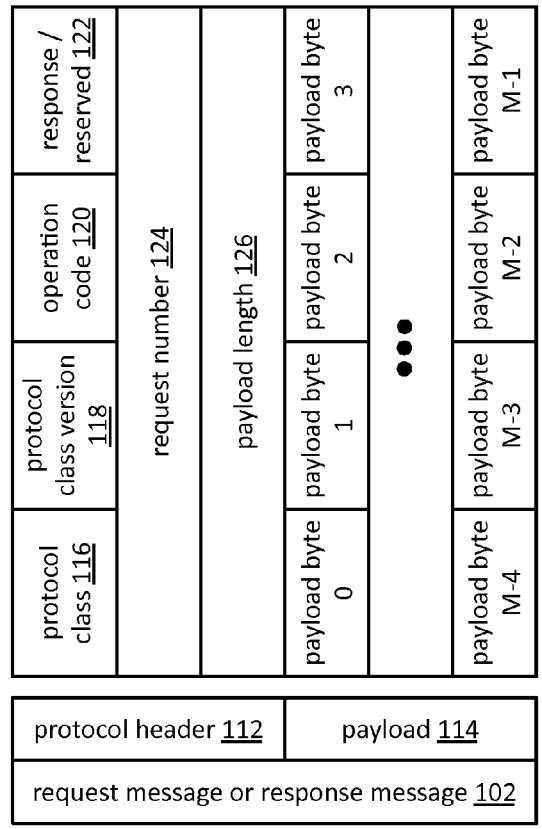
FIG. 6B is a diagram of an embodiment of a message format in accordance with the present invention.
Figure 6A:
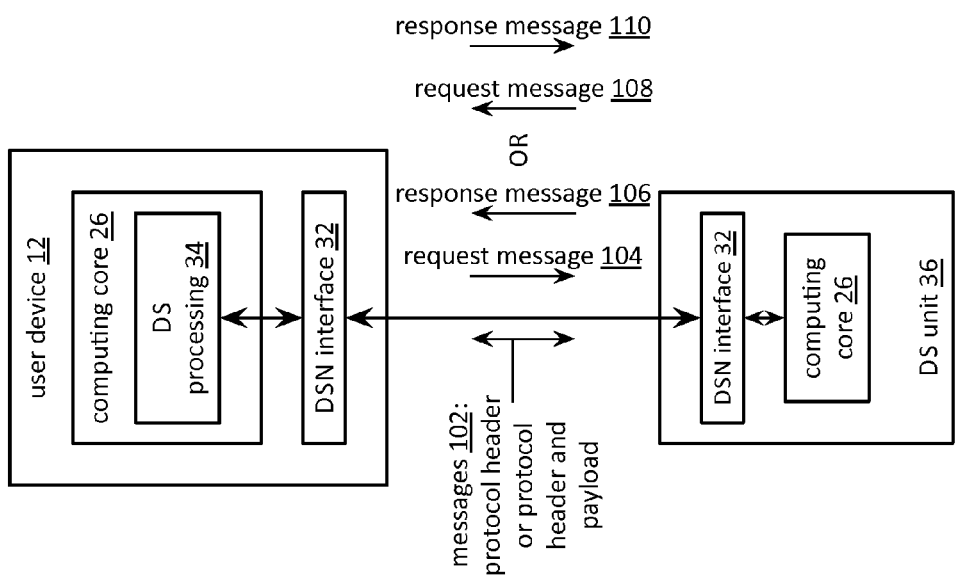
FIG. 6A is a schematic block diagram of another embodiment of a computing system in accordance with the present invention.

FIG. 6A is a schematic block diagram of another embodiment of a computing system which includes a user device 12 and a dispersed storage (DS) unit 36. The user device 12 includes a computing core 26 and a dispersed storage network (DSN) interface 32. The computing core 26 includes a DS processing 34. The DS unit 36 includes a computing core 26 and the DSN interface 32. The user device 12 and the DS unit 36 are operably coupled such that the DSN interface 32 of the user device 12 provides communications with the DS unit 36 via the DSN interface 32 of the DS unit 36. The DSN interface 32 of the user device 12 and the DSN interface 32 of the DS unit 36 generate one or more DSN frames to communicate messages 102 between the user device 12 and the DS unit 36. Such a DSN frame communicates messages 102, wherein the DSN frame includes a protocol header. Alternatively, the DSN frame includes the protocol header and a payload. A format of the DSN is discussed in greater detail with reference to FIG. 6B.

The messages 102 include a request messages 104 108 and response messages 106 110, wherein the response messages 106 110 are formed in response to a corresponding request message of request messages 104 108. A requester generates and sends a request message 104 108 to a responder. The responder generates and sends the response message 106, 110 to the requester. For example, the requester generates and sends a read request message 104 to solicit a retrieval action and the responder generates and sends a corresponding read response message 106 to provide information associated with the read request message 104. As another example, the DS processing 34 of the user device 12 (e.g., the requester) generates a request and outputs the request to the DSN interface 32 of the user device 12. The DSN interface 32 of the user device 12 transforms the request to produce and send the request message 104 to the DS unit 36 (e.g., the responder). The computing core 26 of the DS unit 36 generates a response and outputs the response to the DSN interface 32 of the DS unit 36. The DSN interface 32 of the DS unit 36 transforms the response to produce and send the response message 106 to the user device 12.

Requester and responder roles may change when a request/response message pair is initiated by another unit of the system. For example, DS unit 36 (e.g., the requester) generates and sends the request message 108 to the user device 12 (e.g., the responder). The user device 12 generates and sends the response message 110 to the DS unit 36 in response to receiving the request message 108. Such request/response message pairs may be utilized by any module or unit of the system. The request messages 104, 108 may be sent by one requester to one or more responders such that the same request message 104, 108 is sent to two or more responders when a plurality of responders is selected. Such a selection of a plurality of responders is discussed in greater detail with reference to FIG. 6C.

FIG. 6B is a diagram of an embodiment of a message format for a dispersed storage network (DSN) frame. Such a DSN frame may be utilized to communicate a request message and a response message 102. The DSN frame includes a protocol header 112. Alternatively, the DSN frame includes the protocol header 112 and a payload 114. Such a protocol header 112 includes information to request action and/or provide status. Such a payload 114 includes M payload bytes of supplemental information utilized in further action or in a response related to the information in the protocol header 112.

The protocol header 112 includes one or more of a protocol class field 116, a protocol class version field 118, an operation code field 120, a request/response field 122, a request number field 124, and a payload length field 126. Such a protocol class field 116 contains any number of bytes to specify a sub-protocol identifier to enable a plurality of families of protocols to be utilized. For example, the protocol class field 116 is one byte in length and includes a protocol class value of 01 hex to signify a first protocol class. The protocol class version field 118 contains any number of bytes to specify a sub-protocol version associated with the protocol class 116 enabling a plurality of versions of protocols to be utilized with each protocol class. For example, the protocol class version field is one byte in length and includes a protocol class version value of 01 hex to signify a first protocol class version.

The operation code field 120 contains any number of bytes to specify an operation code associated with a requested action providing message interpretation instructions to a message target. For example, the operation code field is one byte in length and includes an operation code value of a read operation. The request/response field 122 contains any number of bytes to specify whether the message is a request message or a response message. For example, the request/response field 122 is one byte in length and a response/reserve value is indicated by a one-bit flag of the byte (e.g., a most significant bit of the byte). In an instance, a flag value of the one bit flag is zero when the message is a request message. In another instance, the flag value of the one bit flag is one when the message is a response message.

The request number field 124 contains any number of bytes to include a request number value to associate at least one request message with at least one response message. Such a request number value may be produced as at least one of a random number, a random number plus a predetermined number, and based on a previous request number. For example, the request number field 124 is four bytes in length and includes a request number value of 457 to associate a read request message with a read response message when the previous request number value is 456. As another example, the request number field 124 includes a request number value of 5,358 to associate a read response message with a read request message when a request number value of 5,358 is extracted from the read request message.

The payload length field 126 contains any number of bytes to include a payload length value to indicate a number of bytes contained in the payload 114. Such a payload length value may be determined based on one or more of counting bytes of the payload 114, utilizing a predetermined number based on one or more of the protocol class value, the protocol class version value, the operation code value, and the response/reserved value, and utilizing a predetermined formula based on one or more of the protocol class value, the protocol class version value, the operation code value, and the response/reserved value. For example, the payload length field 126 is four bytes in length and includes a payload length value of zero when the operation code value is associated with a write rollback response operation and the response/reserved value is associated with a response message. As another example, the payload length field 126 includes a payload length value of 104 when the operation code value is associated with a read request message and a predetermined formula of $48n+8$ associated with the read request message is utilized (e.g., where n=2 corresponding to 2 slice names).

The payload 114 may be organized into one or more payload fields in accordance with one or more of the values of the protocol class field 116, protocol class version field 118, the operation code field 120, and the request/response field 122. The one or more payload fields include payload bytes 0-M, wherein values of the payload bytes 0-M are establishing accordance with the one or more payload fields. For example, the one or more payload fields include slice name fields when the payload 114 is associated with a read request DSN frame. As another example, the one or more payload fields include one or more encoded data slices when the payload 114 is associated with a read response DSN frame. The method to generate the fields of the DSN frame and to generate values for the fields is discussed in greater detail with reference to FIGS. 6D-18I.

Figure 6C:
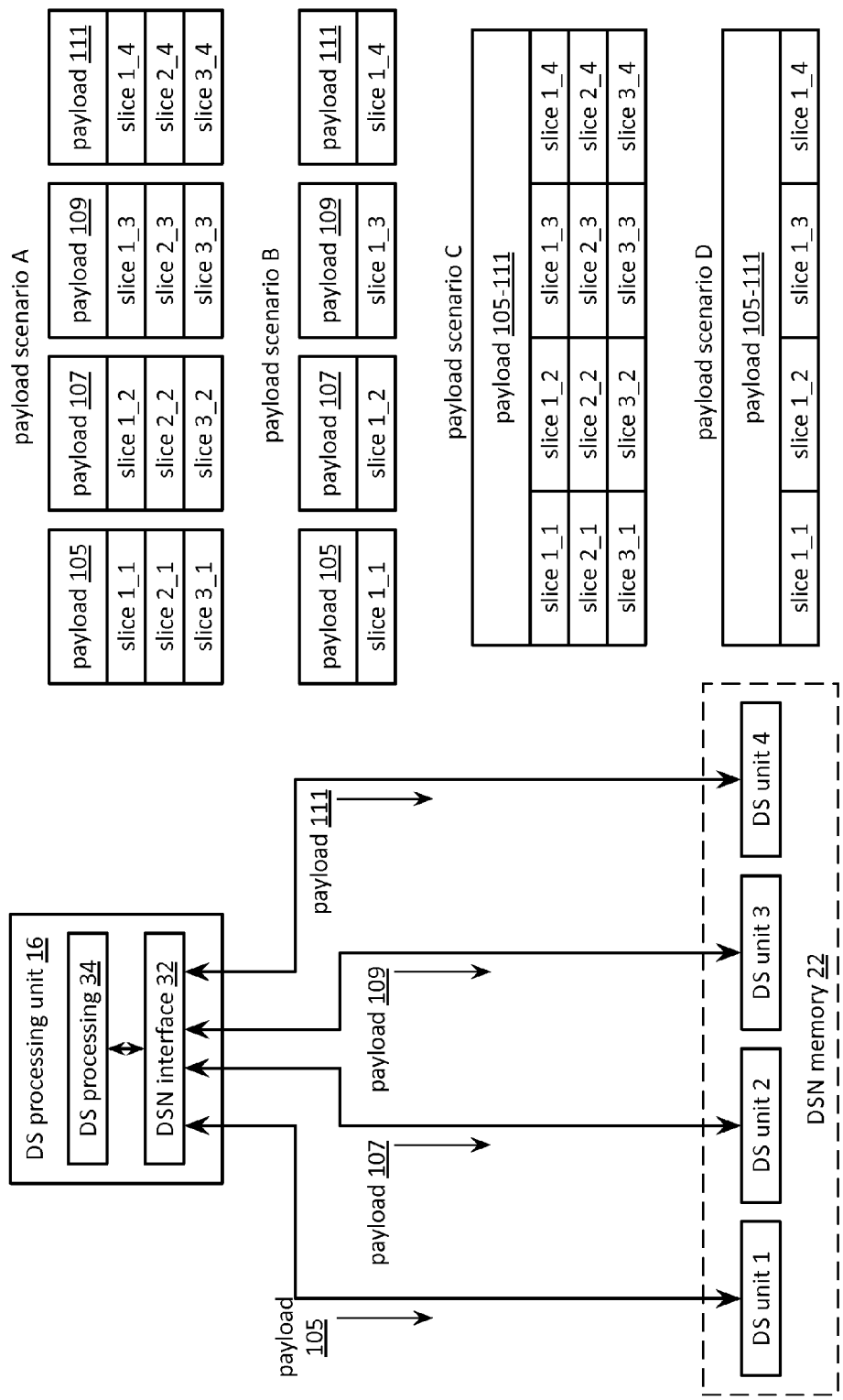
FIG. 6C is a schematic block diagram of another embodiment of a computing system in accordance with the present invention.

FIG. 6C is a schematic block diagram of another embodiment of a computing system that includes a dispersed storage (DS) processing unit 16, a dispersed storage network (DSN) memory 22, and payload scenarios A-D. Such a DS processing unit 16 includes a DS processing 34 and a DSN interface 32. Such a DSN memory 22 includes DS units 1-4 when dispersed storage error coding parameters include a pillar width of 4. The DS processing unit 16 generates one or more request DSN frames wherein each DSN frame includes a payload. The DS processing unit 16 sends the one or more request DSN frames to DS units 1-4. The DS processing unit 16 sends a DSN frame to DS unit 1 that includes a payload 105, sends a DSN frame to DS unit 2 that includes a payload 107, sends a DSN frame to DS unit 3 that includes a payload 107, and sends a DSN frame to DS unit 4 that includes a payload 111. Each payload of the payloads 105-111 may be unique or maybe the same. For example, the DS processing unit 16 produces a plurality of encoded data slices, generates one or more write request messages that include the plurality of encoded data slices within one or more write request DSN frames, and sends the one or more write request DSN frames to the DSN memory 22 to facilitate storing the plurality of encoded data slices in the DS units 1-4.

In an example of operation, the DS processing 34 dispersed storage error encodes data utilizing the dispersed storage error coding parameters to produce 3 sets of encoded data slices 1_1 through 3_4 (e.g., set one includes slices 1-1 through 1_4). The DS processing 34 outputs a write request that includes the three sets of encoded data slices to the DSN interface 32. The DSN interface 32 generates at least one write request DSN frame wherein at least one payload section of the at least one write request DSN frame includes at least one encoded data slice of the three sets of encoded data slices. The DSN interface 32 sends the at least one write request DSN frame to the DS units 1-4 wherein the at least one write request DSN frame sent to DS unit 1 includes payload 105, the at least one write request DSN frame sent to DS unit 2 includes payload 107, the at least one write request DSN frame sent to DS unit 3 includes payload 109, and the at least one write request DSN frame sent to DS unit 4 includes payload 111.

The DSN interface 32 selects at least one encoded data slice of the three sets of encoded data slices to include in each of the payloads 105-111. The DSN interface 32 may select at least one of all slices of a corresponding pillar of the three sets of encoded data slices per payload (e.g., pillar one slices are included in the payload 105), one slice of the corresponding pillar of the three sets of encoded data slices per payload (e.g., one slice of pillar 2 is included in payload 107), all encoded data slices of the three sets of encoded data slices for all payloads 105-111, and one set (e.g., from one data segment) of encoded data slices of the three sets of encoded data slices for all payloads 105-111.

The payload scenarios A-D represent example scenarios indicating which encoded data slices of the three sets of encoded data slices are included in the payloads 105-107. Payload scenario A represents a scenario where the DSN interface 32 selects all slices of the corresponding pillar of the three sets of encoded data slices per payload. For example, the DSN interface 32 selects slices 1_1, 2_1, and 3_1 of pillar 1 to be included in payload 105, slices 1_2, 2_2, and 3_2 of pillar 2 to be included in payload 107, slices 1_3, 2_3, and 3_3 of pillar 3 to be included in payload 109, and slices 1_4, 2_4, and 3_4 of pillar 4 to be included in payload 111. Payload scenario B represents a scenario where the DSN interface 32 selects one slice of the corresponding pillar of the three sets of encoded data slices per payload. For example, the DSN interface 32 selects slice 1_1 of pillar 1 to be included in payload 105, slice 1_2 of pillar 2 to be included in payload 107, slice 1_3 of pillar 3 to be included in payload 109, and slice 1_4 of pillar 4 to be included in payload 111.

Payload scenario C represents a scenario where the DSN interface 32 selects all encoded data slices of the three sets of encoded data slices for all payloads 105-111. For example, the DSN interface 32 selects slices 1_1, 1_2, 1_3, 1_4, 2_1, 2_2, 2_3, 2_4, 3_1, 3_2, 3_3, and 3_4 to be included in each payload of payloads 105-111. Payload scenario D represents a scenario where the DSN interface 32 selects one of encoded data slices of the three sets of encoded data slices for all payloads 105-111. For example, the DSN interface 32 selects slices 1_1, 1_2, 1_3, and 1_4 to be included in each payload of payloads 105-111.

Figure 6D:
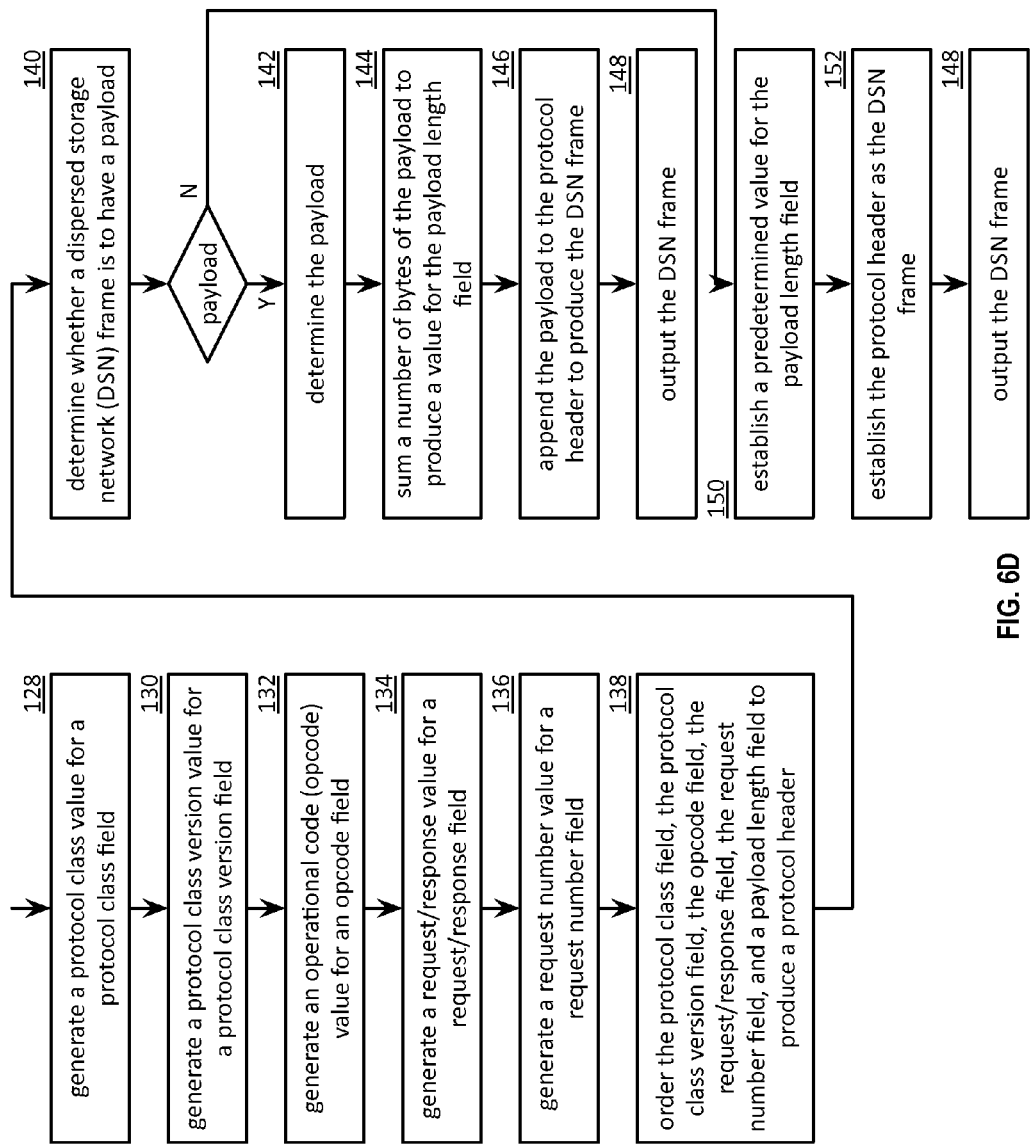
FIG. 6D is a flowchart illustrating an example of generating a protocol header of a dispersed storage network (DSN) frame in accordance with the present invention.

FIG. 6D is a flowchart illustrating an example of generating a protocol header of a dispersed storage network (DSN) frame. The method begins with step 128 where a processing module generates values for a protocol class field, a protocol class version field, and an operation code (opcode) field based on an operational function being communicated by the DSN frame. Such an operational function includes at least one of a read operation, a check operation, a list range operation, a write operation, a checked write operation, a commit operation, a rollback operation, a finalize operation, an undo operation, and a list digest operation.

The processing module generates a protocol class value of the values for the protocol class field by at least one of retrieving the protocol class value from a protocol class list based on the operational function, utilizing the protocol class value of a request DSN frame (e.g., a DSN frame that includes a request message) when the DSN frame is a response DSN frame (e.g., a DSN frame that includes a response message), retrieving the protocol class value from a support protocol class list, and retrieving the protocol class value from a unit-module type protocol class list. For example, the processing module generates a protocol class value of 01 when the protocol class value of a corresponding read request DSN frame has value of 01 and the operational function is a read response.

The method continues at step 130 where the processing module generates a protocol class version field. The processing module generates a protocol class version value of the values for the protocol class version field by at least one of utilizing a most recent protocol class version value, retrieving the protocol class version value from a protocol class version list based on the operational function, utilizing the protocol class version value of a request DSN frame when the DSN frame is a response DSN frame, retrieving the protocol class version value from a support protocol class version list, and retrieving the protocol class version value from a unit-module protocol class version list. For example, the processing module generates a protocol class version value of 03 based on retrieving the most recent protocol class version value from the support protocol class version list.

The method continues at step 132 where the processing module generates an operation code field that includes an opcode value based on one or more of an operational function being communicated by the DSN frame, an opcode list, and a predetermination. For example, the processing module generates the operation code field to include an opcode value of 40 hex when the operational function being communicated by the DSN frame is a read request operation, the protocol class field value is 01, and the protocol class version field value is 03.

The method continues at step 134 where the processing module generates a request/response field to indicate a request message for a request message DSN frame or a response message for a response message DSN frame. For example, processing module generates the request/response field to include a value of zero when the DSN frame is the request message DSN frame. As another example, the processing module generates the request/response field to include a value of one when the DSN frame is the response message DSN frame. The method continues at step 136 where the processing module generates a request number field that includes a request number value by at least one of transforming a random number generator output to produce the value, adding an increment to a previous request number value to produce the value, selecting a predetermined number to produce the value, and utilizing a request number value of a request DSN frame when the DSN frame is a response DSN frame. For example, the processing module generates a request number value of 39,239 in a four byte wide request number field based on the random number generator output. As another example, the processing module generates a request number value of 9,093 when the previous request number value is 9,083 and the increment is 10. As yet another example, the processing module generates a request number value of 277 when the request number value of the request DSN frame is 277 and the DSN frame is a response DSN frame.

The method continues at step 138 where the processing module arranges, in order, the protocol class field, the protocol class version field, the opcode field, the request/response field, the request number field, and a payload length field to produce the protocol header. The method continues at step 140 where the processing module determines whether the DSN frame is to have a payload based on one or more values of one or more of the fields of the protocol header. For example, the processing module determines that the DSN frame is not to have the payload when the opcode value indicates a write commit response operation. As another example, the processing module determines that the DSN frame is to have the payload when the opcode value indicates a read request operation. The method branches to step 151 when the processing module determines that the DSN frame is not to have the payload. The method continues to step 142 when the processing module determines that the DSN frame is to have the payload.

The method continues at step 142 where the processing module determines the payload as one of a request payload for a request message DSN frame and a response payload for a response message DSN frame. Such a determination may be based on one or more of the operational function, the values for the protocol class field, the protocol class version field, the request/response field, and the opcode field. The method to determine the payload is discussed in greater detail with reference to FIGS. 7A-18I.

The method continues at step 144 where the processing module sums a number of bytes of the payload to produce a value for the payload length field. Alternatively, the processing module determines the value utilizing one or more of a payload length formula and a fixed value. Such a determination may be based on one or more of the operational function, the values for the protocol class field, the protocol class version field, the request/response field, and the opcode field. For example, the processing module determines to utilize a payload length formula of 8T to produce the value as a four byte payload length field, where T is the number of transaction numbers, when the operational function is a write commit request operation. As another example, the processing module determines to utilize a fixed value of zero when the operational function is an undo write response operation. As yet another example, the processing module determines to sum number of bytes of the payload to produce the value as a four-byte payload length field when the operational function is a checked write request operation.

The method continues at step 146 where the processing module appends the request payload to the protocol header to produce the request message DSN frame for a request message DSN frame or the processing module appends the response payload to the protocol header to produce the response message DSN frame for a response message DSN frame. The method continues at step 148 where the processing module outputs the DSN frame. For example, the processing module sends the request message DSN frame when the operational function is a write request operation. As another example, the processing module sends the response message DSN frame when the operational function is a write response operation.

The method continues at step 150 where the processing module establishes a value for the payload length field as a predetermined value. For example, processing module establishes the value as zero for the payload field when the DSN frame is not to have a payload. The method continues at step 152 where the processing module establishes the protocol header as the DSN frame. The method continues at step 148 where the processing module outputs the DSN frame.

Figure 7A:
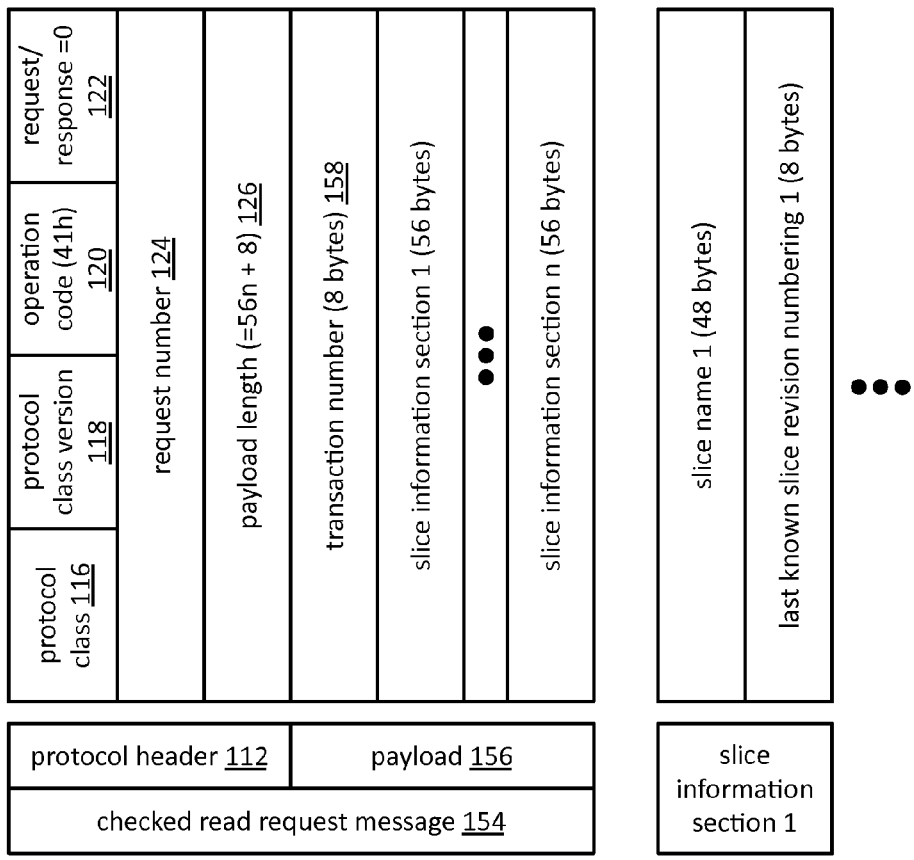
FIG. 7A is a diagram illustrating an example of a dispersed storage network (DSN) data concurrency request message format in accordance with the present invention.

FIG. 7A is a diagram illustrating an example of a dispersed storage network (DSN) data concurrency request message format for a request dispersed storage network (DSN) frame. Such a request DSN frame may include a checked read request message 154 to support a checked read request operational function. The checked read request message 154 includes a protocol header 112 and a payload 156. The protocol header 112 includes one or more of a protocol class field 116, a protocol class version field 118, an operation code field 120, a request/response field 122, a request number field 124, and a payload length field 126. For example, the operation code field 120 includes an operation code value of 41 hex and the request/response field 122 includes a value of zero when the request DSN frame is associated with the checked read request operational function.

The payload 114 includes a transaction number field 158 that includes a transaction number value and one or more slice information sections 1-n associated with the transaction number value. The transaction number field 158 may be utilized to associate two or more request/response DSN frames when a multistep sequence is utilized to accomplish a desired overall function minimizing conflict errors. The transaction number value may be based on elapsed seconds since Jan. 1, 1970 UTC with nanosecond, millisecond, and/or seconds of precision when the operational function is to be completed in a transactional manner and may be set to zero when the operational function is to be completed in a non-transactional manner (e.g., one step or without regard to concurrent operational functions). For example, a transaction number value of eight bytes in length is utilized in the request DSN frame of the checked read request operation.

The one or more slice information sections 1-n correspond to one or more slice names 1-n of the associated checked read request operational function. Each slice information section of the one or more slice information sections 1-n includes a slice name field and a last known slice revision numbering field. The slice name field includes a slice name of the one or more slice names 1-n of the associated checked read request operational function. The last known slice revision numbering field includes a last known revision number of a previously stored encoded data slice of the slice name (e.g., stored locally). For example, a slice information section 1 includes slice name field 1 of 48 bytes in length and last known slice revision numbering field 1 of 8 bytes in length, and a slice information section 2 includes slice name field 2 and last known slice revision numbering field 2 when two slice names are associated with the checked read request operational function. The method to generate the checked read request message 154 is described in greater detail with reference to FIG. 7C.

Figure 7B:
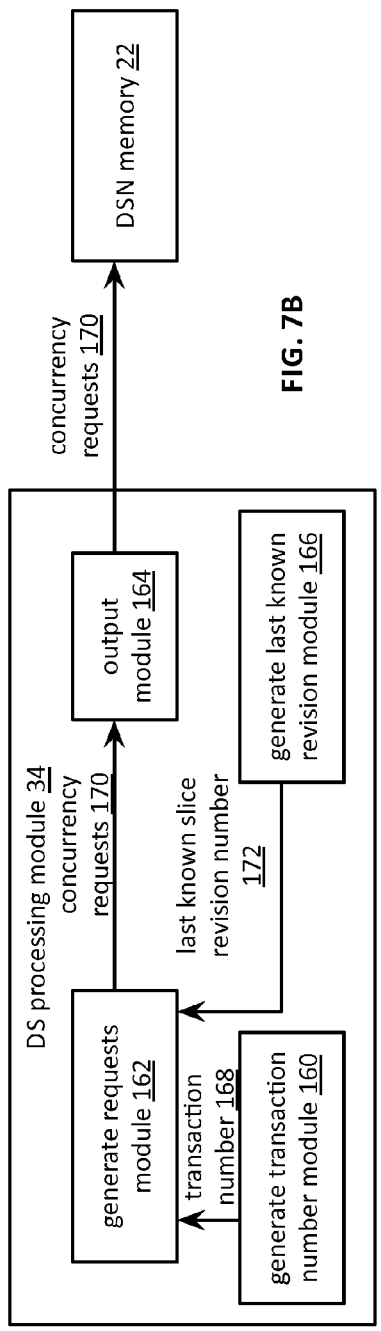
FIG. 7B is a schematic block diagram of an embodiment of a dispersed storage (DS) processing module in accordance with the present invention.

FIG. 7B is a schematic block diagram of an embodiment of a dispersed storage (DS) processing module 34 of a dispersed storage network (DSN) client that includes a generate transaction number module 160, a generate requests module 162, a output module 164, and a generate the last known revision number module 166. For example, the DSN client includes a user device 12. As another example, the DSN client includes a DS processing unit 16. The of DSN client is operable to maintain concurrency of data with a DSN memory 22, wherein a segment of a plurality of segments of the data is encoded into a set of encoded data slices using a dispersed storage error coding function and the set of encoded data slices is stored in the DSN memory 22.

The generate transaction number module 160 is operable to generate a transaction number 168 by obtaining a clock value; multiplying the clock value by a predetermined multiplier to produce an expanded clock value; and summing the expanded clock value and a random number to produce the value, wherein a number of digits of the random number is substantially the same as a number of digits of the predetermined multiplier. The generate requests module 162 is operable to generate at least a threshold number of DSN concurrency requests 170, wherein, each of the at least the threshold number of DSN concurrency requests includes a header section and a payload section; and each of the payload sections includes the transaction number 168, a last known slice revision number 172 (e.g., from a perspective of the client module), and a slice name section (e.g., that includes one or more slice names), wherein, a first slice name section of a first one of the payload sections includes one or more first slice names that includes a first slice name corresponding to a first encoded data slice of the set of encoded data slices; and a second slice name section of a second one of the payload sections includes one or more second slice names that includes a second slice name corresponding to a second encoded data slice of the set of encoded data slices.

Each of the header sections includes a payload length field and at least one of an operation code field, a protocol class field, and a protocol class version field, wherein, a first payload length field of a first one of the header sections includes a first payload length of the first one of the payload sections, a second payload length field of a second one of the header sections includes a second payload length of the second one of the payload sections, each of the operation code fields includes a concurrency request operation code (e.g., 41 hex), each of the protocol class fields includes a protocol class for the concurrency request operation code, and each of the protocol class version fields includes a version of the concurrency request operation code.

The output module 164 is operable to output, in order, the header section, the transaction number, the slice name section, and the last known slice revision number of the payload section for each of the at least the threshold number of DSN concurrency requests 170. The generate the last known revision number module 166 is operable to generate the last known revision number 172 by at least one of selecting the last known revision number 172 from a revision number list, obtaining the last known revision number 172 as a revision number associated with a copy of the data (e.g., locally stored copy), extracting the last known slice revision number 172 from a list range response message, extracting the last known slice revision number 172 from a concurrency response message, and extracting the last known slice revision number 172 from a read response message.

Figure 7C:
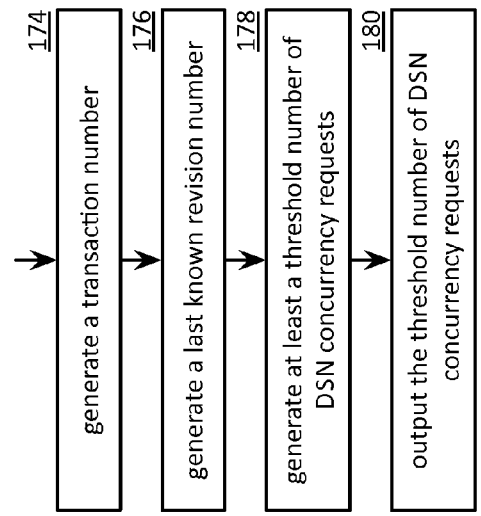
FIG. 7C is a flowchart illustrating an example of generating a dispersed storage network (DSN) data concurrency request message in accordance with the present invention.

FIG. 7C is a flowchart illustrating an example of generating a dispersed storage network (DSN) data concurrency request message for a request DSN frame to support a checked read request operation. The method begins at step 174 where a processing module (e.g., of a DSN client maintaining concurrency of data with a DSN memory, wherein a segment of a plurality segments the data is encoded into a set of encoded data slices using a dispersed storage error coding function and the set of encoded data slices is stored in the DSN memory) generates a transaction number. The generating the transaction number includes obtaining a clock value, multiplying the clock value by a predetermined multiplier to produce an expanded clock value, and summing the expanded clock value and a random number to produce the value, wherein a number of digits of the random number is substantially the same as a number of digits of the predetermined multiplier.

The method continues at step 176 where the processing module generates a last known revision number by at least one of selecting the last known revision number from a revision number list, obtaining the last known revision number as a revision number associated with a copy of the data (e.g., locally stored copy), extracting the last known slice revision number from a list range response message, extracting the last known slice revision number from a concurrency response message, and extracting the last known slice revision number from a read response message.

The method continues at step 178 where the processing module generates at least a threshold number of DSN concurrency requests, wherein, each of the at least the threshold number of DSN concurrency requests includes a header section and a payload section, and each of the payload sections includes the transaction number, the last known slice revision number, and a slice name section, wherein a first slice name section of a first one of the payload sections includes one or more first slice names that includes a first slice name corresponding to a first encoded data slice of the set of encoded data slices, and a second slice name section of a second one of the payload sections includes one or more second slice names that includes a second slice name corresponding to a second encoded data slice of the set of encoded data slices.

Each of the header sections includes a payload length field and at least one of an operation code field, a protocol class field, and a protocol class version field, wherein a first payload length field of a first one of the header sections includes a first payload length of the first one of the payload sections, a second payload length field of a second one of the header sections includes a second payload length of the second one of the payload sections, each of the operation code fields includes a concurrency request operation code, each of the protocol class fields includes a protocol class for the concurrency request operation code, and each of the protocol class version fields includes a version of the concurrency request operation code.

The method continues at step 180 where the processing module outputs, in order, the header section, the transaction number, the slice name section, and the last known slice revision number of the payload section for each of the at least the threshold number of DSN concurrency requests. In addition, the processing module may update a slice status table to indicate that the one or more slice names are associated with a read-lock status to prevent any further modifications of associated encoded data slices until steps associated with the checked read request operation are completed (e.g., encoded data slices are received in response to the DSN concurrency requests).

FIG. 8A is a diagram illustrating an example of a dispersed storage network (DSN) data concurrency response message format of a response DSN frame that includes a checked read response message 182 to support a checked read response operational function. The checked read response message 182 includes a protocol header 112 and a payload 184. The protocol header 112 includes one or more of a protocol class field 116, a protocol class version field 118, an operation code field 120, a request/response field 122, a request number field 124, and a payload length field 126. For example, the operation code field 120 includes an operation code value of 41 hex and the request/response field 122 includes a value of one when the response DSN frame is associated with the checked read response operational function.

The payload 184 includes one or more slice payload sections 1-n that correspond to one or more slice names 1-n of an associated checked read request operational function (e.g., one or more slice names 1-n extracted from a read request DSN frame). Each slice payload section of the one or more slice payload sections 1-n includes fields are in accordance with a checked read operation. The check operation determines whether a last known slice revision number of an associated checked read request operation substantially matches a most recent slice revision number of a previously stored encoded data slice corresponding to a slice name of the associated checked read request operation. A slice payload section of the one or more slice payload sections 1-n includes a check status field 186, a slice revision count field 188, one or more slice revision numbering fields 1-r, one or more slice length fields 1-r, and one or more slice payload fields 1-r, where r represents a slice revision count value of the slice revision count field 188, when the last known slice revision number does not substantially match the most recent slice revision number of the slice name of the associated checked read request operation. Another slice payload section of the one or more slice payload sections 1-n includes the check status field 186 and the slice revision count field 188, when the last known slice revision number substantially matches the most recent slice revision number of the slice name of the associated checked read request operation.

The check status field includes a predetermined check status value to indicate an outcome of the checked read operation. For example, the check status field includes a check status value of zero when the outcome of the checked read operation indicates that the last known slice revision number does not substantially match the most recent slice revision number of the slice name of the associated checked read request operation. As another example, the check status field includes a check status value of one when the outcome of the checked read operation indicates that the last known slice revision number substantially matches the most recent slice revision number of the slice name of the associated checked read request operation.

Such a slice revision count value indicates a number of visible revisions of an associated slice name included in the slice payload section when the outcome of the check operation indicates that the last known slice revision number does not substantially match the most recent slice revision number of the slice name of the associated checked read request operation or the slice revision count value is set to zero when the outcome of the check operation indicates that the last known slice revision number substantially matches the most recent slice revision number of the slice name of the associated checked read request operation. For example, the slice revision count field is four bytes in length and includes a slice revision count value of 7 when 7 encoded data slices of 7 revisions are visible associated with the corresponding slice name when the outcome of the checked read operation indicates that the last known slice revision number does not substantially match the most recent slice revision number of the slice name of the associated checked read request operation.

As another example, the slice revision count value is set to zero when there is no encoded data slice that is associated with the corresponding slice name (e.g., the slice may have been deleted) when the outcome of the checked read operation indicates that the last known slice revision number does not substantially match the most recent slice revision number of the slice name of the associated checked read request operation. As yet another example, the slice revision count value is set to zero when the outcome of the checked read operation indicates that the last known slice revision number substantially matches the most recent slice revision number of the slice name of the associated checked read request operation.

Each slice revision numbering field of the one or more slice revision numbering fields 1-r includes a revision number of the associated slice name. For example, a slice revision numbering field is eight bytes in length and includes a revision number that is greater than other revision numbers of the slice name when an encoded data slice associated with the revision number is a latest encoded data slice of the one or more encoded data slices associated with the slice name. Each slice length field of the one or more slice length fields 1-r for each of the revisions of the slice name includes a length of a corresponding encoded data slice. For example, a slice length field value is set to 4,096 as a number of bytes of the corresponding encoded data slice. As another example, the slice length field value is set to zero when an encoded data slice of the revision of the corresponding slice name does not exist (e.g., the slice was deleted). Each slice payload field of the one or more slice payload fields 1-r for each of the revisions of the slice name includes the corresponding encoded data slice. The slice payload field may be set to zero if the corresponding encoded data slice does not exist. The method to generate the checked read response message is described in greater detail with reference to FIG. 8C.

Figure 8B:
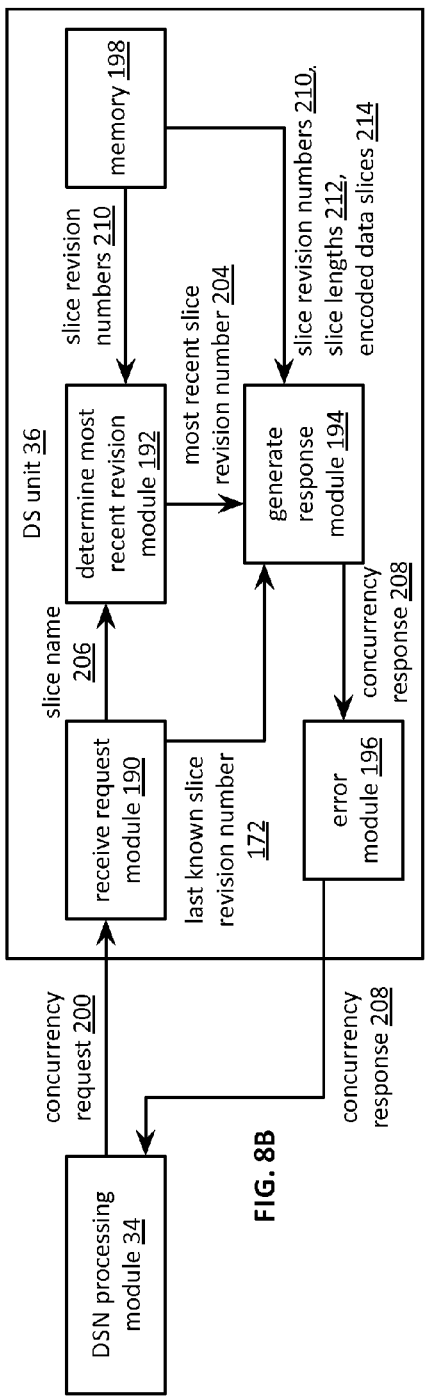
FIG. 8B is a schematic block diagram of an embodiment of a dispersed storage (DS) unit in accordance with the present invention.

FIG. 8B is a schematic block diagram of an embodiment of a dispersed storage (DS) unit 36 that includes a receive request module 190, a determine most recent revision module 192, a generate response module 194, an error module 196, and a memory 198 (e.g., one or more memory devices). The receive request module 190 is operable to receive one of at least a threshold number of dispersed storage network (DSN) concurrency requests 200 that includes a header section and a payload section, wherein the payload section includes a transaction number, a last known slice revision number 172, and a slice name section.

The determine most recent revision module 192 is operable to determine a most recent slice revision number 204 based on a slice name 206 contained in the slice name section. The determining may be based on utilizing the slice name 206 to index into a slice table retreat from memory 198 to extract one or more slice revision numbers 210 corresponding to the slice name 206 and identifying the most recent slice revision number 204 of the one or more slice revision numbers. When the most recent slice revision number 204 substantially matches the last known revision number 172 the generate response module 194 is operable to generate a DSN concurrency response 208 to include a header section and a payload section, wherein the payload section includes a revision match status indication (e.g., 1) and a slice revision count regarding the slice name 206 (e.g., zero or a number of available encoded data slices associated with the slice name).

When the most recent slice revision number 204 does not substantially match the last known revision number 172 the generate response module 194 is operable to generate the DSN concurrency response 208 to include the header section and the payload section, wherein the payload section includes a revision mismatch status indication (e.g., 0), the slice revision count regarding the slice name (e.g., the number of available encoded data slices associated with the slice name), one or more slice revision numbers 210 corresponding to the slice name, one or more slice lengths 212 corresponding to the slice name, and one or more encoded data slices 214 corresponding to the slice name 206. The generating includes accessing memory 198 to retrieve the one or more slice version numbers 210, the one of more slice lengths 212, and the one or more encoded data slices 214.

The header section includes a payload length field and at least one of an operation code field, a protocol class field, and a protocol class version field, wherein, the payload length field includes a length of the payload section, the operation code field includes a concurrency response operation code, the protocol class field includes a protocol class for the concurrency response operation code, and the protocol class version field includes a version of the concurrency response operation code. The error module 196 is operable to determine when an error condition exists based on one or more of the slice name 206 being associated with a locked encoded data slice state, a transaction number error, the slice name 206 is associated with one or more encoded data slices that are unavailable, and one of at least the threshold number of DSN concurrency requests 200 is not authorized, and discard the DSN concurrency response 208 when the error condition exists. The DS unit 36 outputs the DSN concurrency response 208 when the error condition does not exist. For example, the generate response module 194 sends the DSN concurrency response 208 to a requesting entity (e.g., a DS processing module 34 of a DSN client).

Figure 8C:
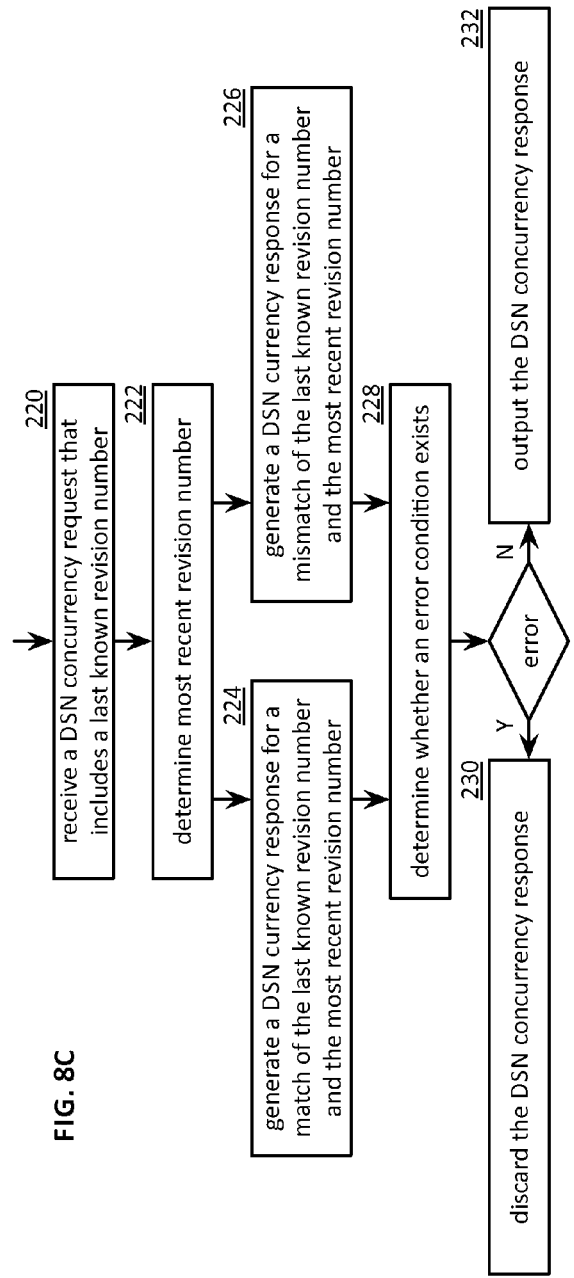
FIG. 8C is a flowchart illustrating an example of generating a dispersed storage network (DSN) data concurrency response message in accordance with the present invention.

FIG. 8C is a flowchart illustrating an example of generating a dispersed storage network (DSN) data concurrency response message to support a checked read response operation. The method begins at step 220 where processing module (e.g., of a dispersed storage (DS) unit) receives one of at least a threshold number of dispersed storage network (DSN) concurrency requests that includes a header section and a payload section, wherein the payload section includes a transaction number, a last known slice revision number, and a slice name section. The method continues at step 222, where, in response to the one of at least the threshold number of DSN concurrency requests, the processing module determines a most recent slice revision number based on a slice name contained in the slice name section.

When the most recent slice revision number substantially matches the last known revision number, the method continues at step 224 where the processing module generates a DSN concurrency response to include a header section and a payload section, wherein the payload section includes a revision match status indication (e.g., 1) and a slice revision count regarding the slice name (e.g., zero or a number of available encoded data slices associated with the slice name). When the most recent slice revision number does not substantially match the last known revision number, the method continues at step 226 where the processing module generates the DSN concurrency response to include the header section and the payload section, wherein the payload section includes a revision mismatch status indication (e.g., 0), the slice revision count regarding the slice name (e.g., the number of available encoded data slices associated with the slice name), one or more slice revision numbers corresponding to the slice name, one or more slice lengths corresponding to the slice name, and one or more encoded data slices corresponding to the slice name.

The header section includes a payload length field and at least one of an operation code field, a protocol class field, and a protocol class version field, wherein, the payload length field includes a length of the payload section, the operation code field includes a concurrency response operation code, the protocol class field includes a protocol class for the concurrency response operation code, and the protocol class version field includes a version of the concurrency response operation code. The method continues at step 228 where the processing module determines when an error condition exists based on one or more of the slice name being associated with a locked encoded data slice state, a transaction number error, the slice name is associated with one or more encoded data slices that are unavailable, and one of at least the threshold number of DSN concurrency requests is not authorized. The method continues at step 230 where the processing module discards the DSN concurrency response when the error condition exists. The method continues at step 232 where the processing module outputs the DSN concurrency response (e.g., to a requesting entity) when the error condition does not exist.

Figure 9:
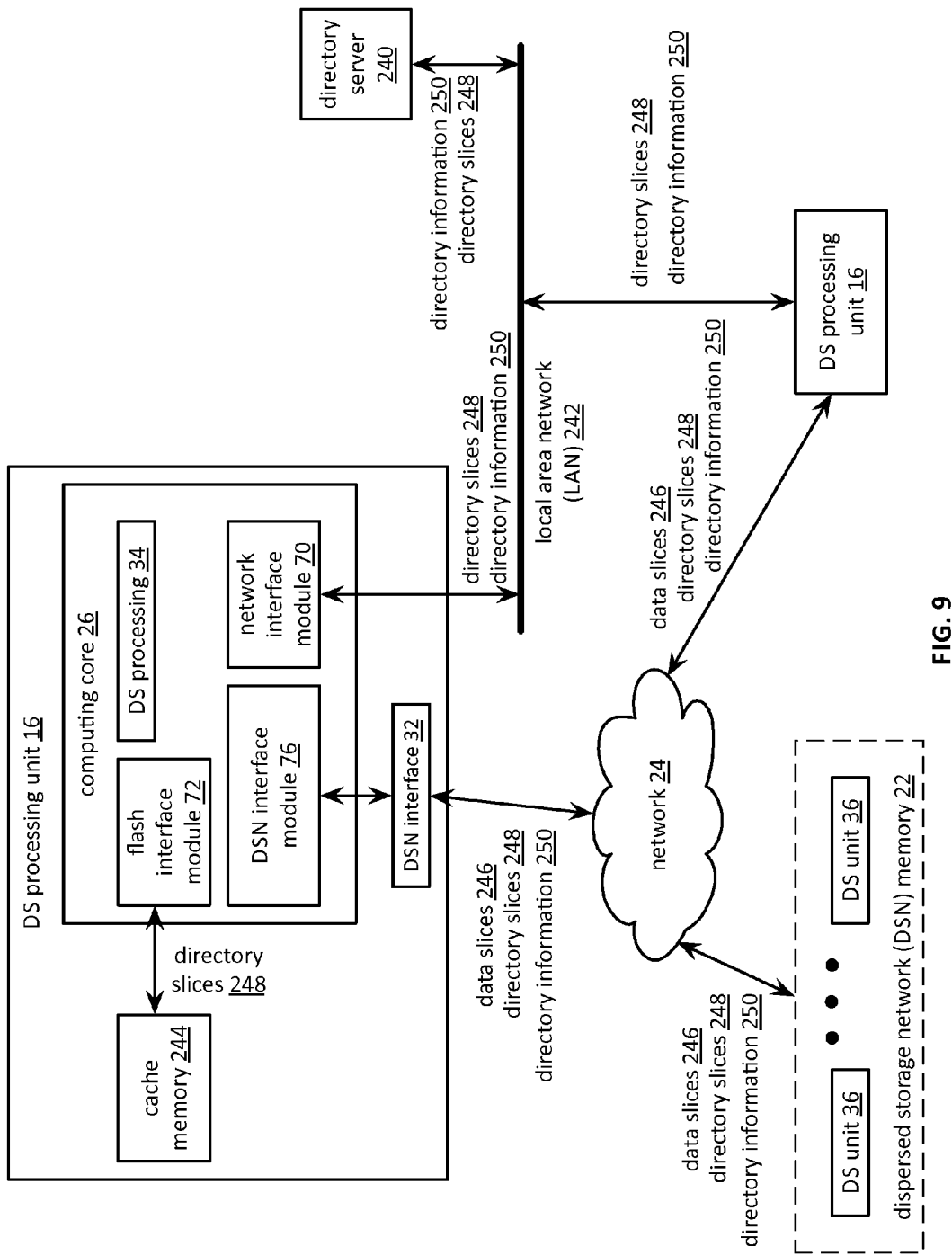
FIG. 9 is a schematic block diagram of another embodiment of a computing system in accordance with the present invention.

FIG. 9 is a schematic block diagram of another embodiment of a computing system that includes one or more dispersed storage (DS) processing units 16, a dispersed storage network (DSN) memory 22, a directory server 240, a network 24, and a local area network (LAN) 242. The LAN 242 may be implemented in accordance with an industry standard to facilitate communications amongst the one or more DS processing units 16 and between at least one of the one or more DS processing units 16 and the directory server 240. The DS processing units 16 includes a computing core 26, a DSN interface 32, and a cache memory 244. The cache memory 244 may be implemented utilizing one or more of flash memory, dynamic access memory, and a magnetic disk drive and provides a local memory function. The computing core 26 includes a DS processing 34, a flash interface module 72, a DSN interface module 76, and a network interface module 70. The DSN memory 22 includes a plurality of DS units 36.

The directory server 240 may include the computing core 26 and memory to facilitate storage of one or more of directory information 250 and directory slices 248. The directory information 250 may include one or more of a filename, a source name associated with the filename, a vault identifier (ID), a generation ID, an object number associated with the file name, a timestamp, an open/completed update status indicator, extended data (e.g., a snapshot ID, a size indicator, a segment allocation table vault source name, a content portion), and an operation indicator (e.g., add, modify, delete). The directory slices 248 may be generated when a directory file associated with the directory information 250 is dispersed storage error encoded producing the directory slices 248.

The DS processing 34 dispersed storage error encodes data to produce a plurality of sets of encoded data slices 246. The computing core 26 outputs the plurality of sets of encoded data slices 246 via the DSN interface module 76 and the DS processing units 16 outputs the plurality of sets of encoded data slices 246 via the DSN interface 32 to send the plurality of sets of encoded data slices as data slices 246 via the network 24 to the DSN memory 22 for storage therein.

The DS processing 34 generates a directory file to include directory information 250 associated with the data. The DS processing 34 dispersed storage error encodes the directory file to produce directory slices 248. The DS processing 34 determines one or more locations (e.g., the cache memory 244 240, the directory server, the DSN memory 22) to store the directory slices 248. The determination may be based on one or more of an access type (e.g., write, modify, delete), a performance requirement, a DSN performance indicator, a predetermination, a lookup, a message, and a command. For example, the DS processing 34 determines to store the directory slices 248 in the cache memory 244 when the performance requirement indicates a low access latency requirement.

The DS processing 34 stores the directory slices 248 at the one or more locations. For example, the computing core 26 outputs the directory slices 248 via the flash interface module 72 to the cache memory 244 for storage therein when the directory slices 248 are to be stored in the cache memory 244. As another example, the computing core 26 outputs the directory slices 248 via the network interface module 72 the LAN for transfer to the directory server 240 when the directory slices 248 are to be stored in the directory server 240. As yet another example, the computing core 26 outputs the directory slices 248 via the DSN interface module 76, the DS processing units 16 outputs the directory slices 248 via the DSN interface 32, and the network 24 communicates the directory slices 248 to the DSN memory 22. The directory slices 248 may be stored utilizing a block vault approach, wherein directory slices 248 of a common pillar are stored in a common file. For example, pillar 3 directory slices are stored in a pillar 3 directory slice file in a third DS unit 36 of the DSN memory 22 when the block vault approach is utilized.

The DS processing unit 16 shares the directory information 250 with at least one other DS processing units 16 of the one or more DS processing units 16. For example, a first DS processing unit 16 generates the directory information 250 to include an open/completed status update indicator that indicates an open status and sends the directory information 250 via the network 24 and/or the LAN to a second DS processing unit 16 when the first DS processing unit 16 initiates a sequence to generate and store encoded data slices 246. The second DS processing unit 16 receives the directory information 250 and determines that the open/completed status update indicator indicates the open status. The second DS processing unit 16 waits for subsequent directory information 250 from the first DS processing unit 16 to indicate a completed status before initiating a second sequence to generate and store encoded data slices 246 corresponding to a directory file associated with the directory information 250. Alternatively, the first DS processing unit 16 sends the directory information 250 via the LAN to the directory server 240 for storage therein. In such a scenario, the second DS processing unit 16 retrieves the directory information 250 via the LAN from the directory server 240.

Figures 10A, 10B:
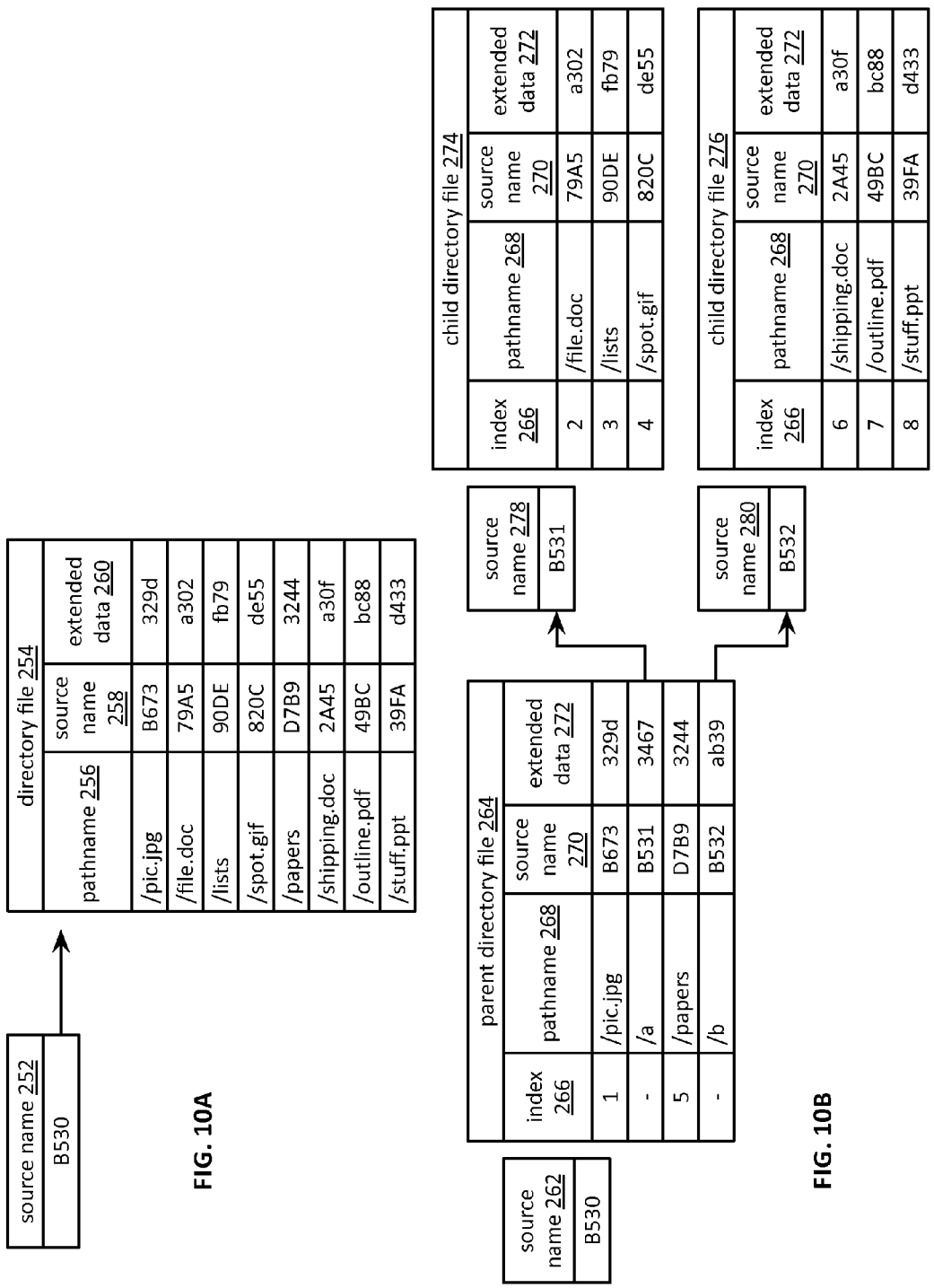
FIG. 10A is a diagram of a directory file structure in accordance with the present invention.
FIG. 10B is a diagram of another directory file structure in accordance with the present invention.

FIG. 10A is a diagram of a directory file structure of a directory file 254 that includes one or more directory file entries associating one or more path names (e.g., a file system path or a filename) to one or more source names. The directory file 254 may include any number of the one or more directory file entries. The directory file structure 254 includes a pathname field 256, a source name field 258, and an extended data field 260. The 254 directory file is dispersed storage error encoded to produce a plurality of sets of encoded directory slices that are stored in a dispersed storage network (DSN) memory at a DSN address corresponding to a source name 252 of the directory file. For example, the directory file is stored in the DSN memory at source name B530.

The pathname field 256 includes a file system path or a file system file name. For example, the pathname field 256 includes a filename of /pic.jpg when a corresponding directory file entry describes an associated file system file name. The source name field 258 includes a source name of the corresponding directory file entry indicating where (e.g., source name DSN address) encoded data slices associated with the directory file entry are stored. For example, a file with a filename of /spot.gif is stored as encoded data slices at a source name of 820C. The extended data field to 60 includes extended data associated with the directory file entry. The extended data includes one or more of a snapshot ID, a timestamp, a size indicator, a segment allocation table source name, metadata, a portion of content, and a revision level number.

In a data retrieval example, encoded directory slices associated with the directory file are retrieved from the DSN memory at source name B530 utilizing a network. The retrieving via the network may introduce undesirable network loading when frequent retrievals of the directory file occur and/or when the directory file is quite large. The encoded directory slices are dispersed storage error decoded to produce the directory file. A desired filename (e.g., outline.pdf) is identified within the directory file. The associated source name (e.g., 49BC) associated with the filename is extracted from the directory file. Encoded data slices associated with data are retrieved from the DSN memory utilizing the source name (e.g., 49BC).

FIG. 10B is a diagram of another directory file structure that includes a parent directory file 264 and one or more child directory files 274-276. The directory file structure provides substantially the same directory file information as a previous directory file represented in FIG. 10A without retrieving a potentially single large directory file. The parent directory file structure 264 includes an index field 266, a pathname field 268, a source name field 270, and an extended data field 272. The index field 266 includes an index number, wherein the index number represents a sorting order of an associated directory file entry that corresponds to a directory file sorting order prior to a restructuring. For example, a parent directory file entry associated with filename /pic.jpg is associated with an index number of 1 when the filename /pic.jpg is associated with an index number of 1 from an associated directory file (e.g., of FIG. 10A) prior to restructuring.

Directory file entries of the previous directory file are represented in the parent directory file 264 (e.g., /pic.jpg, /papers) except for directory file entries pushed into one or more of the child directory files 274-276 as a result of the restructuring. For example, a first child directory file 274 stored at source name B531 includes directory file entries /file.doc, /lists, and /spot.gif, and a second child directory file 276 stored at source name B532 includes directory file entries /shipping.doc, outline.pdf, and /stuff.ppt.

In a data retrieval example of file spot.gif associated with index 4, encoded directory slices associated with the parent directory file 264 are retrieved via a network from the DSN memory at source name B530. The encoded directory slices are dispersed storage error decoded to produce the parent directory file 264. The index field 266 of the parent directory file 264 does not include the index 4. The index field 266 of the parent directory 264 includes indexes 1 and 5. A child directory file:/a is referenced between index 1 and index 5 utilizing a source name of B531. Encoded directory slices associated with the child directory file 274 /a are retrieved from the DSN memory at source name B531 and decoded to produce child directory 274. A source name of 820C is extracted from the child directory file 274 corresponding to an entry for /spot.gif of index 4. Encoded data slices associated with data of spot.gif are retrieved from the DSN memory utilizing the source name (e.g., 820C). The encoded data slices are dispersed storage error decoded to produce data of spot.gif.

The restructuring of a directory file into a parent directory file 264 and one or more child directory files 274-276 may include any number of child directory files 274-276 (e.g., any span width) and any number of levels, wherein a child directory file is further restructured into one or more child directory files. A child directory file 274-276 may include any number of entries. A method to determine a span width per level, a number of entries per child directory file, and a number of levels of child directory files is discussed in greater detail with reference to FIG. 11.

Figure 11:
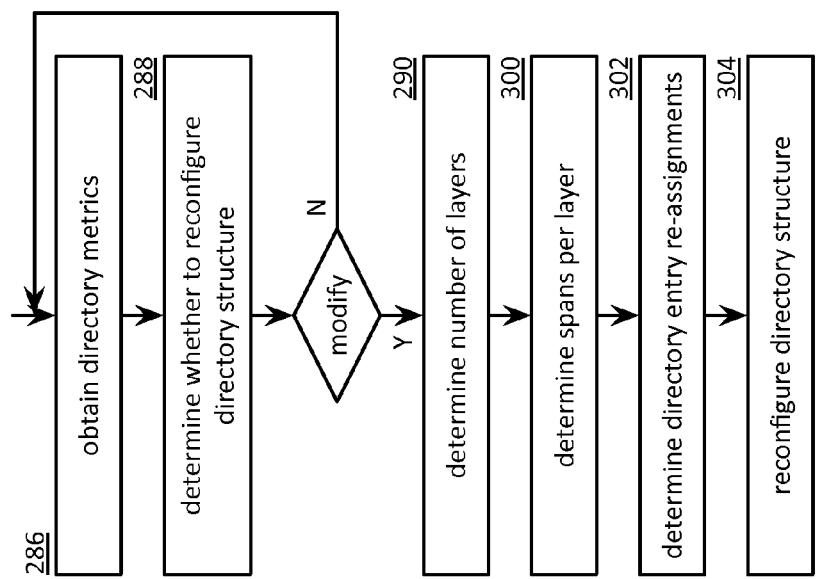
FIG. 11 is a flowchart illustrating an example of reconfiguring a directory file structure in accordance with the present invention.

FIG. 11 is a flowchart illustrating an example of reconfiguring a directory file structure. The method begins at step 286 where a processing module (e.g., of a dispersed storage (DS) processing unit) obtains directory metrics associated with a directory structure. The directory metrics includes one or more of a directory size indicator, a number of entries indicator, an access contention indicator, a dispersed storage network (DSN) access performance level indicator, and a vault identifier (ID). The obtaining may be based on one or more of receiving the directory metrics, a query, and a lookup.

The method continues at step 288 where the processing module determines whether to reconfigure the directory structure based on the directory metrics. For example, the processing module determines to reconfigure the directory structure when the number of entries indicator is greater than an entries threshold level. As another example, the processing module determines to reconfigure the directory structure when the access contention indicator indicates unfavorable contention. For instance, more than a threshold number of access requests per unit of time are received for the directory structure. The method repeats back to step 286 when the processing module determines not to reconfigure the directory structure. The method continues to step 290 when the processing module determines to reconfigure the directory structure.

The method continues at step 290 where the processing module determines a number of layers for a reconfigured directory structure. The determination may be based on one or more of the directory metrics, an estimated performance level, a DSN access performance level goal, and a directory metrics goal. For example, the processing module determines to utilize three layers for the reconfigured directory structure when an estimated performance level corresponding to three layers compares favorably to the DSN access performance level goal.

The method continues at step 300 where the processing module determines a number of spans per layer. The determination may be based on one or more of the directory metrics, the number of layers, a DSN network bandwidth capacity indicator, a DSN network bandwidth utilization indicator, and a DSN network bandwidth utilization goal. For example, the processing module determines more spans per layer such that fewer entries result per directory file of a same layer to achieve a DSN network bandwidth goal as retrieval of smaller directory files utilize less DSN network bandwidth capacity.

The method continues at step 302 where the processing module determines directory entry reassignments. The determination may be based on one or more of a number of entries, the directory metrics, the number of layers, the spans per layer, one or more file IDs, an estimated frequency of access associated with a file ID, and a data type indicator. For example, the processing module determines to reassign file ID 3 to a top layer directory file to reduce access latency based on a data type indicator (e.g., a priority indicator) associated with the file ID. As another example, the processing module determines to reassign file ID 7 to a lower layer directory file where increased access latency is acceptable when an estimated frequency of access associated with file ID 7 is lower.

The method continues at step 304 where the processing module reconfigures the directory structure in accordance with the number of layers, the spans per layer, and the directory entry reassignments to produce the reconfigured directory structure. For example, the processing module creates one or more children directory files, moves one or more directory entries from a parent directory file to the one or more children directory files, and adds pointers associated with the one or more children directory files to the parent directory file.

Figure 12A:
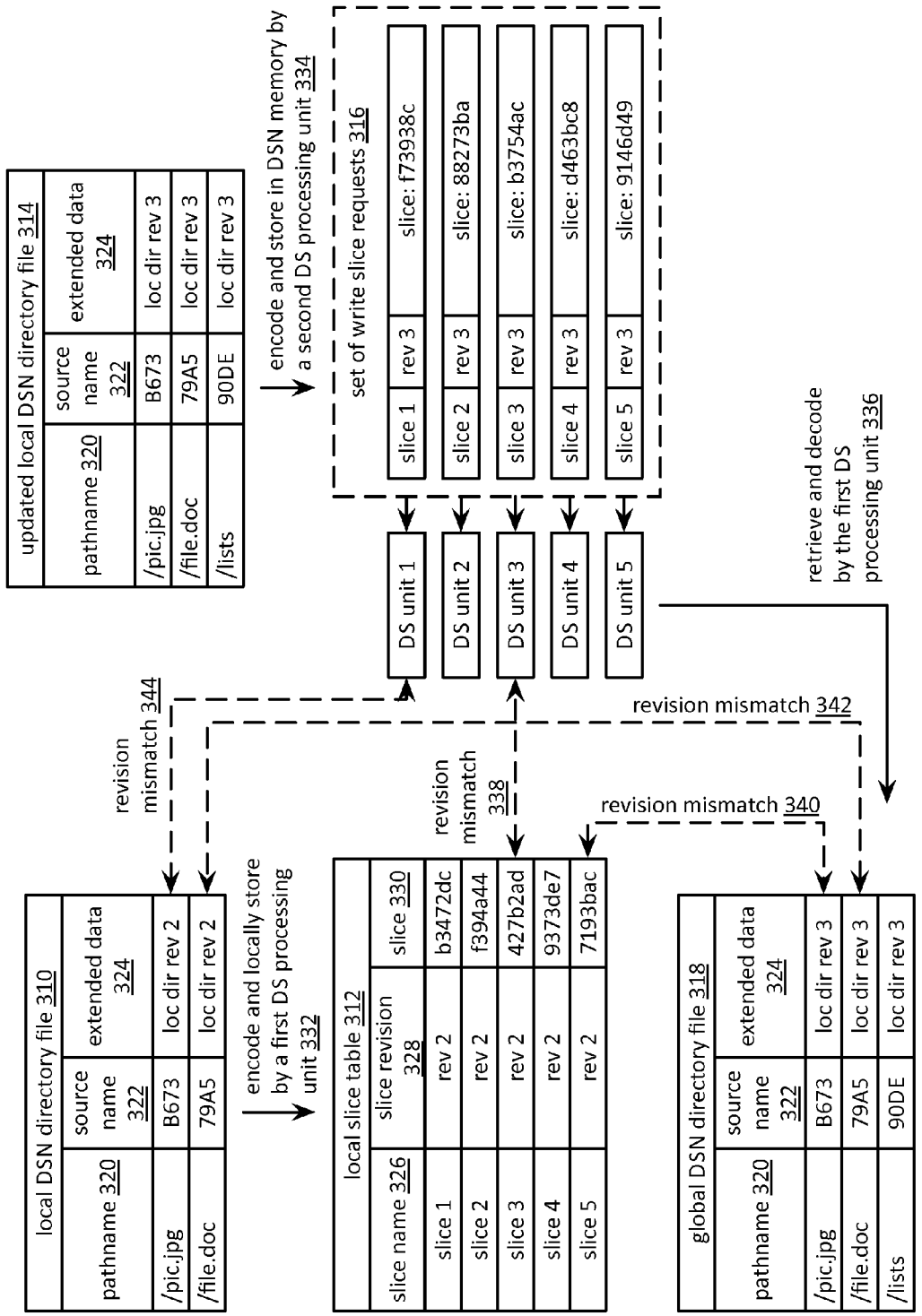
FIG. 12A is a diagram of another directory file structure in accordance with the present invention.

FIG. 12A is a diagram of another directory file structure illustrating an example of determining whether a revision level of a local dispersed storage network (DSN) directory file compares favorably to a revision level of a global DSN directory file. The directory file structure includes a local DSN directory file 310, a local slice table 312, an updated local DSN directory file 314, a set of write slice requests 316, a set of DS units 1-5 and a global DSN directory 318.

The local DSN directory file 310 includes one or more directory file entries that populate each of a pathname field 320, a source name field 322, and an extended data field 324. The local DSN directory file 310 may be utilized to access data stored in a DSN memory. For example, a file pic.jpg is stored as a plurality of sets of encoded data slices at source name B673 with an associated local directory revision level of 2 in the DSN memory. The local DSN directory file 310 may be dispersed storage error encoded to produce at least one set of encoded directory slices and the slices may be stored in a local memory by a first DS processing unit 332 as the local slice table 312.

The local slice table 312 includes a pillar width number of entries that populate a slice name field 326, a slice revision field 328, and a slice field 330. For example, the local slice table 312 includes 5 entries when a pillar width is 5. This listing field 326 includes slice names 1-5, the slice revision field 328 includes an indicator of the associated local directory revision level 2, and the slice field 330 includes the set of encoded directory slices of the local DSN directory file 310.

The updated local DSN directory file 314 includes one or more directory file entries that populate each of the pathname field 320, the source name field 322, and the extended data field 324. For example, a second DS processing unit modifies or adds an entry to the local DSN directory file 310 to produce the updated local DSN directory file 314. For instance, the second DS processing unit adds an entry corresponding to a pathname of /lists stored at a source name of 90DE with a corresponding local directory revision level of 3 (e.g., one level greater than the previous revision level of 2). The second DS processing unit dispersed storage encodes the updated local DSN directory file 314 to produce a set of updated directory slices, generates the set of write slice requests 316, and sends the set of write slice requests 316 to the DSN memory to facilitate storing the updated directory slices in the DSN memory by the second DS processing unit 334.

The set of write slice requests 316 includes a pillar width number of write slice requests, wherein each write slice requests of the pillar width number of write slice requests includes a slice name, a revision level indicator, and slice data. For example, the set of write slice requests 316 includes slice names 1-5, revision level indicators for local directory revision level of 3, and 5 updated encoded directory slices. The 5 updated encoded directory slices are stored in DS units 1-5 and are available for retrieval to produce the global DSN directory file 318.

At path 336, the first DS processing unit retrieves the set of updated directory slices from DS units 1-5 and dispersed storage error decodes the updated directory slices to produce the global DSN directory file 318. The global DSN directory file 318 includes one or more directory file entries that populate each of the pathname field 320, the source name field 322, and the extended data field 324. For example, the first DS processing unit produces the global DSN directory file 318 that is substantially the same as the updated local DSN directory file 314 produced by the second DS processing unit.

The first DS processing unit determines whether the revision level of the local DSN directory file 310 compares favorably to the revision level of the global DSN directory file 318 by identifying at least one revision mismatch of a plurality of possible revision mismatch 338-344. The plurality of possible revision mismatches 338-344 includes a slice-to-slice revision mismatch 338, wherein the mismatch is identified by detecting a slice revision mismatch between a directory slice of the local slice table 312 and a corresponding directory slice of a set of directory slices that make up the global DSN directory file 318, a slice-to-file revision mismatch 340, wherein the mismatch is identified by detecting a revision mismatch between the a directory slice of the local slice table 312 and a revision level of the global DSN directory file 318, a file-to-file revision mismatch 342, wherein the mismatch is identified by detecting a revision mismatch between a revision level of the local DSN directory file 310 and a revision level of the global DSN directory file 318, and a file-to-slice revision mismatch 344, wherein the mismatch is identified by detecting a revision mismatch between a revision level of the local DSN directory file 310 and a corresponding directory slice of the set of directory slices that make up the global DSN directory file 318.

Figure 12B:
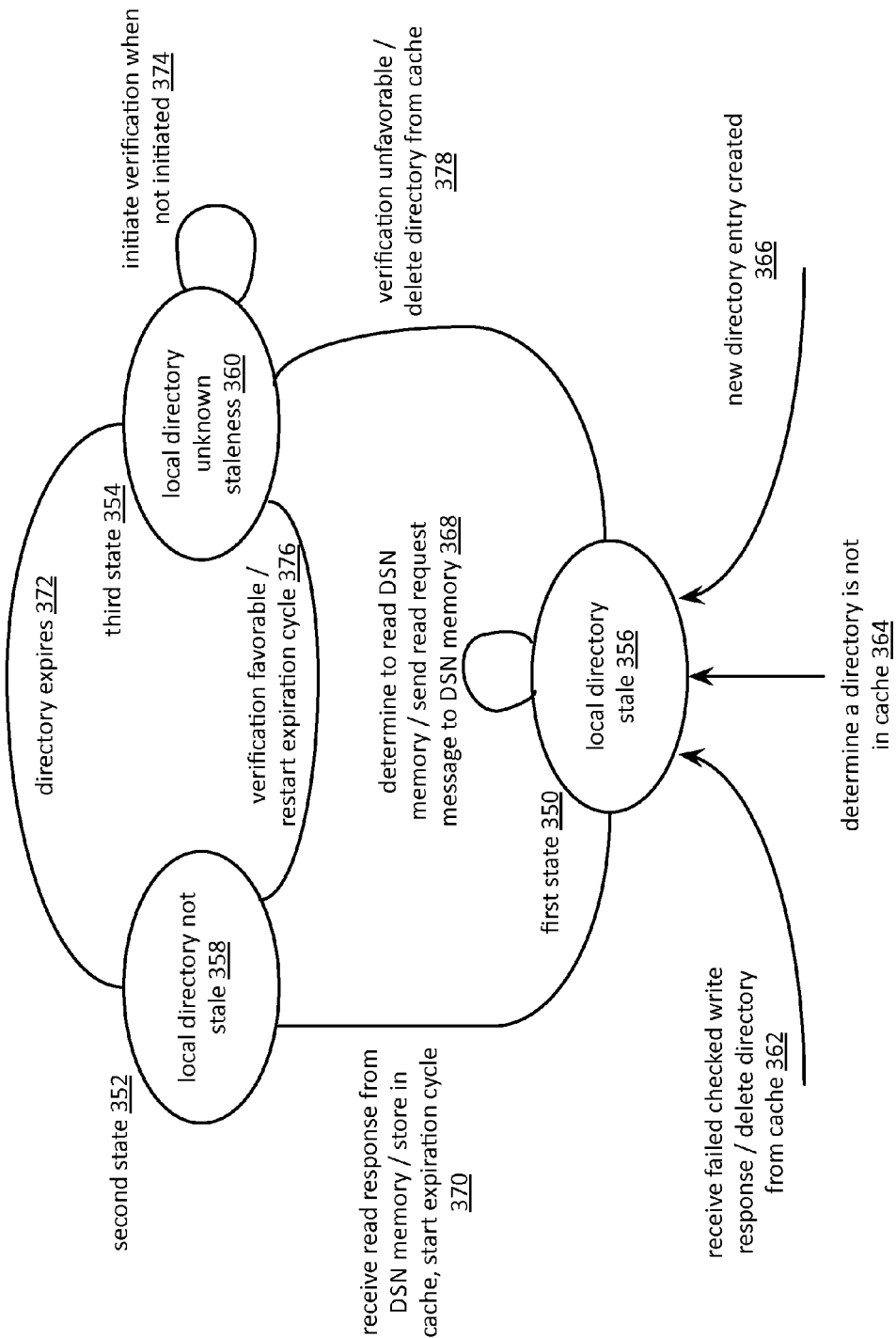
FIG. 12B is a diagram illustrating an example of a dispersed storage network (DSN) local directory staleness state transition diagram in accordance with the present invention.

FIG. 12B is a diagram illustrating an example of a dispersed storage network (DSN) local directory staleness state transition diagram that includes three states related to storage of a directory (e.g., one or more directory files of a directory structure corresponding to a dispersed storage network (DSN)) when the directory may be stored in one or more of a local cache memory (e.g., of a user device, of a dispersed storage (DS) processing unit) and in a DSN memory. The directory state transition diagram may be utilized by a dispersed storage processing module to determine directory synchronization actions based on one or more triggers associated with the directory state transition diagram. The storing of the directory may include one or more of storing the directory file in the cache memory, dispersed storage error encoding the directory file to produce a plurality of sets of encoded directory slices, storing the plurality of sets of encoded directory slices in the DSN memory, and storing a plurality of sets of encoded data slices in the cache memory.

A first state includes when the local directory is stale. A second state includes when the local directory is not stale (e.g., currently stored in the cache memory and does not require verification). The verification verifies that a revision level of a local directory stored in the cache memory compares favorably to a revision level of a global directory retrieved from the DSN memory, wherein the local directory stored in the cache is associated with the global directory retrieved from the DSN memory (e.g., a favorable comparison indicates that the local directory stored in the cache is substantially the same as the global directory retrieved from the DSN memory when synchronized). A third state includes a local directory unknown staleness state (e.g., when the local directory requires verification).

Entry into the first state includes an entry path from any state including when detecting a new directory entry (e.g., one or more entries of one or more directory files) is created, detecting a directory modification, detecting that a directory is not stored in the cache memory, detecting an unfavorable checked write response message has been received, and detecting a directory entry is deleted from the cache memory. For example, a new directory entry is detected when reading a parent directory to attach the new directory entry that associates the new directory entry with the first state. As another example, the global directory is retrieved from the DSN memory and a revision level comparison of the global directory in the local directory stored in the cache memory does not compare favorably.

A determination is made whether to read the global directory from the DSN memory when the local directory is associated with the first state and a read of the global directory has not been initiated. The determination may be based on one or more of a state indicator indicating the first state for the directory, a time period since a last read sequence, and a number of directories associated with the first state where the read of the directory has not been initiated is greater than a read directory threshold number. For example, a determination is made to read the global directory from the DSN memory when five directories are associated with the first state, the read of the five directories has not been initiated, and the read directory threshold number is four. One or more read requests messages are sent to the DSN memory to retrieve the plurality of sets of directory slices of the global directory.

Entry into the second state includes when a favorable number of read response messages are received from the DSN memory regarding the one or more read request message to retrieve the plurality of sets of directory slices of the global directory and when a directory verification is favorable. For example, a decode threshold number of read response messages are received from the DSN memory that includes directory slices of the global directory. The directory slices are dispersed storage error decoded to produce the global directory. The global directory is stored in the cache memory as an updated local directory by at least one of storing the global directory in the cache memory, storing the at least some of the directory slices in the cache memory, dispersed storage error encoding the directory to produce new directory slices and storing the new directory slices in the cache memory. The local directory is associated with the second state. Alternatively, or in addition to, a verification timer is started which is utilized to determine when verification of the local directory stored in the cache memory is required (e.g., when the timer times out).

Entry into the third state includes when verification of the local directory stored in the cache memory is required. For example, a determination is made that the verification timer associated with the directory has expired and the local directory is associated with the third state. A determination is made whether to initiate verification of the local directory when the local directory is associated with the third state and a verification has not been initiated. The determination may be based on one or more of a state indicator indicating the third state for the local directory, a time period since a last verification sequence, and a number of directories associated with the third state where the verification of the local directory has not been initiated is greater than a directory verification threshold number. For example, a determination is made to initiate the verification of the local directory when one directory is associated with the third state, the verification of the one directory has not been initiated, and the directory verification threshold number is zero.

The verification of the directory is initiated by sending one or more DSN concurrency requests (e.g., checked read operations) to the DSN memory to retrieve slice name and revision information of the global directory. Slice name and revision information is received from the DSN memory regarding the global directory. A favorable verification is made when the slice name and revision information compares favorably to slice name and revision information of the local directory retrieved from the cache memory. The directory is associated with the second state when the verification is favorable. The verification timer is restarted associated with the local directory. The local directory is deleted from the cache memory and the local directory is associated with the first state when the verification is unfavorable.

Figure 12C:
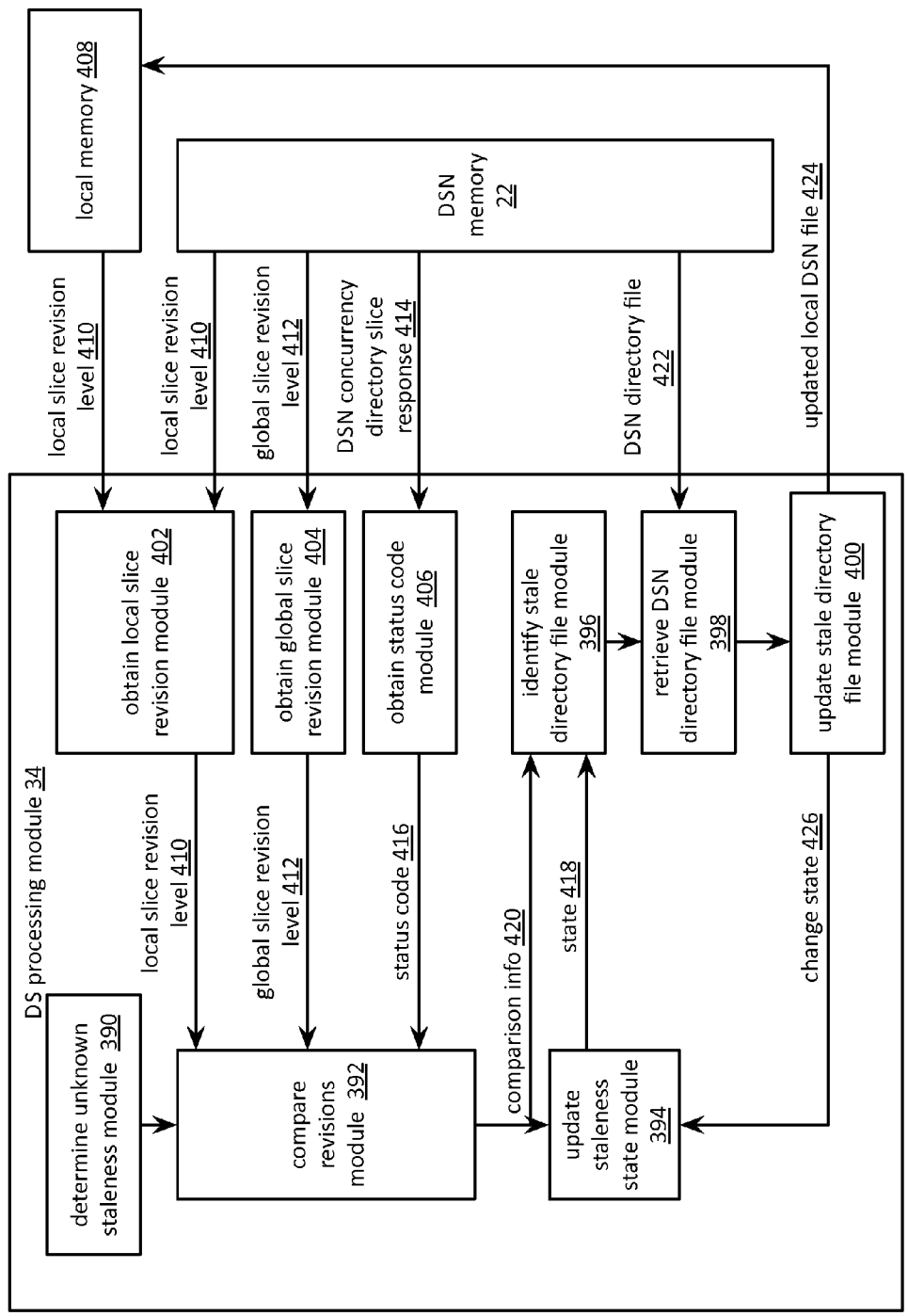
FIG. 12C is a schematic block diagram of another embodiment of a dispersed storage (DS) processing module in accordance with the present invention.

FIG. 12C is a schematic block diagram of another embodiment of a dispersed storage (DS) processing module 34 includes a determine unknown staleness module 390, a compare revisions module 392, an update staleness state module 394, an identify stale directory file module 396, a retrieve DSN directory file module 398, an update stale directory file module 400, an obtain local slice revision module 402, an obtain global slice revision module 404, and an obtain status code module 406. The determine unknown staleness module 390 is operable to determine a state of a dispersed storage network (DSN) local directory to be an unknown staleness state, wherein the DSN local directory includes one or more local DSN directory files, wherein a local DSN directory file of the one or more local DSN directory files includes one or more entries, wherein an entry of the one or more entries includes a path name and a source name, and wherein each of the one or more local DSN directory files is encoded using a dispersed storage error coding function to produce a set of encoded directory slices that is stored in at least one of a DSN memory 22 and a local memory 408 (e.g., cache memory). The entry may further include extended data that includes a local slice revision level 410 (e.g., corresponding to a revision level of the set of encoded directory slices).

The determine unknown staleness module 390 is further operable to determine the DSN local directory to be in the unknown staleness state by determining whether a cycle timer has expired (e.g., time since last determining or last storing of the DSN local directory in the local memory 408 and/or in the DSN memory 22) and when the cycle timer has expired, indicating that the DSN local directory is in the unknown staleness state. The determine unknown staleness module 390 is further operable to determine the state of the DSN local directory is in the unknown staleness state by at least one of detecting creation of a new directory entry within the DSN local directory, detecting modification of an existing directory entry within the DSN local directory, detecting that directory access frequency of the DSN local directory compares unfavorably to an access threshold (e.g., accessing a directory stored in the DSN memory 22 very often), determining that the DSN local directory is not stored in the local memory 408, and receiving a checked write response that includes an indication that the local slice revision level 410 compares unfavorably to a global slice revision level 412 (e.g., a write sequence out of synchronization).

When in the unknown staleness state, the compare revisions module 392 is operable to compare a local revision level of one of the one or more local DSN directory files with a global revision level of a corresponding global DSN directory file. The compare revisions module 392 is further operable to compare the local revision level with the global revision level by comparing the local slice revision level 410 of an encoded directory slice of the set of encoded directory slices of the one of the one or more local DSN directory files with the global slice revision level 412 of a corresponding encoded directory slice of a set of encoded directory slices of the corresponding global DSN directory file. The compare revisions module 392 is further operable to compare the local revision level with the global revision level by comparing the local revision level of one of the one or more local DSN directory files with a global slice revision level 412 of a corresponding encoded directory slice of a set of encoded directory slices of the corresponding global DSN directory file. The compare revisions module 392 is further operable to compare the local revision level with the global revision level by comparing a local slice revision level 410 of an encoded directory slice of the set of encoded directory slices of one of the one or more local DSN directory files with the global revision level of the corresponding global DSN directory file. The compare revisions module 392 is further operable to provide comparison information 420 based on the comparison. For example, the comparison information 420 includes an indicator that the comparison is favorable when the local revision level of one of the one or more local DSN directory files is substantially the same as a most recent revision level of the global revision level of the corresponding global DSN directory file.

The obtain local slice revision module 402 operable to obtain the local slice revision level 410 by one of retrieving the local slice revision level 410 from the DSN memory 22 and retrieving the local slice revision level 410 from the local memory 408. The retrieving the local slice revision level 410 from the DSN memory 22 includes transmitting a read local directory slice request regarding the encoded directory slice to the DSN memory 22 and receiving a read local directory slice response from the DSN memory 22, wherein the response includes the local slice revision level 410.

The obtain global slice revision module 404 is operable to transmit a read global directory slice request regarding the corresponding encoded directory slice to the DSN memory 22 and receive the corresponding encoded directory slice from the DSN memory 22, wherein the corresponding encoded directory slice includes the global slice revision level 412. The obtain status code module 406 is operable to transmit a DSN concurrency directory slice request that includes the local slice revision level 410 to the DSN memory 22, receive a DSN concurrency directory slice response 414, and extract a status code 416 from the DSN concurrency directory slice response 414, wherein the status code 416 indicates whether the local slice revision level 410 compares favorably or unfavorably to the global slice revision level 412.

The update staleness state module 394 is operable to update the state 418 of the DSN local directory to a stale state when the local revision level compares unfavorably to the global revision level. The update staleness state module 394 is further operable to update the state 418 of the DSN local directory to a not-stale state when the local revision level compares favorably to the global revision level. When the DSN local directory is in the stale state, the identify stale directory file module 396 is operable to identify a stale local DSN directory file (e.g., all stale files or files of interest associated with the DSN local directory) of the one or more local DSN directory files (e.g., based on comparison information 420 produced by the compare revisions module 392), the retrieve DSN directory file module 398 is operable to retrieve a corresponding DSN directory file 422 from a global directory that is stored in the DSN memory 22, the update stale directory file module 400 is operable to update the stale local DSN directory file based on the corresponding DSN directory file (e.g., the update stale directory file module 400 sends the corresponding DSN directory file as an updated local DSN directory file 424 to the local memory 408 for storage therein), and the update staleness state module 394 is operable to change the state of the local directory to the not-stale state (e.g., the update stale directory file module 400 sends a change state 416 to the update staleness state module 394 that includes an indicator to change the state to the not-stale state).

Figure 12D:
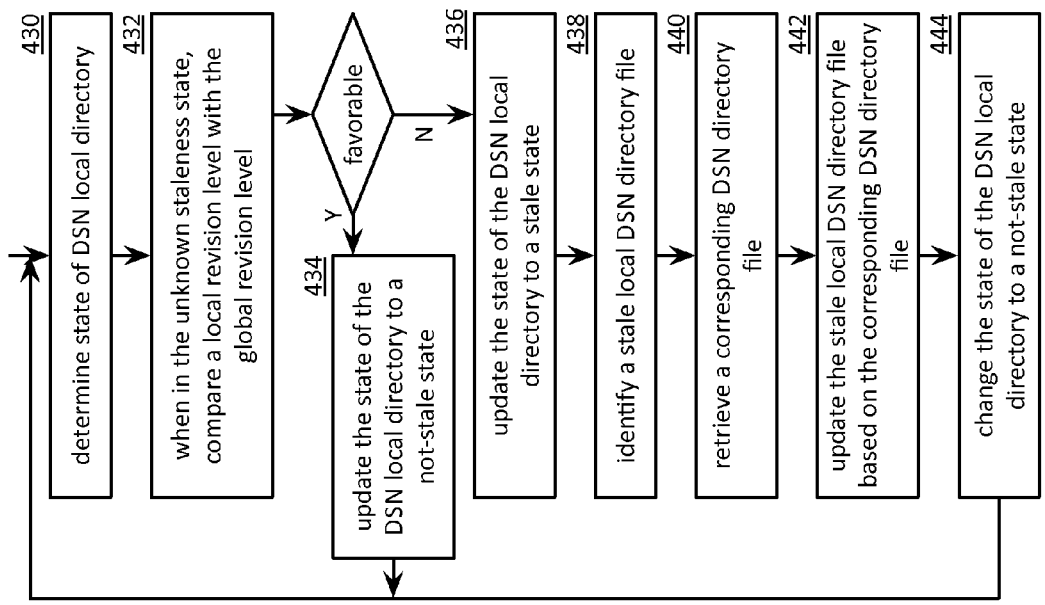
FIG. 12D is a flowchart illustrating an example of determining a dispersed storage network (DSN) local directory staleness state in accordance with the present invention.

FIG. 12D is a flowchart illustrating an example of determining a dispersed storage network (DSN) local directory staleness state. The method begins at step 430 where processing module (e.g., of a dispersed storage (DS) processing unit) determines a state of a DSN local directory to be an unknown staleness state, wherein the DSN local directory includes one or more local DSN directory files, wherein a local DSN directory file of the one or more local DSN directory files includes one or more entries, wherein an entry of the one or more entries includes a path name and a source name, and wherein each of the one or more local DSN directory files is encoded using a dispersed storage error coding function to produce a set of encoded directory slices that is stored in at least one of a DSN memory and a local memory. The entry may further include extended data that includes a local revision level associated with the set of encoded directory slices.

The determining the DSN local directory to be in the unknown staleness state includes determining whether a cycle timer has expired and when the cycle timer has expired, indicating that the DSN local directory is in the unknown staleness state. The determining the state of the DSN local directory is in the unknown staleness state further includes at least one of detecting creation of a new directory entry within the DSN local directory, detecting modification of an existing directory entry within the DSN local directory, detecting that directory access frequency of the DSN local directory compares unfavorably to an access threshold, determining that the DSN local directory is not stored in the local memory, and receiving a checked write response that includes an indication that the local revision level compares unfavorably to the global revision level.

When in the unknown staleness state, the method continues at step 432 where the processing module compares a local revision level of one of the one or more local DSN directory files with a global revision level of a corresponding global DSN directory file. The comparing the local revision level with the global revision level includes comparing a local slice revision level of an encoded directory slice of the set of encoded directory slices of the one of the one or more local DSN directory files with a global slice revision level of a corresponding encoded directory slice of a set of encoded directory slices of the corresponding global DSN directory file. The comparing the local revision level with the global revision level includes comparing the local revision level of one of the one or more local DSN directory files with a global slice revision level of a corresponding encoded directory slice of a set of encoded directory slices of the corresponding global DSN directory file. The comparing the local revision level with the global revision level further includes comparing a local slice revision level of an encoded directory slice of the set of encoded directory slices of one of the one or more local DSN directory files with the global revision level of the corresponding global DSN directory file.

The comparing the local slice revision level of the encoded directory slice of the set of encoded directory slices of the one of the one or more local DSN directory files with the global slice revision level of the corresponding encoded directory slice of the set of encoded directory slices of the corresponding global DSN directory file includes obtaining the local slice revision level by one of retrieving the local slice revision level from the DSN memory (e.g., transmitting a read local directory slice request regarding the encoded directory slice to the DSN memory and receiving a read local directory slice response from the DSN memory, wherein the response includes the local slice revision level) and retrieving the local slice revision level from the local memory, transmitting a read global directory slice request regarding the corresponding encoded directory slice to the DSN memory and receiving the corresponding encoded directory slice from the DSN memory, wherein the corresponding encoded directory slice includes the global slice revision level. The comparing further includes transmitting a DSN concurrency directory slice request that includes the local slice revision level to the DSN memory, receiving a DSN concurrency directory slice response, and extracting a status code from the DSN concurrency directory slice response, wherein the status code indicates whether the local slice revision level compares favorably or unfavorably to the global slice revision level.

The method branches to step 436 when the local revision level compares unfavorably to the global revision level. The method continues to step 434 when the local revision level compares favorably to the global revision level. The method continues at step 434 where the processing module updates the state of the DSN local directory to a not-stale state when the local revision level compares favorably to the global revision level. The method repeats back to step 430.

The method continues at step 436 where the processing module updates the state of the DSN local directory to a stale state when the local revision level compares unfavorably to the global revision level. When the DSN local directory is in the stale state, the method continues at step 438 where the processing module identifies a stale local DSN directory file of the one or more local DSN directory files (e.g., based on the comparing). The method continues at step 440 where the processing module retrieves a corresponding DSN directory file from a global directory that is stored in the DSN memory. That continues at step 442 where the processing module updates the stale local DSN directory file based on the corresponding DSN directory file. The method continues at step 444 where the processing module changes the state of the DSN local directory to the not-stale state. The method repeats back to step 430.

FIG. 13A is a diagram of another directory file structure 452 that includes one or more directory file entries associating one or more file names to one or more source names. The directory file 452 includes one or more directory file entries. The directory file structure 452 includes a pathname field 454, a source name field 456, an extended data field 458, a timestamp field 460, and an operation field 462. The directory file 452 is dispersed storage error encoded to produce a plurality of sets of encoded directory slices that are stored in a dispersed storage network (DSN) memory at a DSN address corresponding to a source name 450 of the directory file 452. For example, the directory file is stored in the DSN memory at source name B530.

The pathname field 454 includes a file system path or a file system file name, wherein two or more directory file entries may include the same filename when each entry is associated with a different revision or an action associated with the operation field 462. The source name field 456 includes a source name of a corresponding directory file entry indicating where (e.g., source name DSN address) encoded data slices associated with the entry are stored. For example, three files with a filename of /pic.jpg are included in three directory file entries and are stored as encoded data slices at three locations of the DSN memory including at source names B673, B674, and B675. The extended data field 458 includes extended data associated with the directory file entry.

The timestamp field 460 includes a timestamp (e.g., of a system clock) associated with the directory file entry indicating when the directory file entry was added to the directory file. For example, a first directory file entry associated with filename /pic.jpg was added at timestamp 00:01:00, a second directory file entry associated with filename /pic.jpg was added at timestamp 00:02:00, and a third directory file entry associated with filename /pic.jpg was added at timestamp 00:03:00.

The operation field 462 includes an operation indicator associated with the directory file entry indicating an operation type. The operation type includes at least one of add (e.g., when a first directory file entry is added to the directory file associated with the filename), modify (e.g., when a subsequent directory file entry is added to the directory file associated with the filename), and delete (e.g., when a directory file entry is added to the directory file associated with deleting encoded data slices associated with the filename). For example, a first directory file entry is associated with an add operation of filename /pic.jpg was initially added to the directory file and encoded data slices associated with a file corresponding to filename/pic.jpg was stored in the DSN memory at timestamp 00:01:00. As another example, a second directory file entry is associated with a modify operation of filename /pic.jpg was subsequently added to the directory file and encoded data slices associated with a second revision of the file corresponding to filename/pic.jpg was stored in the DSN memory at timestamp 00:02:00. As yet another example, a third directory file entry associated with a modify operation of filename /pic.jpg was subsequently added to the directory file and encoded data slices associated with a third revision of the file corresponding to filename/pic.jpg was stored in the DSN memory at timestamp 00:03:00.

In a retrieval example of operation, a directory file entry corresponding to a desired filename is identified to produce an identified directory file entry, wherein the directory file entry is a most recent entry (e.g., most recent timestamp) that is not a delete operation. For example, the third directory file entry associated with the modify operation of filename /pic.jpg is identified as the identified directory file entry when the timestamp 00:03:00 indicates the most recent entry. A source name associated with the identified directory file entry is extracted from the identified directory file entry. For example, source name B675 is extracted from the third directory file entry. A plurality of sets of encoded data slices is retrieved from the DSN memory utilizing the source name. At least some of the plurality of sets of encoded data slices are dispersed storage error decoded to produce a most recent revision of the file /pic.jpg.

Subsequent example directory file entries including a delete operation and a directory compacting function are discussed with reference to FIGS. 13B-13D. The method to modify the directory file is discussed in greater detail with reference to FIG. 14A. The method to compact the directory file is discussed in greater detail with reference to FIG. 14B. The method to utilize the directory file is discussed in greater detail with reference to FIG. 14C.

FIG. 13B is a diagram of another directory file structure 464 that includes the directory file structure discussed with reference to FIG. 13A and an additional directory file entry. A subsequent directory file entry regarding filename /pic.jpg is added to the directory file 464 at a timestamp of 00:05:00, wherein the directory file entry is associated with a delete operation. In a retrieval example of operation, a most recent directory file entry associated with the filename /pic.jpg is identified as a fourth directory file entry when the fourth directory file entry includes a timestamp of 00:05:00 and no other directory file entries are associated with the same filename includes a more recent timestamp. The retrieval fails since the most recent directory file entry is associated with a delete operation. For example, a read request response message is formed that includes a payload field filled with all zeroes to signify that the file associated with filename /pic.jpg has been deleted and cannot be retrieved.

FIG. 13C is a diagram of another directory file structure 466 that includes the directory file structure discussed with reference to FIG. 13B and an additional directory file entry. A subsequent directory file entry regarding filename /pic.jpg is added to the directory file at a timestamp of 00:08:00, wherein the directory file entry is associated with a modify operation. In a retrieval example of operation, a most recent directory file entry associated with the filename /pic.jpg is identified as a fifth directory file entry when the fifth directory file entry includes a timestamp of 00:08:00 and no other directory file entries are associated with the same filename includes a more recent timestamp.

A source name associated with the identified directory file entry is extracted from the identified directory file entry. For example, source name B676 is extracted from the fifth directory file entry. A plurality of sets of encoded data slices is retrieved from a dispersed storage network (DSN) memory utilizing the source name. At least some of the plurality of sets of encoded data slices are dispersed storage error decoded to produce a most recent revision of the file /pic.jpg.

FIG. 13D is a diagram of another directory file structure 468 that includes performing a compacting function on the directory file structure illustrated in FIG. 13C. The compacting function reduces a size of the directory file by deleting one or more directory file entries associated with the directory file structure. The compacting function includes identifying a most recent directory file entry of one or more directory file entries regarding a common filename and determining whether the most recent directory file entry does not include a delete operation. Each of the one or more directory file entries associated with the common filename is deleted when the most recent directory file entry includes the delete operation. The other directory file entries of the one or more directory file entries associated with the common filename are deleted when the most recent directory file entry does not include the delete operation. For example, a fifth directory file entry of the directory file of FIG. 13C is identified as the most recent directory file entry associated with the filename /pic.jpg and the most recent directory file entry is determined to not include the delete operation. Next, the first through the fourth directory file entries are deleted such that only the fifth directory file entry remains to complete the compacting function. The method to compact the directory file is discussed in greater detail with reference to FIG. 14B.

FIG. 14A is a flowchart illustrating an example of modifying a directory file. The method begins with step 470 where a processing module (e.g., of a dispersed storage (DS) processing unit) receives a write command. The write command includes one or more of a filename, a source name, extended data, and data. The method continues at step 472 where the processing module obtains a directory file based on the filename. The method continues at step 474 where the processing module determines a write type based on the write command. For example, the processing module determines the write type as an add operation when the write command is a first write command of the filename. As another example, the processing module determines the write type as a modify operation when the write command is a subsequent write command of the filename. As yet another example, the processing module determines the write type as a delete operation when the write command includes a delete request.

The method continues at step 476 where the processing module generates a new directory entry to include or more of the write type, the filename, a timestamp (e.g., a current clock time), extended data, and a source name. The method continues at step 478 where the processing module modifies the directory file to include the new directory entry producing a modified directory file. For example, processing module appends the new directory entry to the directory file to produce the modified directory file in accordance with a directory file structure.

The method continues at step 480 where the processing module saves the modified directory file. For example, the processing module stores the modified directory file in a cache memory. As another example, the processing module dispersed storage error encodes the modified directory file to produce a plurality of sets of encoded directory slices and sends the plurality of sets of encoded directory slices to a dispersed storage network (DSN) memory for storage therein. As yet another example, the processing module dispersed storage error encodes the modified directory file to produce the plurality of sets of encoded directory slices and stores the plurality of sets of encoded directory slices in the cache memory.

The method continues at step 482 where the processing module performs a write function in accordance with the write command. For example, the processing module dispersed storage error encodes the data to produce a plurality of sets of encoded data slices and sends the plurality of sets of encoded data slices to the DSN memory for storage therein when the write command is associated with one of the add write type and the modify write type. As another example, the processing module generates one or more write request messages, wherein each of the one or more read request messages includes a slice payload field including all zeroes when the write command is associated with the delete write type. Next, the processing module sends the one or more write request messages to the DSN memory.

FIG. 14B is a flowchart illustrating an example of compacting a directory file. The method begins with step 484 where a processing module (e.g., of a dispersed storage (DS) processing unit) obtains a directory file to compact. The obtaining may be based on one or more of receiving a command, receiving a message, identifying the directory file when a number of directory file entries associated with the directory file is greater than an entry threshold, and identifying the directory file when a performance indicator associated with accessing the directory file is unfavorable.

The method continues at step 486 where the processing module identifies entries for the same filename. The identifying may be based on comparing a filename to other filenames of the directory file. The method continues at step 488 where the processing module identifies a most recent write entry for the same filename. The identifying may be based on comparing timestamps associated with the directory file entries for the same filename, wherein an operation associated with the directory file entries includes a write function (e.g., one of add and modify) to identify the most recent write entry. The method continues at step 490 where the processing module identifies other entries for the same filename as the other entries associated with the same filename that are not the most recent write entry for the same filename.

The method continues at step 492 where the processing module deletes encoded data slices corresponding to the other entries for the same filename. For example, the processing module extracts a source name associated with an entry of the other entries and deletes encoded data slices stored in a dispersed storage network (DSN) memory associated with the source name. The method continues at step 494 where the processing module modifies the directory file removing the other entries for the same filename to produce a modified directory file. As such, the modified directory file only includes the most recent write entry. The method continues at step 496 where the processing module saves the modified directory file (e.g., in a cache memory and/or in the DSN memory).

Figure 14C:
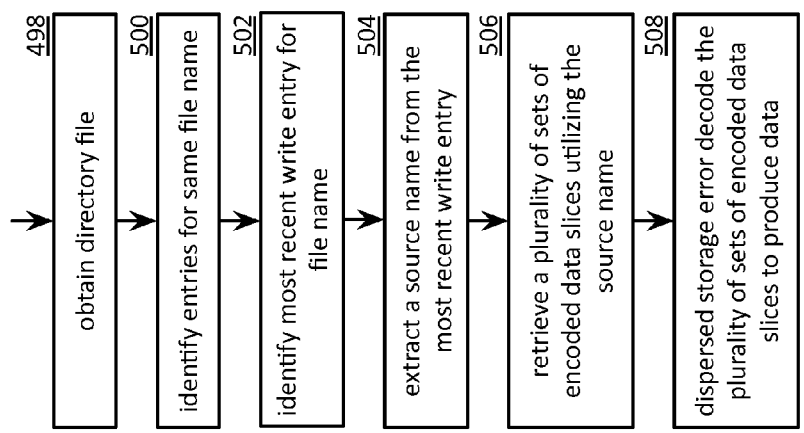
FIG. 14C is a flowchart illustrating an example of utilizing a directory file in accordance with the present invention.

FIG. 14C is a flowchart illustrating an example of utilizing a directory file. The method begins at step 498 where a processing module (e.g., of a dispersed storage (DS) processing unit) obtains a directory file to access (e.g., read). The obtaining may be based on one or more of receiving a command and receiving a message. The method continues at step 500 where the processing module identifies entries for the same filename. The method continues at step 502 where the processing module identifies a most recent write entry for the same filename, wherein the write entry is not associated with a delete. The method continues at step 504 where the processing module extracts a source name from the most recent write entry. For example, the processing module extracts the source name from a source name field of the most recent write entry. The method continues at step 506 where the processing module retrieves at least some of a plurality of sets of encoded data slices from a dispersed storage network (DSN) memory utilizing the source name. The method continues at step 508 where the processing module dispersed storage error decodes the at least some of the plurality of sets of encoded data slices to produce data.

Figure 15A:
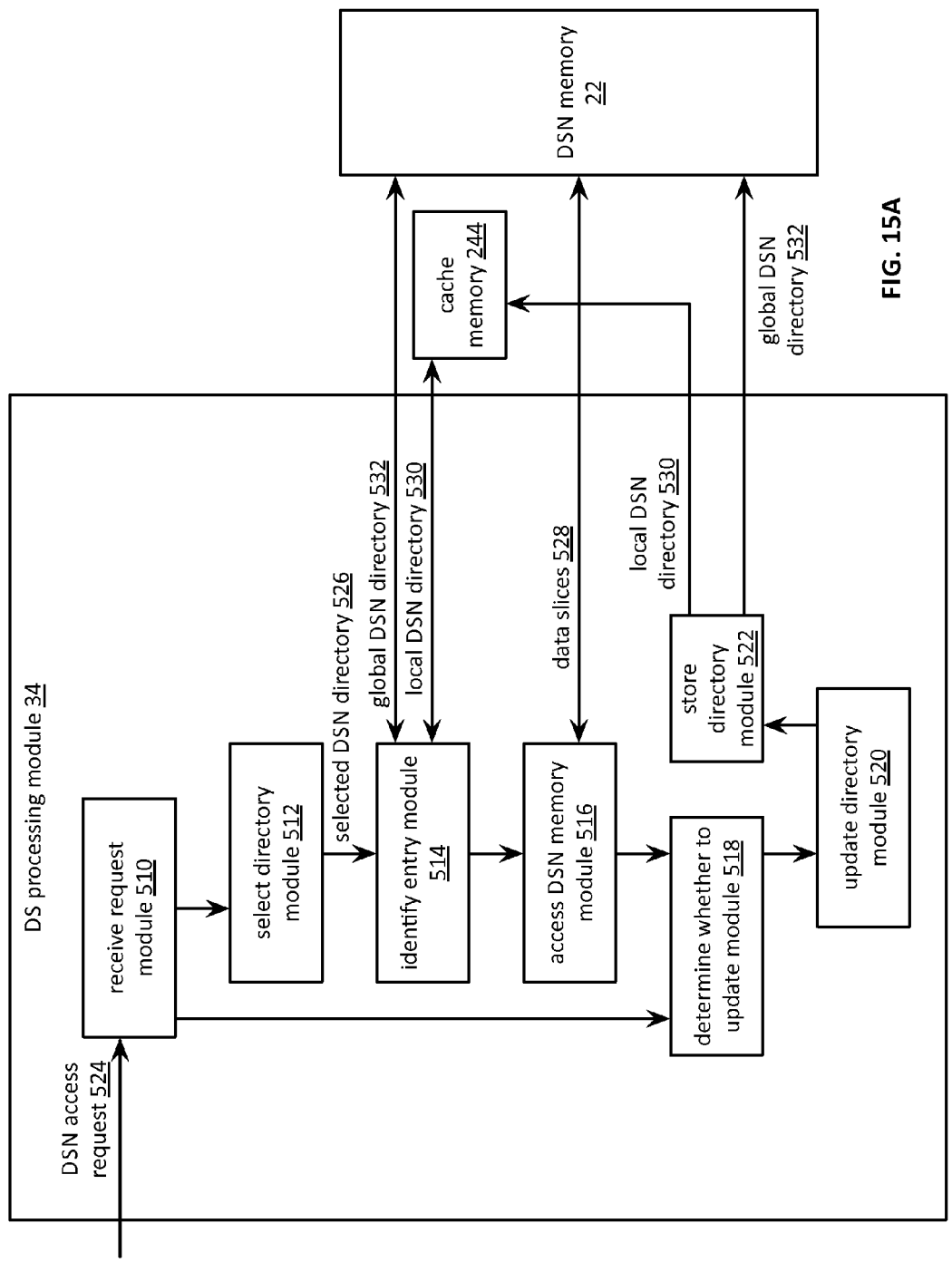
FIG. 15A is a schematic block diagram of another embodiment of a dispersed storage (DS) processing module in accordance with the present invention.

FIG. 15A is a schematic block diagram of another embodiment of a dispersed storage (DS) processing module 34 that includes a receive request module 510, a select directory module 512, an identify entry module 514, an access DSN memory module 516, a determine whether to update module 518, an update directory module 520, and a store directory module 522. The receive request module 510 is operable to receive a dispersed storage network (DSN) access request 524 accessing a DSN memory 22 regarding a set of encoded data slices 528. The DSN access request 524 may include at least one of a read request, a write request, a list request, and a delete request.

The select directory module 512 is operable to select a local DSN directory 530 or a global DSN directory 532 based on the DSN access request 524 to produce a selected DSN directory 526. The select directory module 512 functions to select the local DSN directory 530 or the global DSN directory 532 by identifying the local DSN directory 530 from a plurality of local DSN directories based on a data identification code (e.g., a data identifier (ID), a filename) associated with the DSN access request, identifying the global DSN directory 532 from a plurality of global DSN directories based on the data identification code associated with the DSN access request (e.g., find all DSN directories that are associated with the data ID), and selecting the selected DSN directory 526 based on at least one of access type of the DSN access request, a DSN directory type indicator of the DSN access request, and requestor information of the DSN access request (e.g., user ID, vault ID, etc.). For example, the local DSN directory 530 is selected as the selected DSN directory 526 when the access type of the DSN access request is a read request (e.g., enabling a faster read sequence). As another example, the global DSN directory 532 is selected as the selected DSN directory 526 when the access type of the DSN access request is a write request.

The identify entry module 514 is operable to identify an entry of the selected DSN directory 526 regarding the set of encoded data slices 528 to produce an identified entry. The identify entry module 514 functions to identify the entry of the selected DSN directory 526 by generating the entry when an access type is a write request, wherein the entry includes a data identifier and a source name. Alternatively, the identify entry module 514 functions to identify the entry the selected DSN directory 526 by accessing the selected DSN directory 526. The accessing includes retrieving the selected DSN directory 526 from a local cache memory 244 when the selected DSN directory 526 is the local DSN directory 530. When the selected DSN directory 526 is the global DSN directory 532, the accessing the selected DSN directory 526 includes generating at least one set of read slice requests, wherein each request includes a source name of the global DSN directory 532, sending the at least one set of read slice requests to the DSN memory 22, receiving at least a decode threshold number of read slice responses to produce at least a decode threshold number of encoded global DSN directory slices, and dispersed storage error decoding the at least a decode threshold number of encoded global DSN directory slices to reproduce the at least a portion of the selected DSN directory.

The access DSN memory module 516 is operable to access the DSN memory 22 regarding the set of encoded data slices 528 based on information within the identified entry. The information within the identified entry includes one or more of a data identifier, a pathname, a source name, a set of slice names corresponding to the set of encoded data slices 528, and a revision identifier. The access DSN memory module 516 further functions to access the DSN memory 22 by performing a concurrency test between the entry of the local DSN directory 530 and the entry of the global DSN directory 532 and when a result of the concurrency test is unfavorable (e.g., different revisions), accessing the DSN memory 22 based on the information of the entry in the global DSN directory 532. For example, when the access type is a read request, a set of read slice requests are generated, wherein each read slice request includes a source name of the information within the identified entry, the set of read slice requests are outputted to the DSN memory 22, at least a decode threshold number of read slice responses are received to produce at least a decode threshold number of encoded data slices of the set of encoded data slices 528, and the at least a decode threshold number of encoded data slices are dispersed storage error decoded to reproduce a data segment corresponding to the set of encoded data slices 528. As another example, when the access type is a write request, a data segment of the DSN access request is dispersed storage error encoded to produce the set of encoded data slices 528, a set of write slice requests are generated, wherein the set of write slice requests includes the set of encoded data slices 528 and wherein each write slice request includes the source name, and the set of write slice requests are outputted to the DSN memory 22.

The determine whether to update module 518 is operable to determine whether to update one or more of the local DSN directory 530 and the global DSN directory 532 based on the accessing the DSN memory 22. The determine whether to update module 518 functions to determine whether to update the one or more of the local DSN directory 530 and the global DSN directory 532 by at least one of updating the global DSN directory 532 when the access type is a write access request or a delete access request, updating the global DSN directory 532 and the local DSN directory 530 when the access type is a write access request or a delete access request, and updating the entry within the local DSN directory 530 when a concurrency issues exists with a corresponding entry with the global DSN directory 532. The determine whether to update module 518 further functions to determine to update the local DSN directory 530 and the global DSN directory 532 when at least one of a directory update priority indicator indicates to update both and when a directory storage performance indicator compares unfavorably to a directory storage performance goal (e.g., taking too long to access at least one of the local DSN directory 530 in the global DSN directory 532).

When the one or more of the local DSN directory 530 and the global DSN directory 532 is to be updated, the update directory module 520 is operable to update the one or more of the local DSN directory 530 and the global DSN directory 532 in accordance with the accessing the DSN memory. The update directory module 520 further functions to update the one or more of the local DSN directory 530 and the global DSN directory 532 by deleting the entry from the local DSN directory 530 and the global DSN directory 532 when the access type is a delete request. The store directory module 522 is operable to store the local DSN directory 530 in the cache memory 244 of a computing device executing the method (e.g., may or may not be dispersed storage error encoded) and to store the global DSN directory 532 in the DSN memory 22 as a set of encoded directory slices.

Figure 15B:
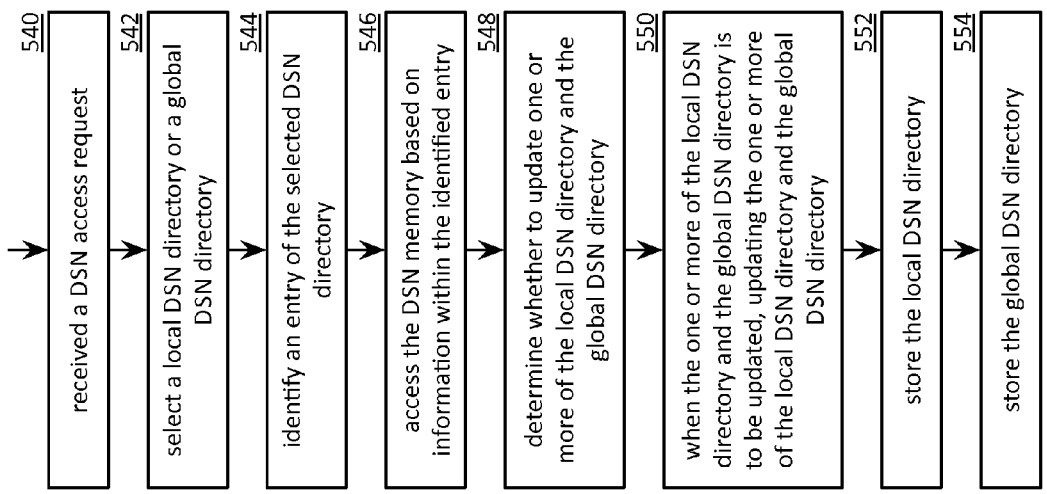
FIG. 15B is a flowchart illustrating an example of accessing a directory file in accordance with the present invention.

FIG. 15B is a flowchart illustrating an example of accessing a directory file. The method begins with step 540 where a processing module (e.g., of a dispersed storage (DS) processing unit) receives a dispersed storage network (DSN) access request accessing DSN memory regarding a set of encoded data slices. The method continues at step 542 where the processing module selects a local DSN directory or a global DSN directory based on the DSN access request to produce a selected DSN directory. The selecting the local DSN directory or the global DSN directory includes identifying the local DSN directory from a plurality of local DSN directories based on a data identification code associated with the DSN access request, identifying the global DSN directory from a plurality of global DSN directories based on the data identification code associated with the DSN access request (e.g., find all DSN directories that are associated with the access request), selecting the selected DSN directory based on at least one of access type of the DSN access request (e.g. write, read, list, delete), a DSN directory type indicator of the DSN access request, and requestor information of the DSN access request (e.g., user identifier (ID), vault identifier, etc.). For example, the processing module utilizes a user ID of the DSN access request as an index to retrieve a source name and DSN ID of the global DSN directory from a directory list to select the global DSN directory when the access type is a write request.

The method continues at step 544 where the processing module identifies an entry of the selected DSN directory regarding the set of encoded data slices to produce an identified entry. The identifying the entry of the selected DSN directory includes generating the entry when an access type is a write request, wherein the entry includes a data identifier and a source name. The identifying further includes accessing the selected DSN directory. The accessing the selected DSN directory includes retrieving the selected DSN directory from a local cache memory when the selected DSN directory is the local DSN directory. When the selected directory is the global DSN directory, the accessing the selected DSN directory includes generating at least one set of read slice requests, wherein each request includes a source name of the global DSN directory, sending the at least one set of read slice requests to the DSN memory, receiving at least a decode threshold number of read slice responses to produce at least a decode threshold number of encoded global DSN directory slices, and dispersed storage error decoding the at least a decode threshold number of encoded global DSN directory slices to reproduce the at least a portion of the selected DSN directory.

The method continues at step 546 where the processing module accesses the DSN memory regarding the set of encoded data slices based on information within the identified entry. The information within the identified entry includes one or more of a data identifier, a pathname, a source name, a set of slice names corresponding to the set of encoded data slices, and a revision identifier. The accessing the DSN memory further includes performing a concurrency test between the entry of the local DSN directory and the entry of the global DSN directory, and when a result of the concurrency test is unfavorable, accessing the DSN memory based on the information of the entry in the global DSN directory. For example, when the access type is a read request, the processing module generates a set of read slice requests, wherein each read slice request includes a source name of the information within the identified entry, sends the set of read slice requests to the DSN memory, receives at least a decode threshold number of read slice responses to produce at least a decode threshold number of encoded data slices of the set of encoded data slices, and dispersed storage error decodes the at least a decode threshold number of encoded data slices to reproduce a data segment corresponding to the set of encoded data slices. As another example, when the access type is a write request, the processing module dispersed storage error encodes a data segment of the DSN access request to produce the set of encoded data slices, generates a set of write slice requests, wherein the set of write slice requests includes the set of encoded data slices and wherein each write slice request includes the source name, and sends the set of write slice requests to the DSN memory.

The method continues at step 548 where the processing module determines whether to update one or more of the local DSN directory and the global DSN directory based on the accessing the DSN memory. The determining whether to update the one or more of the local DSN directory and the global DSN directory includes at least one of updating the global DSN directory when the access type is a write access request or a delete access request, updating the global DSN directory and the local DSN directory when the access type is a write access request or a delete access request, and updating the entry within the local DSN directory when a concurrency issues exists with a corresponding entry with the global DSN directory.

When the one or more of the local DSN directory and the global DSN directory is to be updated, the method continues at step 550 where the processing module updates the one or more of the local DSN directory and the global DSN directory in accordance with the accessing the DSN memory. The updating the one or more of the local DSN directory and the global DSN directory further includes deleting the entry from the local DSN directory and the global DSN directory when the access type is a delete request. When the local DSN directory is to be updated, the method continues at step 552 where the processing module stores at least a portion (e.g., an entry, a directory file including an updated portion) of the local DSN directory in cache memory of a computing device executing the method (e.g., as a data file, as encoded directory slices). When the global DSN directory is to be updated, the method continues at step 554 where the processing module stores at least a portion (e.g., a directory file of a set of directory files that comprise the global DSN directory, wherein the directory file includes an updated portion of the global DSN directory) of the global DSN directory in the DSN memory as a set of encoded directory slices.

Figure 16A:
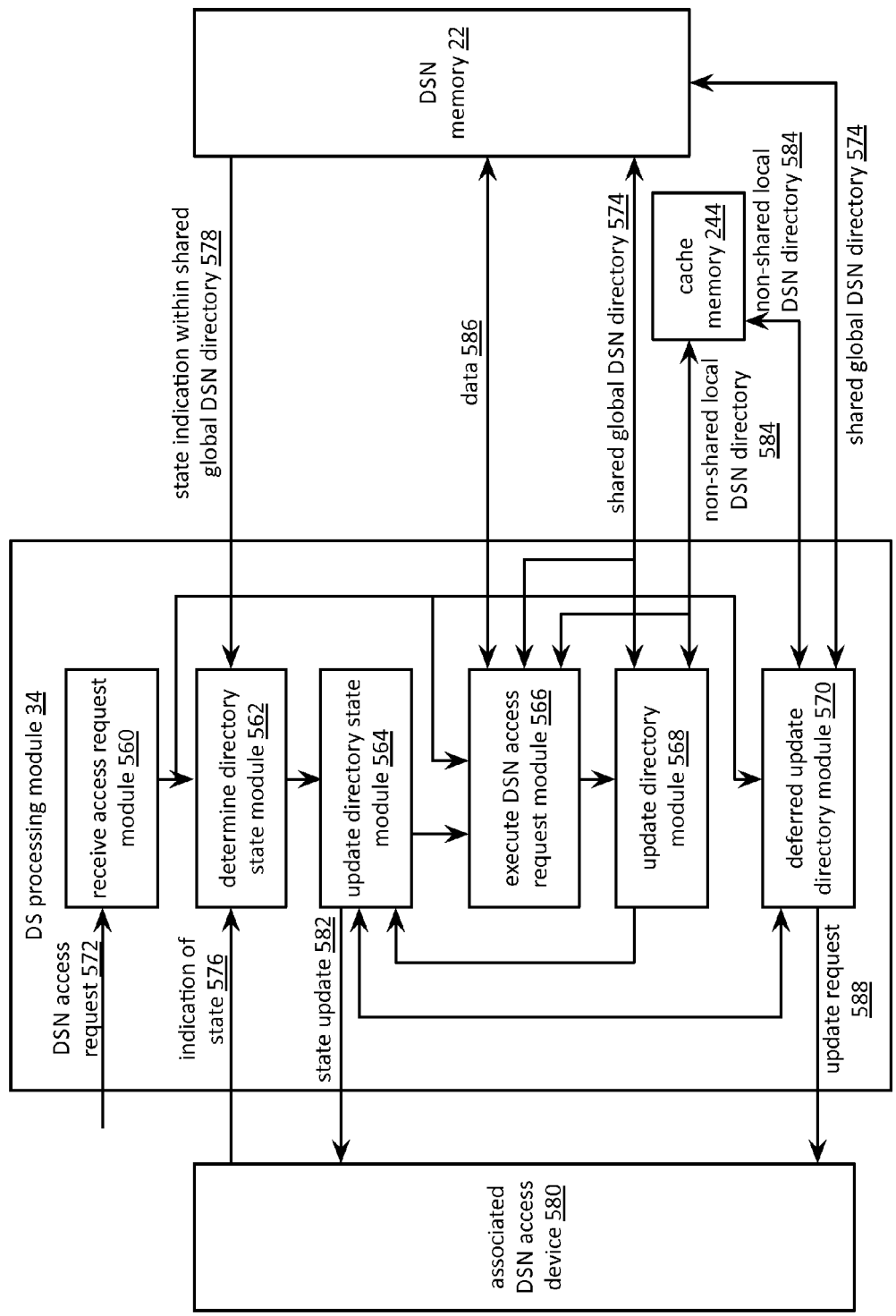
FIG. 16A is a schematic block diagram of another embodiment of a dispersed storage (DS) processing module in accordance with the present invention.

FIG. 16A is a schematic block diagram of another embodiment of a dispersed storage (DS) processing module 34 that includes a receive access request module 560, a determine directory state module 562, an update directory state module 564, an execute DSN access request module 566, an update directory module 568, and a deferred update directory module 570. The receive access module 560 is operable to receive a dispersed storage network (DSN) access request 572 accessing a DSN memory 22, wherein the DSN access request 572 includes a write function, a delete function, or a modify function. Alternatively, the DSN access request 572 includes any access function that requires modifying a DSN directory associated with data stored in a DSN memory 22. The DSN access request 572 includes one or more of a data identifier (ID), a filename, a pathname, a user ID, a vault ID, and an access type.

In response to the DSN access request 572, the determine directory state module 562 is operable to determine state of a shared global DSN directory 574. The shared global DSN directory 574 may be shared by a plurality of associated DSN access devices 580 (e.g., devices and/or modules associated with a common vault including a user device, a DS processing unit, a DS processing module) as a common DSN directory for the data stored in the DSN memory 22. The state includes at least a ready-for-modification state and a modification state. For example, the state of the shared global DSN directory 574 is in the modification state when another associated DSN access device 580 is updating the shared global DSN directory 574 as a result of writing new data to the DSN memory 22. As another example, the state of the shared global DSN directory 574 is in the ready-for-modification state when no other associated DSN access device 580 is updating the shared global DSN directory 574.

The determine directory state module 562 functions to determine state of the shared global DSN directory 574 by at least one of receiving an indication of the state 576 of the shared global DSN directory (e.g., from at least one of the associated DSN access devices 580), detecting the modification state when an open shared global DSN directory update request for another DSN access request exists (e.g., not yet at finalize state amongst a write state, a commit state and the finalize state), detecting the state of the shared global DSN directory based on an indication 578 within the shared global DSN directory (e.g., retrieving the shared global DSN directory 574 and extracting the state).

When the shared global DSN directory 574 is in a ready-for-modification state, the update directory state module 564 is operable to update state of the shared global DSN directory to the modification state. The update directory state module 564 is further operable to identify one or more associated DSN access devices 580 and send state updates 582 of the shared global DSN directory to the one or more associated DSN access devices 580. For example, the update directory state module 564 identifies the one or more associated DSN access devices 580 based on a vault lookup for devices of a common vault associated with the data, sends a state update 582 to the one or more associated DSN access devices 580, wherein the state update 582 includes an indication of the modification state. Alternatively, the update directory state module 564 modifies the shared global DSN directory 574 to include an indication of the modification state.

The execute DSN access request module 566 is operable to execute the DSN access request 572 in accordance with at least one of a non-shared local DSN directory 584 and the shared global DSN directory 574. Each associated DSN access device of the one or more associated DSN access devices 580 may include an associated non-shared local DSN directory 584. The update directory module 568 is operable to update the non-shared local DSN directory 584 and the shared global DSN directory 574 in accordance with execution of the DSN access request 572. When the DSN access request 572 is the write function, the execute DSN access request module 566 is operable to execute the DSN access request 572 by generating information regarding storing data 586 into the DSN memory 22, and the update directory module 568 is operable to update the non-shared local DSN directory 584 by creating an entry in the non-shared local DSN directory 584 to include the information regarding storing the data 586 and is operable to update the shared global DSN directory 574 by creating an entry in the shared global DSN directory 574 to include the information regarding storing the data 586.

When the DSN access request is the modify function, the execute DSN access request module 566 is operable to execute the DSN access request 572 by identifying an entry in the non-shared local DSN directory 584 or the shared global DSN directory 574 to retrieve storage information and to execute the DSN access request 572 in accordance with the storage information, and the update directory module 568 is operable to update the entry of the non-shared local DSN directory 584 in accordance with the execution of the DSN access request 572 (e.g., adding a new revision number) and to update the entry of the shared global DSN directory 574 in accordance with the execution of the DSN access request 572.

When the DSN access request is the delete function, the execute DSN access request module 566 is operable to execute the DSN access request 572 by identifying an entry in the non-shared local DSN directory 584 or the shared global DSN directory 574 to retrieve storage information and executing the DSN access request 572 in accordance with the storage information, and the update directory module 568 is operable to delete the entry of the non-shared local DSN directory 584 in accordance with the execution of the DSN access request 572 and to delete the entry of the shared global DSN directory 574 in accordance with the execution of the DSN access request 572. After updating the shared global DSN directory 574, the update directory state module 564 is operable to change the state of the shared global DSN directory to the ready-for-modification state (e.g., send a ready-for-modification state indicator to one or more of the associated DSN access devices 580 and/or include the ready-for-modification state indicator in the shared global DSN directory 574).

When the shared global DSN directory is in the modification state, the execute DSN access request module 566 is operable to execute the DSN access request 572 in accordance with the non-shared local DSN directory 584. For example, the execute DSN access request module 566 utilizes a source name extracted from the non-shared local DSN directory 584, wherein the source name corresponds to the data, to access the data in the DSN memory 22. The deferred update directory module 570 is operable to execute generating a shared global DSN directory update request 588 (e.g., pending updates for the shared global DSN directory 574) in response to the execution of the DSN access request 572, update the non-shared local DSN directory 584 in accordance with execution of the DSN access request 588, and when the shared global DSN directory 574 is in the ready-for-modification state, coordinating updating of the shared global DSN directory 574 in accordance with the shared global DSN directory update request 588.

The deferred update directory module 570 functions to coordinate updating of the shared global DSN directory 574 by, when the shared global DSN directory 574 is in the ready-for-modification state, updating state of the shared global DSN directory to the modification state, updating the shared global DSN directory 574 in accordance with the shared global DSN directory update request 588 (e.g., implementing pending updates from one or more associated DSN access devices 580), and after updating the shared global DSN directory 574, changing the state of the shared global DSN directory to the ready-for-modification state. The deferred update directory module 570 further functions to coordinate updating of the shared global DSN directory 574 by identifying one or more associated DSN access devices 582 and sending the shared global DSN directory update request 588 to at least one of the one or more associated DSN access devices 582.

Figure 16B:
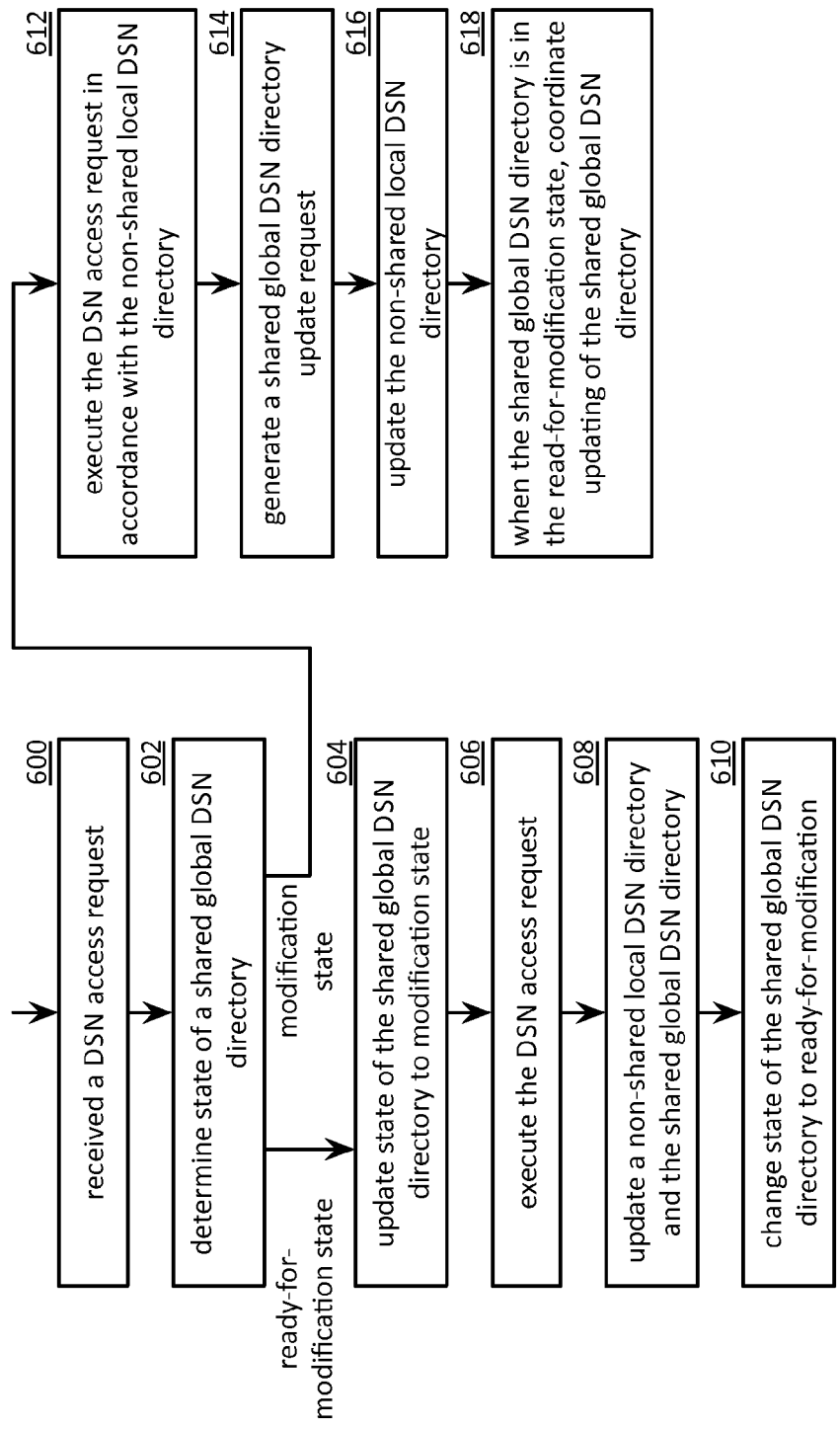
FIG. 16B is a flowchart illustrating another example of modifying a directory file in accordance with the present invention.

FIG. 16B is a flowchart illustrating another example of modifying a directory file. The method begins with step 600 where a processing module (e.g., of a dispersed storage (DS) processing unit) receives a dispersed storage network (DSN) access request accessing DSN memory, wherein the DSN access request includes a write function, a delete function, or a modify function. In response to the DSN access request, the method continues at step 602 where the processing module determines state of a shared global DSN directory. The determining state of the shared global DSN directory further includes at least one of receiving an indication of the state of the shared global DSN directory, detecting a modification state when an open shared global DSN directory update request for another DSN access request exists, and detecting the state of the shared global DSN directory based on an indication within the shared global DSN directory.

The method branches to step 612 when the shared global DSN directory is in the modification state. The method continues at step 604 where the processing module updates state of the shared global DSN directory to a modification state when the shared global DSN directory is in a ready-for-modification state. The updating includes identifying one or more associated DSN access devices and sending state updates of the shared global DSN directory to the one or more associated DSN access devices.

The method continues at step 606 where the processing module executes the DSN access request in accordance with at least one of a non-shared local DSN directory and the shared global DSN directory. When the DSN access request is the write function the executing the DSN access request includes generating information regarding storing data into the DSN memory. When the DSN access request is the modify function, the executing the DSN access request includes identifying an entry in the non-shared local DSN directory or the shared global DSN directory to retrieve storage information and executing the DSN access request in accordance with the storage information. When the DSN access request is the delete function the executing the DSN access request includes identifying an entry in the non-shared local DSN directory or the shared global DSN directory to retrieve storage information and executing the DSN access request in accordance with the storage information.

The method continues at step 608 where the processing module updates the non-shared local DSN directory and the shared global DSN directory in accordance with execution of the DSN access request. The updating includes updating the non-shared local DSN directory by creating an entry in the non-shared local DSN directory to include the information regarding storing the data when the DSN access request is the write function. The updating further includes updating the entry of the non-shared local DSN directory in accordance with the execution of the DSN access request when the DSN access request is the modify function. The updating further includes deleting the entry of the non-shared local DSN directory in accordance with the execution of the DSN access request when the DSN access request is the delete function. The updating further includes updating the shared global DSN directory by creating an entry in the shared global DSN directory to include the information regarding storing the data when the DSN access request is the write function. The updating further includes updating the entry of the shared global DSN directory in accordance with the execution of the DSN access request when the DSN access request is the modify function. The updating further includes deleting the entry of the shared global DSN directory in accordance with the execution of the DSN access request when the DSN access request is the delete function. The method continues at step 610 where the processing module changes the state of the shared global DSN directory to the ready-for-modification state after updating the shared global DSN directory.

The method continues at step 612 where the processing module executes the DSN access request in accordance with the non-shared local DSN directory when the shared global DSN directory is in the modification state. The method continues at step 614 where the processing module generates a shared global DSN directory update request in response to the execution of the DSN access request the method continues at step 616 where the processing module updates the non-shared local DSN directory in accordance with execution of the DSN access request.

When the shared global DSN directory is in the ready-for-modification state, the method continues at step 618 where the processing module coordinates updating of the shared global DSN directory in accordance with the shared global DSN directory update request. The coordinating updating of the shared global DSN directory includes, when the shared global DSN directory is the ready-for-modification state updating state of the shared global DSN directory to the modification state, updating the shared global DSN directory in accordance with the shared global DSN directory update request, and after updating the shared global DSN directory, changing the state of the shared global DSN directory to the ready-for-modification state. The coordinating updating of the shared global DSN directory further includes identifying one or more associated DSN access devices and sending the shared global DSN directory update request to at least one of the one or more associated DSN access devices.

Figure 17:
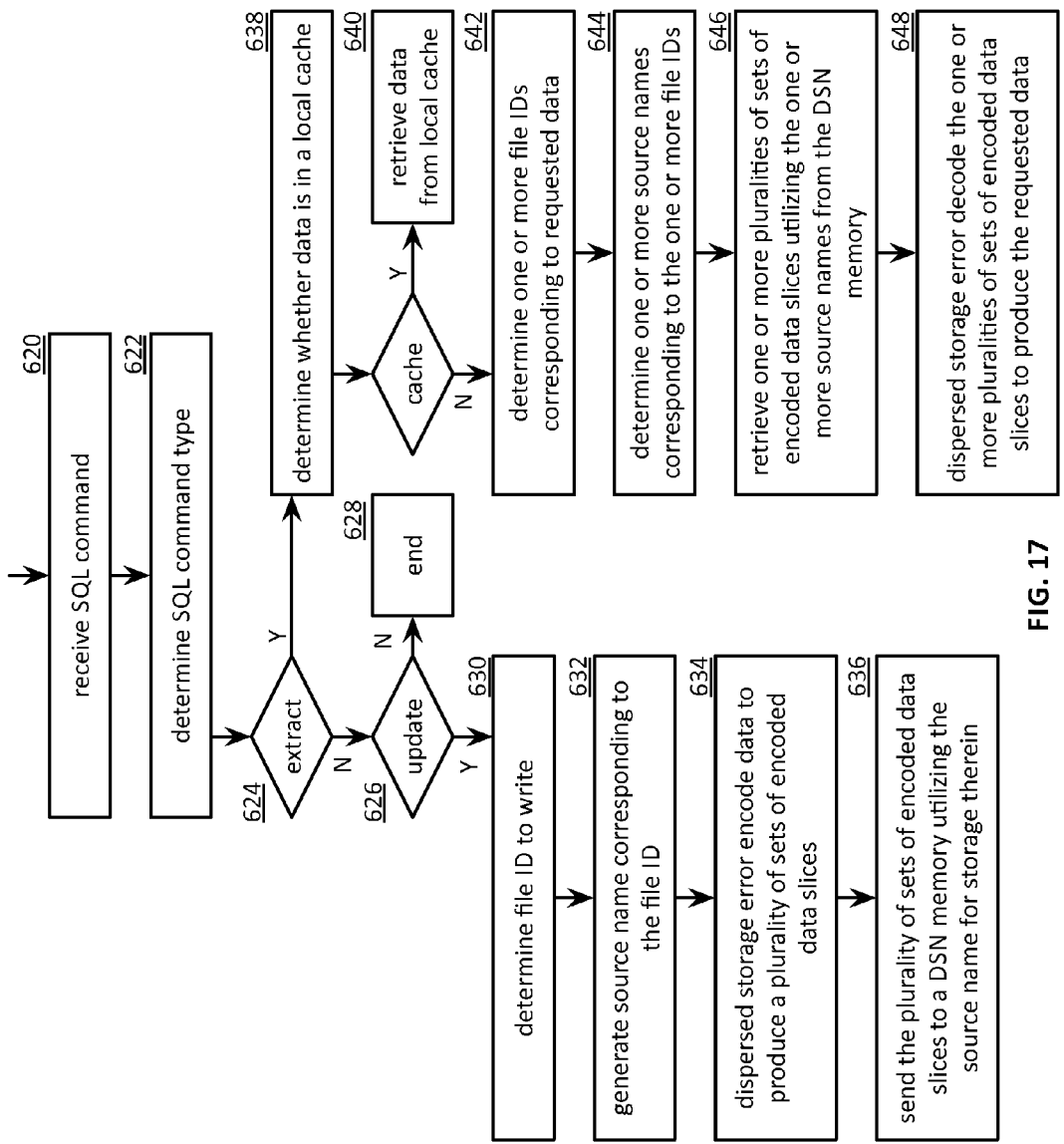
FIG. 17 is a flowchart illustrating an example of translating a data access command in accordance with the present invention.

FIG. 17 is a flowchart illustrating an example of translating a data access command. The method begins with step 620 where a processing module (e.g., of a dispersed storage (DS) processing unit) receives a structured query language (SQL) command. The SQL command includes one or more of clauses (e.g. statement components, queries), expressions (e.g., scaler values or tables), predicates (e.g., logical conditions), queries (e.g., to retrieve data based on criteria), and statements (e.g., control). The method continues at step 622 where the processing module determines an SQL command type of the received SQL command. The determination may be based on one or more of receiving the SQL command type, extracting the SQL command type, comparing the received SQL command to a SQL command type table identified the SQL command type, a message, a command, and a query. For example, the processing module determines that the SQL command type is an update command based on extracting the update command from the received SQL command. The update command may be utilized to modify a set of data previously stored in a database. As another example, the processing module determines that the SQL command type is an extract command based on based on comparing the received SQL command to the SQL command type table. The extract command may be utilized to read data stored in a database.

The method continues at step 624 where the process module determines whether the SQL command type is the extract command. The method branches to step 638 when the processing module determines that the SQL command type is the extract command. The method continues to step 626 when the processing module determines that the SQL command type is not the extract command. The method continues at step 626 where the processing module determines whether the SQL command type is the update command. The method branches to step 630 when the processing module determines that the SQL command type is the update command. The method ends at step 628 when the processing module determines that the SQL command type is not the update command.

The method continues at step 630 where the processing module determines a file identifier (ID) to write. The determination may be based on one or more of a user ID associated with the SQL command, the received SQL command, the SQL command type, a query, a message, and a look up. For example, the processing module determines the file ID based on parameters of the SQL update command by looking up the file ID utilizing the parameters as an index. The method continues at step 632 where the processing module generates a source name corresponding to the file ID. For example, the processing module determines a vault ID of the source name based on the user ID and generates an object number associated with the source name as a random number. The processing module updates a directory to associate the source name and the file ID in a new directory entry of the directory.

The method continues at step 634 where the processing module dispersed storage error encodes data associated with the received SQL command to produce a plurality of sets of encoded data slices. The method continues at step 636 where the processing module sends at least some of the plurality of sets of encoded data slices to a dispersed storage network (DSN) memory utilizing the source name for storage therein.

The method continues at step 638 where the processing module determines whether requested data is in a local cache when the processing module determines that the SQL command type is the extract command. The determination may be based on one or more of a file ID associated with the requested data, a message, and a query of the local cache. The method branches to step 642 when processing module determines that the requested data is not in the local cache. The method ends at step 640 where the processing module retrieves the requested data from the local cache when the processing module determines that the requested data is in the local cache.

The method continues at step 642 where the processing module determines one or more file IDs corresponding to the requested data. The determination may be based on one or more of the user ID associated with the SQL command, the SQL command, the SQL command type, a query, a message, and a lookup. The processing module determines two or more file IDs corresponding to the requested data when the extract command references data stored in two or more data files associated with the two or more file IDs. The method continues at step 644 where the processing module determines one or more source name corresponding to the one or more file IDs. The determination may be based on a directory file lookup utilizing the one or more file IDs.

The method continues at step 646 where the processing module retrieves at least some of one or more pluralities of sets of encoded data slices utilizing the one or more source names from the DSN memory. The method continues at step 648 where the processing module dispersed storage error decodes the at least some of the one or more pluralities of sets of encoded data slices to produce the requested data.

FIG. 18A is a diagram illustrating an example of a list application programming interface (API) for utilization within a dispersed storage network (DSN). The API includes a set of software program rules regarding an interface between two or more software programs enabling utilization of the DSN. FIGS. 18A-I include methods to support a kernel-level API enabling user level access to the DSN. The user level API enables integration of user software with the DSN such that the user level software gains access to services of the DSN (e.g., creating, writing, listing, traversing files, etc.). Each figure of FIGS. 18A-I include a reference to a client side 650 of the API and a DSN side 652 of the API to indicate which side generates information and which side receives the information. Arrows indicate a directional flow of information from one side to the other. Time advances moving down in each of the FIGS. 18A-I.

Such a list API includes information, wherein such information includes a list send part 1 API 654 generated by a client 650 of the client side and received by the DSN 652 of the DSN side and includes a list receive part 1 API 656 generated by the DSN 652 and received by the client 650. The list send part 1 API 654 includes a snapshot identifier (ID) 658 and a path 660 associated with the snapshot ID. The snapshot ID 658 references entries of a directory structure when the snapshot ID was created (e.g., revisions of files associated with the directory structure at the time of the snapshot). The path 660 includes at least a portion of a file name path of a file system. The list receive part 1 API 656 includes one or more directory entries 1-*n* corresponding to directory structure entries associated with the path 660 and snapshot ID six of the eight. For example, a directory entry of the one or more directory entries 1-*n* may include a folder subpath under the path 660 or a subpath that includes a file name under the path 660.

The list API includes a method, wherein, in order, information regarding the list send part 1 API 654 is generated and output by the client side 650, the information regarding the list send part 1 API 654 is received by the DSN side 652, information regarding the list receive part 1 API 656 is generated and output by the DSN side 652, and the information regarding the list receive part 1 API 656 is received by the client side 650.

FIG. 18B is a diagram illustrating an example of a write application programming interface (API) for utilization within a dispersed storage network (DSN). The write API includes information, wherein such information includes a write send part 1 API 662 generated by a client 650 of a client side and received by the DSN 652 of a DSN side, includes a write receive part 1 API 664 generated by the DSN 652 and received by the client 650, and includes a write send part 2 API 666 generated by the client 650 and received by the DSN 652.

The write send part 1 API 662 includes a snapshot identifier (ID) 668 and a path 670 associated with the snapshot ID 668 and data to be written to the DSN. The write receive part 1 API 664 includes an object ID 672 and a write channel 674 associated with the snapshot ID 668 and the path 670. The object ID 672 provides a unique identifier within the DSN associating the snapshot ID 668, the path 670, and the data to be written. For example, the object ID 672 is generated by the DSN as a random number. The object ID 672 in combination with a vault ID and a generation ID form a source name utilized within the DSN. The write channel 674 provides connectivity for an information transfer from the DSN 652 two the client 650 such that the client 650 will accept data of the information transfer. The write send part 2 API 666 includes a write channel 676 and the data, wherein the data is organized sequentially from a data start 678 to a data end 680.

The write API includes a method, wherein, in order, information regarding the write send part 1 API 662 is generated and output by the client side 650, the information regarding the write send part 1 API 662 is received by the DSN side 652, information regarding the write receive part 1 API 664 is generated and output by the DSN side 652, the information regarding the write receive part 1 API 664 is received by the client side 650, information regarding the write send part 2 API 666 is generated and output by the client side 650, and the information regarding the write send part 2 API 666 is received by the DSN side 652.

FIG. 18C is a diagram illustrating an example of a read all application programming interface (API) for utilization within a dispersed storage network (DSN). The read all API includes information, wherein such information includes a read all send part 1 API 682 generated by a client 650 of a client side and received by the DSN 652 of a DSN side and includes a read all receive part 1 API 684 generated by the DSN 652 and received by the client 650.

The read all send part 1 API 682 includes a snapshot identifier (ID) 686, a path 688 associated with the snapshot ID, and a selectable read channel 690. The selectable read channel 690 provides connectivity for an information transfer from the DSN 652 to the client 650 such that the client 650 will accept data of the information transfer. The read all receive part 1 API 684 includes a read channel 692, data associated with the snapshot ID 686 and the path 688 (e.g., one or more data files), wherein the data is organized sequentially from a data start 694 to a data end 696, and a complete indicator 698 denoting information transfer is complete.

The read all API includes a method, wherein, in order, information regarding the read all send part 1 API 682 is generated and output by the client side 650, the information regarding the read all send part 1 API 682 is received by the DSN side 652, information regarding the read all receive part 1 API 684 is generated and output by the DSN side 652, and the information regarding the read all receive part 1 API 684 is received by the client side 650.

FIG. 18D is a diagram illustrating an example of a read portion application programming interface (API) for utilization within a dispersed storage network (DSN). The read portion API includes information, wherein such information includes a read portion send part 1 API 700 generated by a client 650 of a client side and received by the DSN 652 of a DSN side and includes a read portion receive part 1 API 702 generated by the DSN 652 and received by the client 650.

The read portion send part 1 API 700 includes a snapshot identifier (ID) 704, a path 706 associated with the snapshot ID 704, a start position 708, a length 710, and a selectable read channel 712. The start position 708 indicates an addressing reference to a data portion start, wherein the data portion start includes intermediate data associated with data. For example, the start position may indicate to read data starting at a 20% of the way into a data file of the data. The length 710 indicates a maximum amount of intermediate data to be retrieved. For example, a length of 1,000,000 indicates that at most 1,000,000 bytes of intermediate data are to be retrieved. The read portion receive part 1 API 702 includes a read channel 714, data associated with the snapshot ID, wherein the data is organized sequentially from a data portion start 716 to a data portion end 718, and a complete indicator 720 denoting information transfer is complete.

The read portion API includes a method, wherein, in order, information regarding the read portion send part 1 API 700 is generated and output by the client side 650, the information regarding the read portion send part 1 API 700 is received by the DSN side 652, information regarding the read portion receive part 1 API 702 is generated and output by the DSN side 652, and the information regarding the read portion receive part 1 API 702 is received by the client side 650.

FIG. 18E is a diagram illustrating an example of a set/put attribute application programming interface (API) for utilization within a dispersed storage network (DSN). The set/put attribute API includes information, wherein such information includes a set/put attribute send part 1 API 722 generated by a client 650 of a client side and received by the DSN 652 of a DSN side.

The set/put attribute send part 1 API 722 includes a snapshot identifier (ID) 724, a path 726 associated with the snapshot ID, and a map 728. The map 728 includes one or more attribute names 1-$n$ and one or more corresponding attribute values 1-$n$. Each attribute name of the one or more attribute names 1-$n$ may be utilized to denote an attribute type of a corresponding attribute value to be stored. For example, attribute name 1 includes a creator attribute and attribute value 1 includes "Jason" when the map is utilized to store metadata associated with data stored in the DSN.

The set/put attribute API includes a method, wherein, in order, information regarding the set/put attribute send part 1 API 722 is generated and output by the client side 650 and the information regarding the set/put attribute send part 1 API 722 is received and processed by the DSN side 652. The processing may include at least one of modifying one or more associated attribute values of attributes stored in the DSN when the set/put attribute information indicates a set, and overwriting all attribute values and attribute names stored in the DSN when the set/put attribute information indicates a put.

FIG. 18F is a diagram illustrating an example of a get attribute application programming interface (API) for utilization within a dispersed storage network (DSN). The get attribute API includes information, wherein such information includes a get attribute send part 1 API 730 generated by a client 650 of a client side and received by the DSN 652 of a DSN side and a get attribute receive part 1 API 732 generated by the DSN 652 and received by the client 650. The get attribute send part 1 API 730 includes a snapshot identifier (ID) 734 and a path 736 associated with the snapshot ID 734. The get attribute receive part 1 API 732 includes a map 738, wherein the map 738 is retrieved from the DSN.

The get attribute API includes a method, wherein, in order, information regarding the get attribute send part 1 API 730 is generated and output by the client side 650 and the information regarding the get attribute send part 1 API 732 is received and processed by the DSN side 652, information regarding the get attribute receive part 1 API 732 is generated and output by the DSN side 652, and the information regarding the get attribute receive part 1 API 732 is received by the client side 650.

FIG. 18G is a diagram illustrating an example of a create snapshot application programming interface (API) for utilization within a dispersed storage network (DSN). The create snapshot API includes information, wherein such information includes a create snapshot send part 1 API 740 generated by a client 650 of a client side and received by the DSN 652 of a DSN side and a create snapshot receive part 1 API 742 generated by the DSN 652 and received by the client 650. The create snapshot send part 1 API 740 includes a parent snapshot identifier (ID) 744 and a new snapshot ID 746. The parent snapshot ID 744 includes a snapshot ID of a parent snapshot (e.g., an existing snapshot), wherein a new snapshot utilizing the new snapshot ID 746 is to be created such that the new snapshot is a child snapshot of the parent snapshot. The create snapshot receive part 1 API 742 includes an exception indicator 748 wherein the exception indicator 748 indicates an error condition associated with creation of the new snapshot (e.g., the new snapshot ID already exists for the parent snapshot ID).

The create snapshot API includes a method, wherein, in order, information regarding the create snapshot send part 1 API 740 is generated and output by the client side 650 and the information regarding the create snapshot send part 1 API 740 is received and processed by the DSN side 652, information regarding the create snapshot receive part 1 API 742 is generated and output by the DSN side 652 when the DSN detects the error condition, and the information regarding the create snapshot receive part 1 API 742 is received by the client side 650 when the DSN outputs the information regarding the create snapshot receive part 1 API 742. Alternatively, the DSN may always generate and output the information regarding the create snapshot receive part 1 API 742 (e.g. including when the DSN does not detect the error condition). In such a scenario, the DSN may generate information regarding the create snapshot receive part 1 API 742 to include the exception indicator 748 indicating that the error condition was not detected.

FIG. 18H is a diagram illustrating an example of a delete snapshot application programming interface (API) for utilization within a dispersed storage network (DSN). The delete snapshot API includes information, wherein such information includes a delete snapshot send part 1 API 750 generated by a client 650 of a client side and received by the DSN 652 of a DSN side. The delete snapshot send part 1 API 750 includes a snapshot identifier (ID) 752 of a snapshot to be deleted in the DSN.

The delete snapshot API includes a method, wherein, in order, information regarding the delete snapshot send part 1 API 750 is generated and output by the client side 650 and the information regarding the delete snapshot send part 1 API 750 is received and processed by the DSN side 652. The processing includes deleting the snapshot from the DSN.

FIG. 18I is a diagram illustrating an example of a make directory application programming interface (API) for utilization within a dispersed storage network (DSN). The make directory API includes information, wherein such information includes a make directory send part 1 API 754 generated by a client 650 of a client side and received by the DSN 652 of a DSN side and a make directory receive part 1 API 756 generated by the DSN 652 and received by the client 650. The make directory send part 1 API 754 includes a snapshot identifier (ID) 758 and a path 760, wherein the snapshot ID 758 and the path 760 are associated with a directory to be created by the DSN. The path 760 may indicate a file system path that extends a previous file system path. The make directory receive part 1 API 756 includes a complete indicator 762, wherein the complete indicator 762 indicates that a make directory operational function has been completed.

The make directory API includes a method, wherein, in order, information regarding the make directory send part 1 API 754 is generated and output by the client side 650 and the information regarding the make directory send part 1 API 754 is received and processed by the DSN side 652, information regarding the make directory receive part 1 API 756 is generated and output by the DSN side 652, and the information regarding the make directory receive part 1 API 756 is received by the client side 650. The processing by the DSN side includes the make directory operational function.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a dispersed storage (DS) processing unit of a dispersed storage network (DSN) the method comprises:
    obtaining a revision level of a global parent directory file of a global file structure, wherein the global parent directory file is represented by one or more data segments, in which respective data segments are error encoded to produce N number of encoded data slices for each data segment, and wherein the N number of encoded data slices for the respective data segments are dispersed separately in a distributed storage network, where only a read threshold number T of the particular N number of encoded data slices are needed to be retrieved from the distributed storage network to reconstruct each data segment to reconstruct the global parent directory file, where T is less than N, and wherein a local parent directory file also stores a local parent directory structure in encoded data slices in order for the local parent directory file and the global parent directory file to mirror each other, wherein the obtaining the revision level of the global parent directory file of the global file structure includes:
        transmitting a read request to the distributed storage network; and
        performing a slice-to-slice comparison of respective encoded data slices of the global parent directory file and the local parent directory file to identify a revision level indicator mismatch between respective encoded data slices of the global parent directory file and the local parent directory file;
    comparing the revision level of the global parent directory file with a revision level of a local parent directory file by comparing a revision level indicator included with at least one encoded data slice pertaining to the global parent directory file with a revision level of the local parent directory file;
    when the comparing of the revision level indicator included with the at least one encoded data slice pertaining to the global parent directory file with the revision level of the local parent directory file is unfavorable:
        retrieving encoded data slices pertaining to the global parent directory file from the distributed storage network;
        decoding the encoded data slices pertaining to the global parent directory file to reconstruct the global parent directory file;
        updating the local parent directory file based on the global parent directory file;
        accessing an entry of the global parent directory file that points to an address of a global child directory file, wherein the global child directory file includes an entry that points to an address of a data object;
        obtaining a revision level of the global child directory file, recovering and decoding encoded data slices pertaining to the global child directory file from the distributed storage network and using the global child directory file to update a local child directory file; and
    utilizing updated local parent and local child directory files to perform an access request regarding the data object.

2. The method of claim 1 further comprises:
    the global file structure includes a plurality of directory files, wherein a particular directory file of the plurality of directory files includes a plurality of entries, wherein an entry of the plurality of entries that points to an address of another directory file of the plurality of directory files or to an address of a particular data object, wherein the plurality of directory files is error encoded to produce a plurality of sets of encoded directory file slices, wherein a set of the plurality of sets of encoded directory file slices corresponds to one of the plurality of directory files, wherein the plurality of sets of encoded directory file slices are stored in storage units of the distributed storage network; and the local directory file structure includes a copy of a set of the plurality of directory files, wherein a child directory file of the set of the plurality of directory files includes an entry that points to an address of another data object, wherein the parent directory file of the set of the plurality of directory files includes the entry that points to an address of the child directory file.

3. The method of claim 1, wherein the obtaining the revision level of the parent directory file of the global file structure comprises:
transmitting a single read encoded slice request to a storage unit of the distributed storage network.

4. The method of claim 1 further comprises:
when the comparing of the revision level indicator included with the at least one encoded data slice pertaining to the global parent directory file with the revision level of the local parent directory file is favorable, utilizing the local parent and local child directory files to perform the access request regarding the data object.

5. The method of claim 1 further comprises:
when the entry of the global parent directory file points to an address of an intervening child directory file, obtaining the global child directory file via the intervening child directory.

6. The method of claim 5 further comprises:
accessing an entry of the intervening child directory file that points to the address of the global child directory file to obtain the global child directory file.

7. A dispersed storage (DS) module comprises:
a first module, when operable in a computing device, causes the computing device to obtain a revision level of a global parent directory file of a global file structure, wherein the global parent directory file is represented by one or more data segments, in which respective data segments are error encoded to produce N number of encoded data slices for each data segment, and wherein the N number of encoded data slices for the respective data segments are dispersed separately in a distributed storage network, where only a read threshold number T of the particular N number of encoded data slices are needed to be retrieved from the distributed storage network to reconstruct each data segment to reconstruct the global parent directory file, where T is less than N, and wherein a local parent directory file also stores a local parent directory structure in encoded data slices in order for the local parent directory file and the global parent directory file to mirror each other, wherein the obtaining the revision level of the global parent directory file of the global file structure includes:
transmitting a read request to the distributed storage network; and
performing a slice-to-slice comparison of respective encoded data slices of the global parent directory file and the local parent directory file to identify a revision level indicator mismatch between respective encoded data slices of the global parent directory file and the local parent directory file;

a second module, when operable in the computing device causes the computing device to compare the revision level of the global parent directory file with a revision level of a local parent directory file by comparing a revision level indicator included with at least one encoded data slice pertaining to the global parent directory file with a revision level of the local parent directory file;

a third module, when operable in the computing device causes the computing device to:
when comparing the revision level indicator included with the at least one encoded data slice pertaining to the global parent directory file with the revision level of the local parent directory file is unfavorable:
retrieve encoded data slices pertaining to the global parent directory file from the distributed storage network;
decode the encoded data slices pertaining to the global parent directory to reconstruct the global parent directory file;
update the local parent directory file based on the global parent directory file;
access an entry of the global parent directory file that points to an address of a global child directory file, wherein the global child directory file includes an entry that points to an address of a data object;
obtain a revision level of the global child directory file, recover and decode encoded data slices pertaining to the global child directory file from the distributed storage network and use the global child directory file to update a local child directory file; and a fourth module, when operable in the computing device causes the computing device to utilize updated local parent and local child directory files to perform an access request regarding the data object.

8. The DS module of claim 7 further comprises:
the global file structure includes a plurality of directory files, wherein a particular directory file of the plurality of directory files includes a plurality of entries, wherein an entry of the plurality of entries that points to an address of another directory file of the plurality of directory files or to an address of a particular data object, wherein the plurality of directory files is error encoded to produce a plurality of sets of encoded directory file slices, wherein a set of the plurality of sets of encoded directory file slices corresponds to one of the plurality of directory files, wherein the plurality of sets of encoded directory file slices are stored in storage units of the distributed storage network; and the local directory file structure includes a copy of a set of the plurality of directory files, wherein a child directory file of the set of the plurality of directory files includes an entry that points to an address of another data object, wherein the parent directory file of the set of the plurality of directory files includes the entry that points to an address of the child directory file.

9. The DS module of claim 7, wherein the first module, when operable in the computing device, causes the computing device to obtain the revision level of the global parent directory file of the global file structure by:
transmitting a single read encoded slice request to a storage unit of the distributed storage network.

10. The DS module of claim 7, wherein the fourth module, when operable in the computing device causes the computing device to:

when the comparing of the revision level indicator included with the at least one encoded data slice pertaining to the global parent directory file with the revision level of the local parent directory file is favorable, utilizing the local parent and local child directory files to perform the access request regarding the data object.

11. The DS module of claim 7, wherein the third module, when operable in the computing device, causes the computing device to:
when the entry of the global parent directory file points to an address of an intervening child directory file, obtain the global child directory file via the intervening child directory.

12. The DS module of claim 11, wherein the third module, when operable in the computing device, further causes the computing device to:
access an entry of the intervening child directory file that points to the address of the global child directory file to obtain the global child directory file.

* * * * *